US012395583B2

(12) United States Patent
Salvana et al.

(10) Patent No.: US 12,395,583 B2
(45) Date of Patent: Aug. 19, 2025

(54) WRIST-WEARABLE DEVICES FOR AGGREGATING AND GUIDING ACCESS TO DATA FROM MULTIPLE DIFFERENT ELECTRONIC MESSAGING APPLICATIONS VIA A QUICKLY-ACCESSIBLE COMMUNICATIONS-HUB MODE, AND METHODS OF USE THEREOF

(71) Applicant: Meta Platforms Technologies, LLC, Menlo Park, CA (US)

(72) Inventors: Ed Ignatius Tanghal Salvana, Brulingame, CA (US); Camilo Barrera Acosta, Fort Lauderdale, FL (US); Qian Wang, Fremont, CA (US); Swapna Joshi, San Francisco, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 18/737,871

(22) Filed: Jun. 7, 2024

(65) Prior Publication Data
US 2025/0080638 A1 Mar. 6, 2025

Related U.S. Application Data

(63) Continuation of application No. 17/832,486, filed on Jun. 3, 2022, now Pat. No. 12,010,256.
(Continued)

(51) Int. Cl.
*H04M 1/72409* (2021.01)
*H04M 1/72412* (2021.01)
(Continued)

(52) U.S. Cl.
CPC .. *H04M 1/724095* (2022.02); *H04M 1/72412* (2021.01); *H04M 1/72436* (2021.01); *H04W 4/12* (2013.01); *H04M 2250/52* (2013.01)

(58) Field of Classification Search
CPC ....... H04M 1/724095; H04M 1/72412; H04M 1/72436; H04M 1/7243; H04M 2250/52;
(Continued)

(56) References Cited

U.S. PATENT DOCUMENTS

| 2011/0130168 A1* | 6/2011 | Vendrow | H04L 51/216 455/556.1 |
| 2015/0098309 A1* | 4/2015 | Adams | G04F 10/00 368/10 |

(Continued)

*Primary Examiner* — Farid Seyedvosoghi
(74) *Attorney, Agent, or Firm* — Morgan, Lewis & Bockius LLP

(57) ABSTRACT

An example method for managing messaging for multiple messaging accounts includes displaying, at an electronic device, an aggregated messaging user interface (UI) that includes data from a plurality of user accounts associated with one or more messaging application. The method further includes detecting a selection of a UI element for creating a new message via at least one respective user account of the plurality of user accounts. The method includes, after detecting the selection, and after determining that messaging capabilities for two or more respective user accounts of the plurality of user accounts are enabled, presenting: (i) a first selectable option that, when selected causes the electronic device to initiate creation of a message for a first respective user account, and (ii) a second selectable option that, when selected, causes the electronic device to initiate creation of a message for a second respective user account.

20 Claims, 19 Drawing Sheets

Related U.S. Application Data

(60) Provisional application No. 63/306,031, filed on Feb. 2, 2022, provisional application No. 63/223,929, filed on Jul. 20, 2021, provisional application No. 63/209,064, filed on Jun. 10, 2021.

(51) Int. Cl.
*H04M 1/72436* (2021.01)
*H04W 4/12* (2009.01)

(58) Field of Classification Search
CPC ........ H04W 4/12; G06F 1/163; G06F 1/1632; G06F 1/1654; G06F 3/0482; G06F 3/04842; G06F 3/0485; G06F 3/04883; G06F 3/167; G06Q 10/107; H04L 51/56
See application file for complete search history.

(56) References Cited

U.S. PATENT DOCUMENTS

2018/0183738 A1* 6/2018 Parnell .................. G06Q 50/01
2018/0212920 A1* 7/2018 Govande .............. H04L 67/535

* cited by examiner

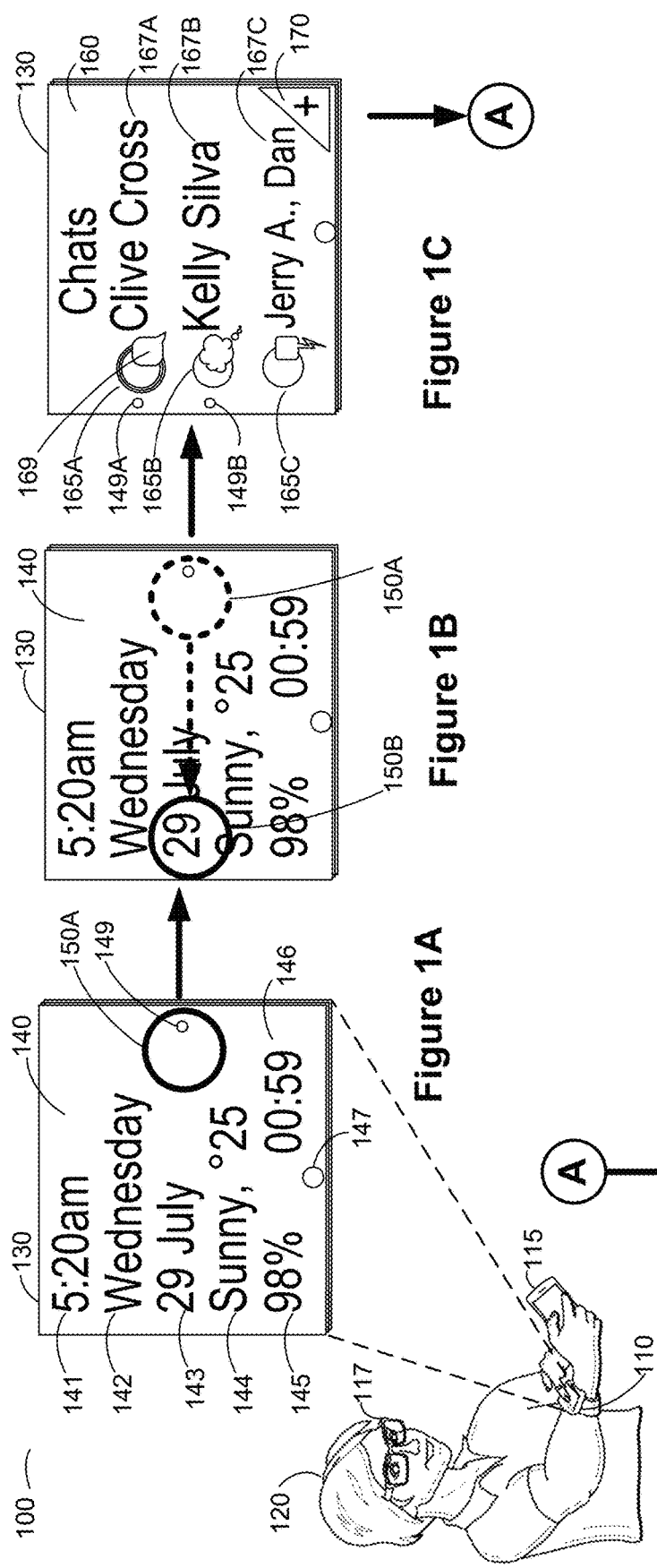

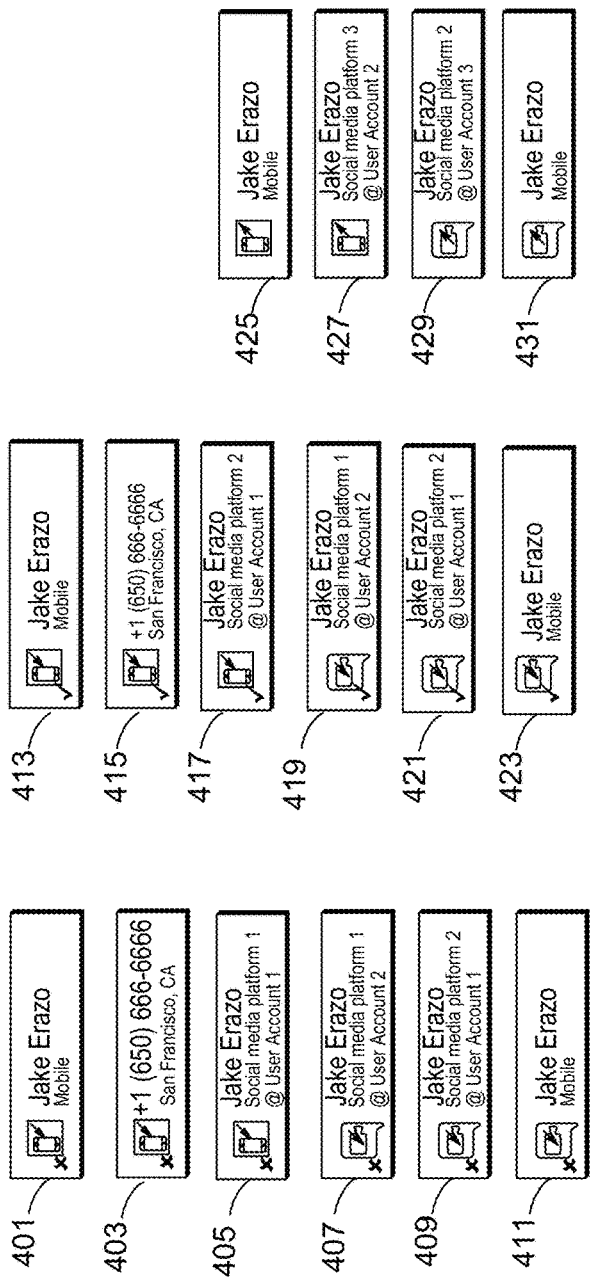

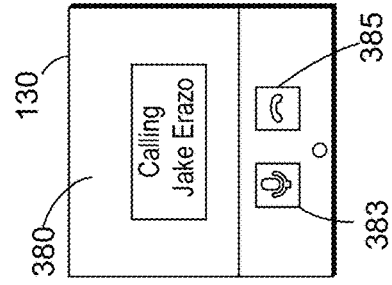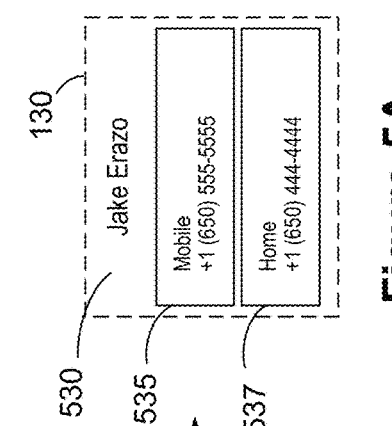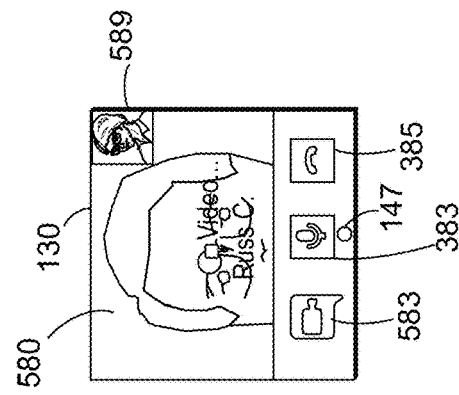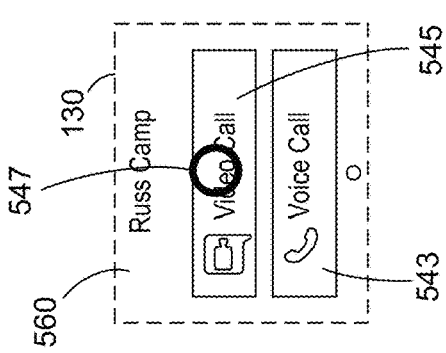
Figure 5A
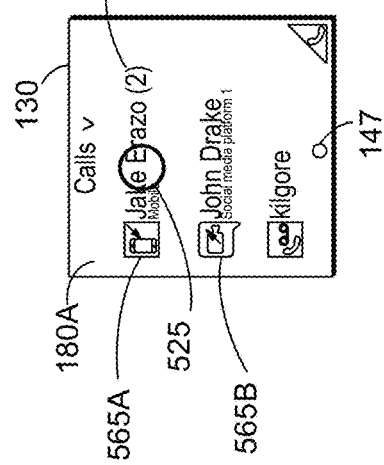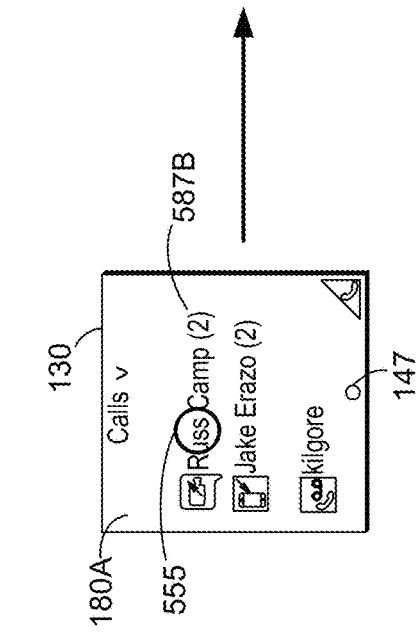
Figure 5B

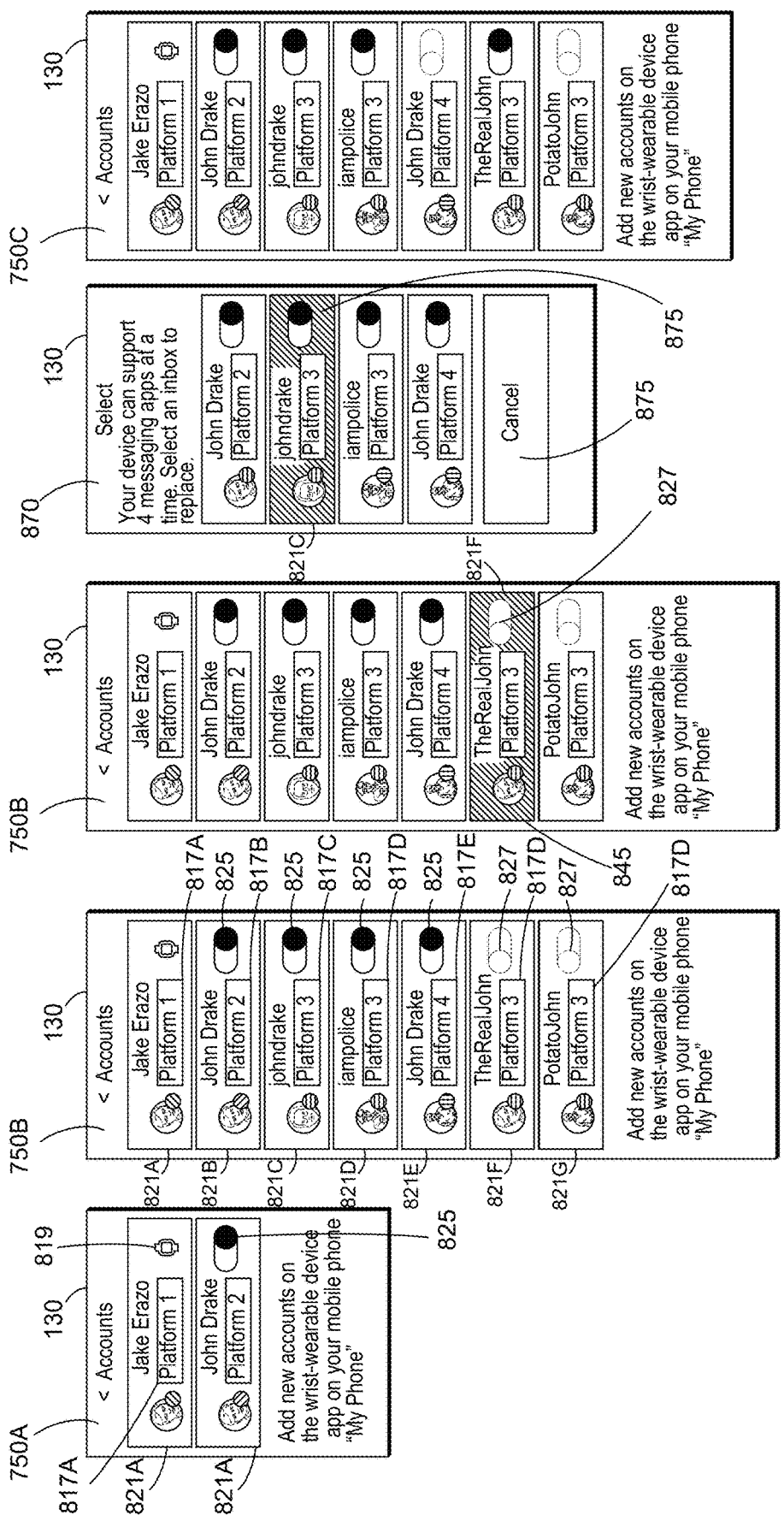

900 ▸

902
Displaying, on a display of a wrist-wearable device that includes at least a first messaging application and a second messaging application distinct from the first messaging application, a watch-face user interface

904
The watch-face user interface includes an indication to the user that the aggregated messaging user interface is available via a single input

906
While displaying the watch-face user interface, detecting a single input from a user wearing the wrist-wearable device, the single input corresponding to a request from the user to activate a communications-hub mode, the communications-hub mode providing access to two or more of an aggregated messaging user interface, an aggregated call log user interface, and an aggregated contacts user interface, each including data from both of the first messaging application and the second messaging application

908-a
In response to detecting the single input corresponding to the request from the user to activate the communications-hub mode:
908-b
Cease to display the watch-face user interface, and
908-c
Display, on the display of the wrist-wearable device, the aggregated messaging user interface, displaying the aggregated messaging user interface including a first user interface element that includes at least part of a first message received via the first messaging application and a second user interface element that includes at least part of a second message received via the second messaging application.

910
The aggregated messaging user interface includes an indication to the user that the aggregated call log user interface is available via a single input

912-a
The user wearing the wrist-wearable device has two different user accounts for receiving messages via the first messaging application and
912-b
The aggregated messaging user interface also includes a third user interface element that includes at least part of a third message received via the first messaging application, the third message being sent to a first of the two different user accounts via the first messaging application and the first message being sent to a second of the two different user accounts via the first messaging application.

914-a
Display, within the aggregated messaging user interface, a user interface element for creating a new message, and

914-b
In response to detecting a selection of the user interface element for creating a new message in accordance with a determination that the two different user accounts for receiving messages via the first messaging application are enabled on the wrist-wearable device, present a first selectable option that, when selected, causes the wrist-wearable device to initiate creation of a message to be sent using the first of the two different user accounts and a second selectable option that, when selected, causes the wrist-wearable device to initiate creation of a message to be sent using the second of the two different user accounts.

916
In response to detecting the selection of the user interface element for creating a new message in accordance with a determination that at least one user account for receiving messages via the second messaging application is enabled on the wrist-wearable device, presenting a third selectable option that, when selected, cause the wrist-wearable device to initiate creation of a message to be sent using the at least one user account for the second messaging application, wherein the first, second, and third selectable options are presented within one user interface on the wrist-wearable device.

918-a
The wrist-wearable device includes a user-account-configuration user interface for enabling and disabling user accounts on the wrist-wearable device, the user accounts including the two different user accounts for receiving messages via the first messaging application and the user account for receiving messages via the second messaging application, and

918-b
Display the user-account configuration user interface on the display of the wrist-wearable device,

918-c
In response to an input at a toggle associated with one of the user accounts, cause the wrist-wearable device to add or remove messages from the aggregated messaging user interface depending on whether a respective user account has been enabled or disabled via the input at the toggle.

920
The user-account-configuration user interface allows for enabling only a predetermined number of the user accounts on the wrist-wearable device, thereby helping to preserve limited computing and memory resources on the wrist-wearable device.

922-a
While displaying the aggregated messaging user interface, detect another single input from the user wearing the wrist-wearable device, the other single input corresponding to a request from the user to access an aggregated call log user interface; and

922-b
In response to detecting the other single input corresponding to the request from the user to access the aggregated call log user interface:

922-c
Cease to display the aggregated messaging user interface, and

922-d
Display, on the display of the wrist-wearable device, the aggregated call log user interface, displaying the aggregated call log user interface including displaying a fourth user interface element that includes data associated with a first call received via the first messaging application, and a fifth user interface element that includes data associated with a second call received via the second messaging application

924-a
While displaying the aggregated call log user interface, detect a selection of the fourth user interface element, and

924-b
in response to detecting the selection, initiate a call via the first messaging application.

926
Displaying the aggregated call log user interface also includes displaying a sixth user interface element that includes data from a voicemail received via the first messaging application or the second messaging application

928
The fourth and fifth user interface elements are displayed with a first visual characteristic, and the sixth user interface element is displayed with a second visual appearance that is distinct from the first visual characteristic

930
Displaying the aggregated call log user interface includes in accordance with a determination that two calls were received from a same other user, displaying one user interface element with data from each of the two calls within the aggregated call log user interface.

932
A first of the two calls is an audio call from the same other user and a second of the two calls is a video call from the same other user

934-a
Detect a new input at the one user interface element with data from each of the two calls, and

934-b
In response to detecting the new input, present at the wrist-wearable device selectable options for initiating a video call or initiating an audio call to the same other user, the video call being initiated using a camera of the wrist-wearable device

936-a
While displaying the aggregated call log user interface, detect a selection of the fourth user interface element, and

936-b
In response to detecting the selection, initiate a call via the first calling application.

938-a
While displaying the aggregated call log user interface, detect one other input from the user wearing the wrist-wearable device, the one other input corresponding to a request from the user to access an aggregated contact user interface;

938-b
In response to detecting the one other input:

938-c
Cease to display the aggregated call log user interface, and

938-d
Display, on the display of the wrist-wearable device, the aggregated contacts user interface, displaying the aggregated contacts user interface including displaying a sixth user interface element that includes data from a respective contact of a plurality of contacts associated with the first application and a seventh user interface element that includes data from a respective contact of a plurality of contacts associated with the second application

940
The wrist-wearable device operates using an operating system, and the first and second applications provide data regarding electronic messages, contacts, and calls to the operating system for use in generating the aggregated messaging, call log, and contact user interfaces by the operating system

Figure 9E

WRIST-WEARABLE DEVICES FOR AGGREGATING AND GUIDING ACCESS TO DATA FROM MULTIPLE DIFFERENT ELECTRONIC MESSAGING APPLICATIONS VIA A QUICKLY-ACCESSIBLE COMMUNICATIONS-HUB MODE, AND METHODS OF USE THEREOF

CROSS-REFERENCE TO RELATED APPLICATIONS

This application is a continuation of U.S. patent application Ser. No. 17/832,486, filed on Jun. 3, 2022, entitled "Wrist-Wearable Devices For Aggregating And Guiding Access To Data From Multiple Different Electronic Messaging Applications Via A Quickly-Accessible Communications-Hub Mode, And Methods Of Use Thereof," which claims priority to U.S. Prov. App. No. 63/209,064, filed on Jun. 10, 2021, and entitled "Wrist-Wearable Devices For Aggregating And Guiding Access To Data From Multiple Different Electronic Messaging Applications Via A Quickly-Accessible Communications-Hub Mode, And Methods Of Use Thereof"; U.S. Prov. App. No. 63/223,929, filed on Jul. 20, 2021, and entitled "Wrist-Wearable Devices For Aggregating And Guiding Access To Data From Multiple Different Electronic Messaging Applications Via A Quickly-Accessible Communications-Hub Mode, And Methods Of Use Thereof"; and U.S. Prov. App. No. 63/306,031, filed on Feb. 2, 2022, and entitled "Wrist-Wearable Devices For Aggregating And Guiding Access To Data From Multiple Different Electronic Messaging Applications Via A Quickly-Accessible Communications-Hub Mode, And Methods Of Use Thereof," each of which is incorporated herein by reference in its respective entirety.

TECHNICAL FIELD

The present disclosure relates generally to wearable devices and methods for aggregating and guiding access to data from multiple different electronic messaging applications and more particularly to wrist-wearable devices configured to aggregate and guide access to electronic messaging data from multiple different messaging applications in a quickly accessible communications-hub mode.

BACKGROUND

Computing devices, such as computers, phones, and tablets, are used to send and receive messages, audio calls, and/or video calls from different applications and/or communication networks (e.g., cellular networks). Due to the amount of information included in different messages, audio calls, and/or video calls, computing devices require large displays to present users with information in an easily digestible format. Current computing devices are not well suited for hands-free, on-the-go, multitasking situations (e.g., shopping, walking, hiking, doing chores, cooking). Smaller devices, such as wearable devices, while better suited for on-the-go situations include small displays that limit the amount of information that can be presented to a user at a given time. The limited display size of the wearable devices makes it difficult for users to easily and quickly access all of their information and interact with presented user interfaces. Current display capabilities of smaller devices can create cumbersome user experiences (especially for viewing multiple different messaging applications) that do not provide users with an enjoyable experience. Further, existing wearable devices include limited computing resources and other restrictions that can reduce the total number of accounts (e.g., accounts used by users for exchanging electronic messages) that can be associated with a particular messaging application at a particular time.

As such, there is a need to address the above drawbacks faced by users of conventional wearable devices.

SUMMARY

The systems and methods described herein address one or more of the above-mentioned drawbacks by allowing a user to seamlessly access information from multiple applications on his or her wrist-wearable device as well as increase the amount of information that is made quickly accessible (e.g., using a minimal number of inputs such as just a single input) to the user via a small display (e.g., a display with a 30 mm to 65 mm diameter or diagonal measurement) of the wrist-wearable device, thereby enabling a continued and/or guided human-machine interaction process at the wrist-wearable device without reducing the quality or limiting the type of information presented. Further, the systems and methods described herein allow wrist-wearable devices to quickly and seamlessly access and then aggregate contacts, messages, and other information from a number of different accounts and applications associated with a user of the wrist-wearable device, which allow the wrist-wearable device to then present aggregated user interfaces (e.g., user interfaces that include aggregated data from multiple different application sources) to the user.

In this way, a user is able to access data from multiple accounts on a single device (i.e., a wrist-wearable device including a display) and improve the user's daily activities and productivity by allowing for a guided and sustained human-machine interface in which a user can access disparately located (e.g., in different applications) message data in an aggregated user interface to allow the user to access all message data in a guided and sustained interaction (and without the need to haphazardly and inefficiently jump between different applications on a small screen for which fat-finger-input issues can exist that further slow access to different applications). Thus, the user is enabled to access this disparately located message data (and also disparately located contact information) in a much more efficient manner (and without wasting time or dealing with frustrations through erroneous inputs, which issues can contribute to draining battery lift on a wrist-wearable device). Thus, a compact, hands-free computing system is provided that can be worn throughout the users' day without inconveniencing the users or restricting their movements (and thus making it easier to interact with their physical and artificial environments in tandem (as a complement to everyday life)). Additionally, the systems and method disclosed herein save users time by not requiring them to go into different applications to use the application and save processing resources by having all of a user's information in one place (e.g., via a communications-hub mode that is quickly activated using a single input from a watch-face user interface of the wrist-wearable device) without having the user run the various applications separately.

Note that the various embodiments described above can be combined with any other embodiments described herein. The features and advantages described in the specification are not all-inclusive and, in particular, many additional features and advantages will be apparent to one of ordinary skill in the art in view of the drawings, specification, and claims. Moreover, it should be noted that the language used in the specification has been principally selected for readability and instructional purposes and may not have been selected to delineate or circumscribe the subject matter described herein.

BRIEF DESCRIPTION OF THE DRAWINGS

So that the present disclosure can be understood in greater detail, a more particular description may be had by reference to the features of various embodiments, some of which are illustrated in the appended drawings. The appended drawings, however, merely illustrate pertinent features of the present disclosure and are therefore not to be considered limiting, for the description may admit to other effective features as the person of skill in this art will appreciate upon reading this disclosure.

FIGS. 1A-1F illustrate a guided human-machine interaction process based on detected user input to activate a communications-hub mode and then interact with aggregated user interfaces available in the communications-hub mode, in accordance with some embodiments.

FIGS. 4A-4D illustrate variations of user interface elements (e.g., call UI elements 187, FIG. 1F) that can be displayed in the aggregated call log user interface, in accordance with some embodiments.

FIGS. 5A and 5B illustrate guided human-machine interaction processes for returning video and audio calls received from a single contact using more than one contact form, in accordance with some embodiments.

FIGS. 8A-8E illustrate a guided human-machine interaction process for configuring user accounts to be used with the communications-hub mode, according to some embodiments.

FIGS. 9A-9E show a detailed flow diagram of a method for activating a communications-hub mode and interacting with aggregated user interfaces available therein, according to some embodiments.

Figure 1G:
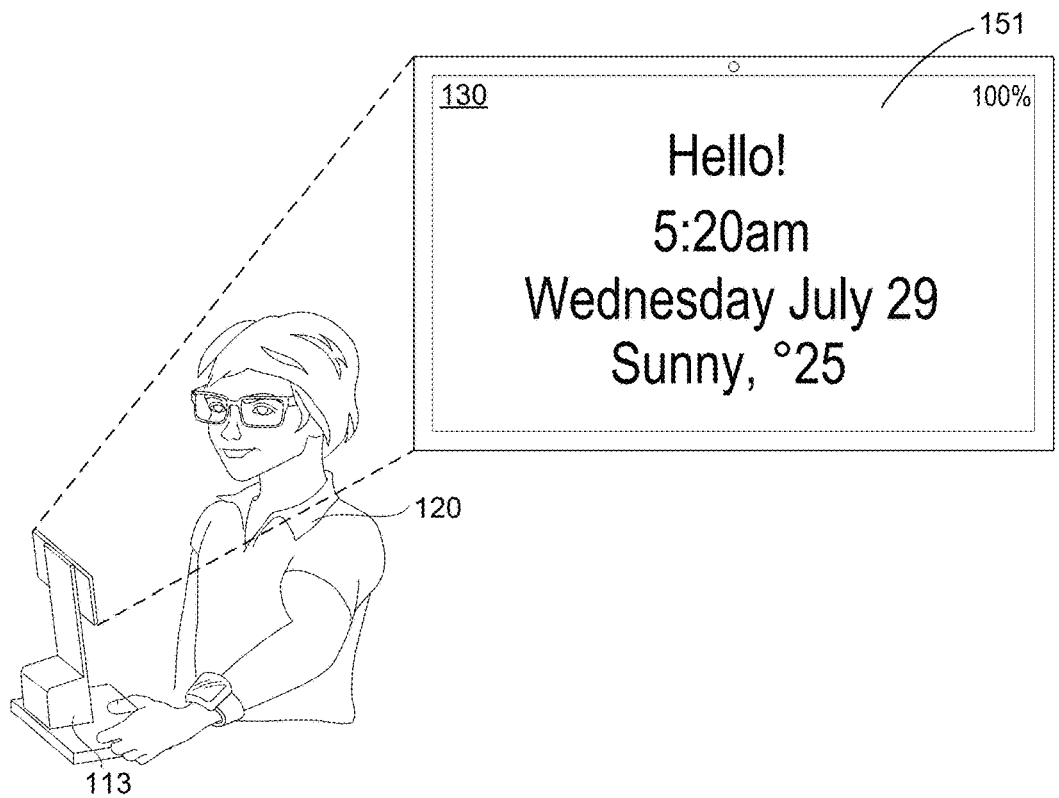
FIGS. 1G-1J also illustrate user interaction with aggregated user interfaces available in the communications-hub mode at a portable device, in accordance with some embodiments.

In accordance with common practice, the various features illustrated in the drawings may not be drawn to scale. Accordingly, the dimensions of the various features may be arbitrarily expanded or reduced for clarity. In addition, some of the drawings may not depict all of the components of a given system, method, or device. Finally, like reference numerals may be used to denote like features throughout the specification and figures.

DETAILED DESCRIPTION

Numerous details are described herein in order to provide a thorough understanding of the example embodiments illustrated in the accompanying drawings. However, some embodiments may be practiced without many of the specific details, and the scope of the claims is only limited by those features and aspects specifically recited in the claims. Furthermore, well-known processes, components, and materials have not been described in exhaustive detail so as to avoid obscuring pertinent aspects of the embodiments described herein.

FIGS. 1A-1F illustrate a guided human-machine interaction process based on detected user input to activate a communications-hub mode and then interact with aggregated user interfaces available in the communications-hub mode. More specifically, FIGS. 1A-1F illustrate activating a communications-hub mode 100 in response to detected user input at a wrist-wearable device 110. The wrist-wearable device 110 can include one or more displays 130 (e.g., a touch screen) for presenting a visual representation of data to a user 120, speakers for presenting an audio representation of data to the user 120, microphones for capturing audio data, imaging devices (e.g., a camera) for capturing image data and/or video data (referred to as camera data), and sensors (e.g., such as electromyography (EMG) sensors 1145 and/or other sensors described below in reference to FIG. 11). Additional information on wrist-wearable device 110 is provided below in reference to FIGS. 10A, 10B, and 11. In some embodiments, the wrist-wearable device 110 is communicatively coupled with an intermediary device (e.g., a server, a computer, a smartphone, smart glasses, a tablet, a portable device 113, and/or other computing devices). In some embodiments, the wrist-wearable device 110 is communicatively coupled to more than one intermediary device.

Figure 2:
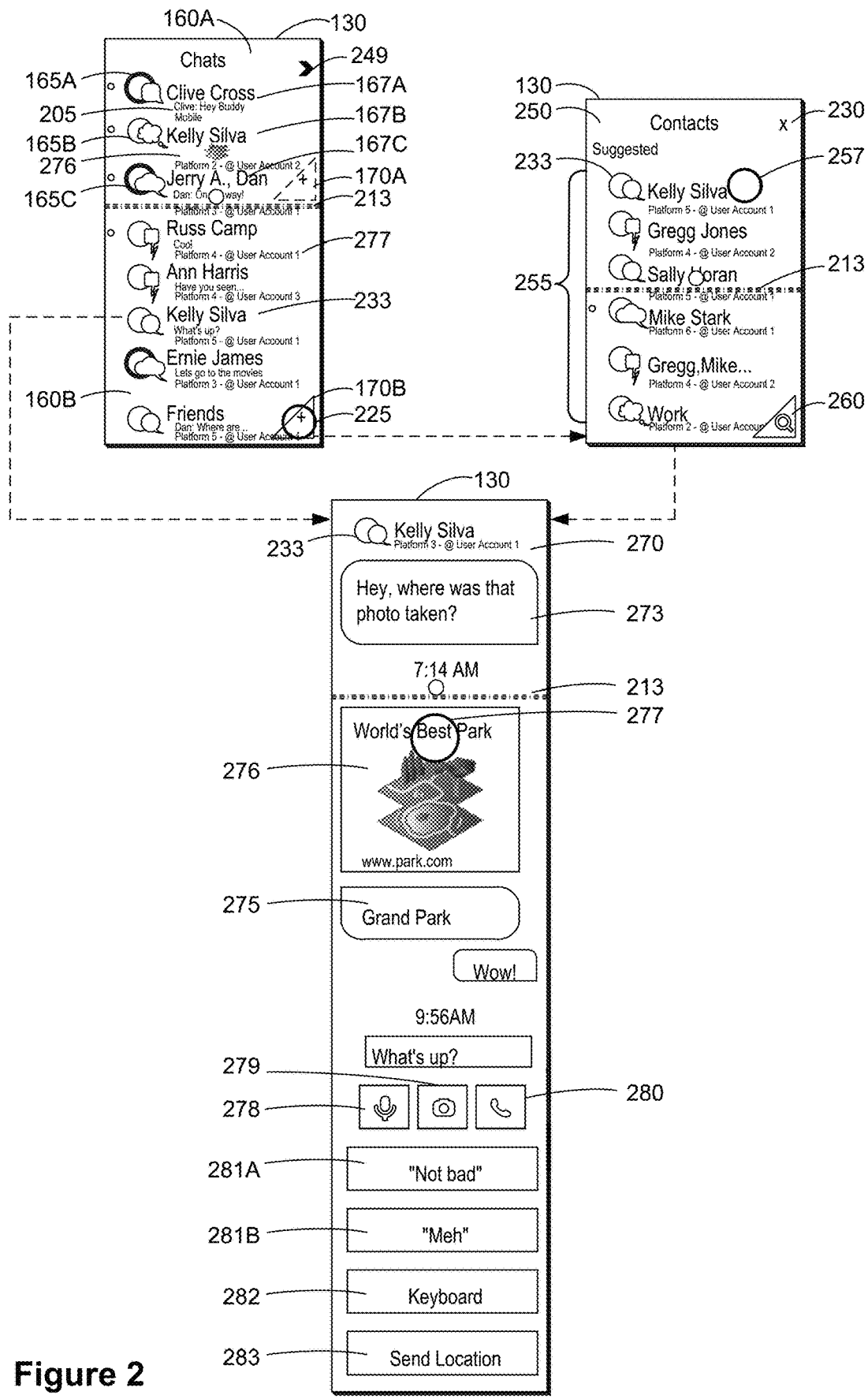
FIG. 2 illustrates a guided human-machine interaction process based on detected user input in an aggregated messaging user interface while the communications-hub mode is active, in accordance with some embodiments.
Figure 3:
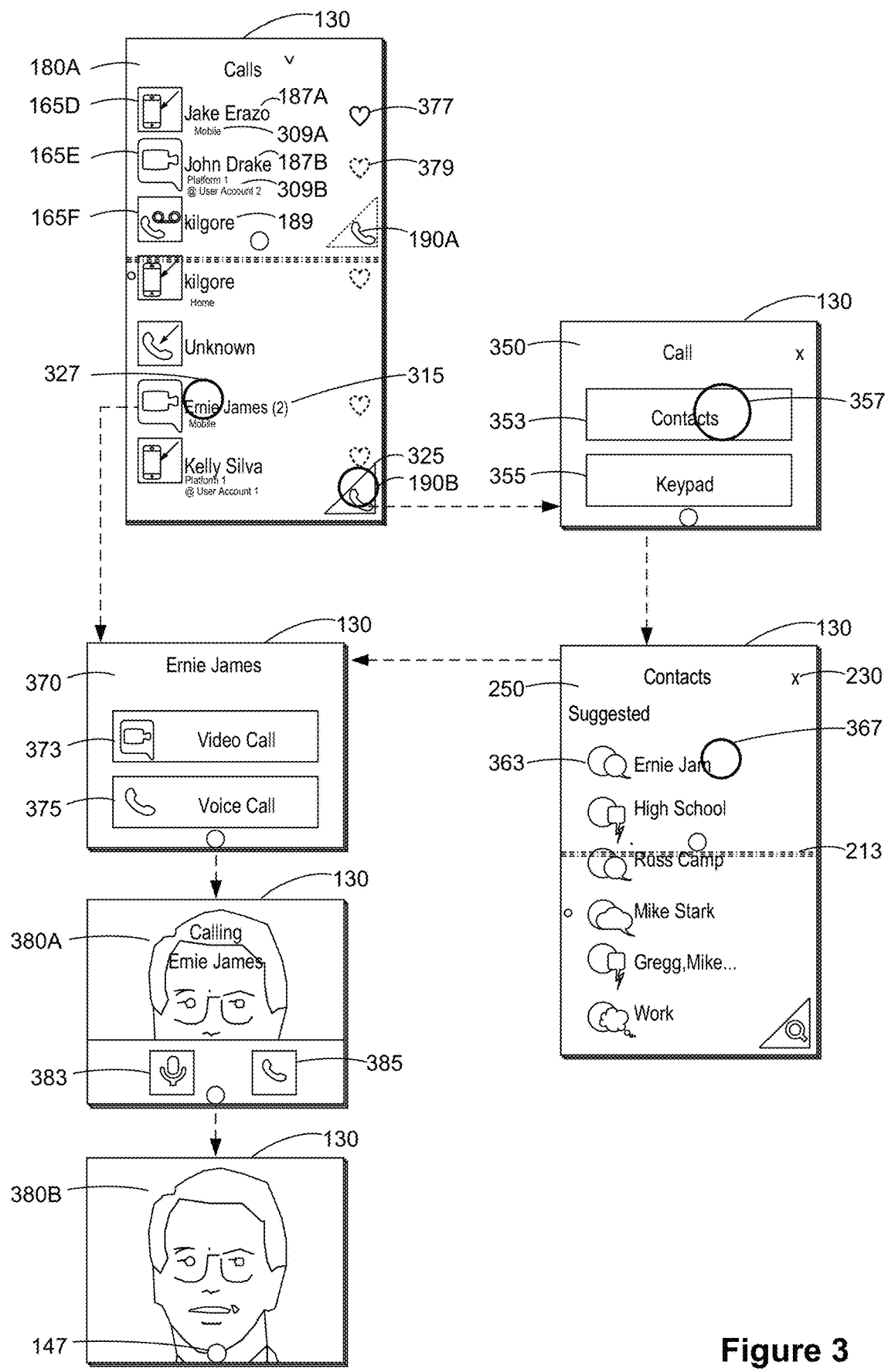
FIG. 3 illustrates a guided human-machine interaction process based on detected user input in an aggregated-call-log user interface while the communications-hub mode is active, in accordance with some embodiments.

The communications-hub mode 100 provides a user 120 access to two or more of an aggregated messaging user interface (UI) 160, an aggregated call log UI 180, and an aggregated contacts UI 250 (FIGS. 2 and 3). Each UI includes data from one or more electronic messaging applications included in the wrist-wearable device 110. In some embodiments, each UI (e.g., each of the aggregated messaging UI, aggregated call log UI, and aggregated contacts UI) includes data from at least two electronic messaging applications included in the wrist-wearable device 110. In some embodiments, the at least two electronic messaging applications are configured for receiving and sending text messages, emails, instant messages, images, audio clips, video clips, and other digital files or messages, including social media posts. Additionally, in some implementations, the at least two electronic messaging applications are configured for receiving and/or initiating audio calls, video calls, and/or voicemails. In some embodiments, the one or more messaging applications 165 are social media applications providing a range of electronic messaging features (including textual, video, audio, etc., messaging), but can also be applications enabling messaging of a particular type, such as email applications, instant messaging applications, Voice over Internet Protocol (VOIP) applications, videoconferencing and/or audioconferencing applications, audio and/or video voicemail applications, native computing device 115's calling applications (e.g., calls over a cellular network), native computing device 115's messaging applications (e.g., SMS text or MMS text over a cellular network), and/or other communication applications. Specific, nonlimiting examples of the at least two electronic messaging applications are an Instagram application, Facebook application (include the Messenger application provided by Facebook), WhatsApp application, Workplace from Facebook application, or other applications made available by Facebook.

The user input is detected via a wrist-wearable device 110 including a display 130 configured to display one or more UIs, such as a watch-face UI 140, the aggregated messaging UI 160, the aggregated call log UI 180, and other UIs disclosed herein. As described above, in some embodiments the wrist-wearable device 110 includes one or more messaging applications 165. For example, the wrist-wearable device 110 includes a first messaging application 165A through sixth messaging application 165F (e.g., the applications associated with each of the icons/UI elements shown in FIGS. 1A-3). In some embodiments, each messaging application 165 is distinct. In some embodiments, as discussed below in reference to FIGS. 6A-6C, a messaging application 165 is associated with one or more user accounts such that the messaging application 165 can be associated with one user account as well as multiple different user accounts (such as two, three, or four user accounts that one user uses to receive messaging data via the messaging application 165). In some embodiments, an instance of messaging application 165 can be installed both at the wrist-wearable device 110 and at the computing device 115 that is associated with the wrist-wearable device 110.

In some embodiments, the wrist-wearable device 110 operates using an operating system that is responsible for execution of the one or more messaging applications 165. In some embodiments, the one or more messaging applications 165 provide data regarding electronic messages, contacts, calls, and voicemails for active user accounts associated with a communications-hub mode (discussed in more detail below) to the operating system for use in generating an aggregated messaging UI 160, an aggregated call log UI 180, and an aggregated contacts UI 250 (FIG. 2). In some embodiments, a provider of the operating system is also the provider of the one or more messaging applications (in some embodiments, Facebook is the provider of both the operating system and the one or more messaging applications). In some embodiments, the wrist-wearable device 110 receives updates from all the messaging applications 165 and merges all of the updates in chronological order.

In some embodiments, the wrist-wearable device 110 displays, on its display 130, the watch-face UI 140. The watch-face UI 140 can be a UI that is displayed by default at the wrist-wearable device 110. An example watch-face UI 140 is shown in FIGS. 1A and 1B, in which the example watch-face UI 140 includes at least a current time (e.g., clock UI element 141), a current day of the week (e.g., day UI element 142), a current date (e.g., date UI element 143), and current weather information (e.g., weather UI element 144, which can include both a current weather condition and a current temperature based on the current location of the wrist-wearable device 110). The watch-face UI 140 can also include an indication of a charge level of a battery of the wrist-wearable device (e.g., battery UI element 145) and one or more other status indications (e.g., status UI element 146, which shows a countdown timer).

In some embodiments, the watch-face UI 140 provides an indication UI element 149. In some embodiments, the indication UI element 149 can be an arrow that moves in a direction indicating that a single sliding gesture (or single tap input) can be provided over the indication UI element 149 and the indication UI element 149 can also include text to indicate that a communications-hub mode is available (such as text stating "Comm Hub Mode" or simply "Comm Hub"). In some embodiments, the indication UI element 149 guides the user 120 into performing one or more inputs to access one or more of the aggregated messaging UI 160 and/or the aggregated call log UI 180. For example, in some embodiments the indication UI element 149 guides the user to provide a single input 150 (e.g., a single tap input or single gesture input) to activate a communications-hub mode that enables access to two or more aggregated UIs that are discussed more below. In some embodiments, the indication UI element 149 can also include circles or other markers. In some embodiments, the indication UI element 149 is a color-coded indicator, flashing lights, alphanumeric characters, etc. In some embodiments, the indication UI element 149 includes the number of unread messages, the number of received audio and/or video calls, and/or the number of voicemails that are presented within the aggregated UIs accessible via the communications-hub mode. In some embodiments, the indication UI element 149 distinguishes between messages, audio and/or video calls, and/or voicemails.

In some embodiments, while displaying the watch-face UI 140, the wrist-wearable device 110 detects a single input from a user 120 wearing the wrist-wearable device 110. The single input corresponds to a request from the user 120 to activate a communications-hub mode 100. The communications-hub mode 100 provides access to two or more of an aggregated messaging UI 160, an aggregated call log UI 180, and an aggregated contacts UI 250. In some embodiments, each UI includes data from each messaging application 165. Examples of the single input include (i) a single gesture across the representation of the watch face (e.g., the watch-face UI 140), such as a sliding gesture (represented by a gesture that includes an input moving from position 150A to position 150B of FIG. 1B); (ii) a voice command received from the user 120 via either a microphone 1194 (FIG. 11) of the wrist-wearable device 110 or a microphone that is in communication with the wrist-wearable device 110 (e.g., mic on separate headphones, mic on AR glasses 117, mic on the computing device 115); and (iii) a gesture detected based on sensed neuromuscular signals (e.g., as described below in reference to FIGS. 10A and 10B). The single gesture across the representation of the watch face (or the other UIs described herein) can be from right to left, left to right, down to up, up to down, diagonal from respective corners, and/or other variations. In some embodiments, the wrist-wearable device 110 detects the single input (e.g., the single gesture across the representation of the watch face) when initiated from a portion of the display 130 presenting the indication UI element 149.

In some embodiments, in response to detecting the single input corresponding to the request from the user 120 to activate the communications-hub mode 100, the wrist-wearable device 110 ceases to display the representation of the watch face, and displays, on the display of the wrist-wearable device 110, a first aggregated UI associated with the communications-hub mode 100, which in this example is the aggregated messaging UI 160 (in other embodiments, the aggregated contacts or call log UIs can be displayed first within the communications-hub mode). In some embodiments, displaying the aggregated messaging UI 160 includes displaying (i) a first message UI element 167A that includes data from a first message received via the first messaging application 165A and (ii) a second message UI element 167B that includes data from a second message received via the second messaging application 165B. In some embodiments, the wrist-wearable device 110 also includes a third messaging application 165C, distinct from the first and second messaging applications 165A and 165B, respectively, and displaying the aggregated messaging UI 160 also includes displaying a third message UI element 167C that includes data from a third message received via the third messaging application 165C. In some embodiments, the wrist-wearable device 110 receives message updates from the first and second messaging applications 165A and 165B (and all other user accounts 609 associated with the wrist-wearable device 110 (as described below in reference to FIGS. 6A-6C)). More specifically, once a messaging application 165 (and/or a user account 609) is associated with the wrist-wearable device 110, the wrist-wearable device 110 will start to receive updates from the messaging application 165 (and/or the user account 609). The updates can be sent asynchronously to the wrist-wearable device 110. In some embodiments, each update can include one or more messages, audio and/or video calls, and/or other status information. While the wrist-wearable device 110 is in the communications-hub mode, the wrist-wearable device can sort and smartly insert data related to the updates that include the one or more messages, audio and/or video calls, and/or other status information into the corresponding UIs as described herein.

In some embodiments, the one or more messaging applications 165 are associated with one or more user accounts 609 (FIGS. 6A-6C), such that for each messaging application electronic messages can be sent and received via a respective user account. The generation and aggregation of UI elements for multiple user accounts and multiple messaging applications 165 (including for multiple user accounts associated with a single one of the messaging applications 165) is discussed below in reference to FIGS. 6A-6C and FIGS. 8A-8E.

In some embodiments, the aggregated messaging UI 160 provides an indication UI element 149 for each of the messages included within the aggregated messaging UI (in some embodiments, the message data is displayed in reverse chronological order, such that most recently received messages are displayed first in the list of messages within the aggregated messages UI 160). In some embodiments, the indication UI element 149 guides a user to new or unread messages. For example, as shown in FIG. 1C, the first message UI element 167A and the second message UI element 167B include indication UI elements 149A and 149B, respectively, that notify the user 120 that the messages are new and/or unread. As further discussed below in reference to FIG. 2, the user 120 can access or receive one or more messages, respond to one or more messages, and/or initiate one or more new messages via the aggregated messaging UI 160 while the communications-hub mode is active at the wrist-wearable device 110.

In some embodiments, the respective UI elements for messages received from the first messaging application 165A, the second messaging application 165B, and the third messaging application 165C are distinct from one another. For example, as shown in FIGS. 1C-1E, the UI elements are visually distinct from one another. In particular, each messaging application 165 can have a distinct icon 169 as shown for each of the icons for the first messaging application 165A, the second messaging application 165B, and the third messaging application 165C. As discussed below in reference to FIGS. 6A-6C, the one or more messaging applications 165 are associated with one or more user accounts 609 that a user has activated for use in presenting aggregated data in conjunction with the communications-hub mode.

In some embodiments, the aggregated messaging UI 160 includes data from an additional message that is associated with a messaging conversation between the user 120 wearing the wrist-wearable device 110 and at least two other users distinct from the user 120. For example, as shown in FIG. 1C, the third message UI element 167C that includes data from the third message received via the third messaging application 165C includes an identifier for at least two other users (e.g., "Jerry A." and "Dan"). Messages including at least two other users distinct from the user 120 are considered group messages or group conversations. In some embodiments, depending on the length of the individual user's name, more than two users or less than two users can be displayed in the third message UI element 167C. In some embodiments, names of the at least two other users distinct from the user 120 are abbreviated. In some embodiments, a portion of a message received from the at least two other users distinct from the user 120 is provided to the user 120 via the message UI element 167. As such, the aggregated messaging UI 160 of the communications-hub mode can display messaging data for both conversation threads between just two user accounts (e.g., a first user account for a user of the wrist-wearable device and a second user account for one other user of a device other than the wrist-wearable device) and for group conversation threads involving three or more user accounts.

In some embodiments, the aggregated messaging UI 160 includes a UI element for creating a new message 170. Additional detail on the UI element for creating a new message 170 is described below in reference to FIG. 2.

In some embodiments, the indication UI element 149C guides the user 120 to performing one or more inputs to access a next aggregated UI in a sequence of aggregated UIs for the communications-hub mode (in this example, the next aggregated UI in the sequence is the aggregated call log UI 180 that is accessible via a single input from within the aggregated messaging UI 160, which enables easy and quick navigation between multiple different aggregated UIs while the communications-hub mode is active). For example, as shown in FIG. 1D, the aggregated messaging UI 160 provides the user 120 with indication UI element 149C that notifies the user 120 of the availability of an aggregated call log UI 180 such as by indicating availability of data associated with new calls, missed calls, and/or voicemails.

In some embodiments, while displaying the aggregated messaging UI 160, the wrist-wearable device 110 detects another single input (e.g., a left-to-right swipe gesture across display 130) from the user 120 wearing the wrist-wearable device 110. The other single input corresponds to a request (represented in this example by a sliding gesture in which an input moves from position 150C to position 150D on the display of the wrist-wearable device as is shown in FIGS. 1D and 1E) from the user 120 to access an aggregated call log UI 180. In response to detecting the other single input corresponding to the request from the user 120 to access the aggregated call log UI 180, the wrist-wearable device 110 ceases to display the aggregated messaging UI 160 and displays, on the display of the wrist-wearable device 110, the aggregated call log UI 180 (this occurs while the wrist-wearable device remains in the communications-hub mode).

Displaying the aggregated call log UI 180 includes displaying (i) a fourth UI element (e.g., first call UI element 187A) that includes data associated with a first call received via a fourth messaging application 165D, and (ii) a fifth UI element (e.g., second call UI element 187B) that includes data associated with a second call received via a fifth messaging application 165E. Calls received from the one or more messaging applications 165 can include both audio and/or video calls. In some embodiments, the aggregated call log UI 180 can also display a sixth UI element (e.g., a voicemail UI element 189) that includes data from a voicemail received via a sixth messaging application 165F. Although the examples of FIGS. 1A-1F illustrate the first messaging application 165A through the sixth messaging application 165F as distinct messaging applications, in some implementations the messaging applications need not always be distinct. For example, the first and second messaging applications can be used as a source of the data that is aggregated into each of the aggregated messaging, call log, and contacts UIs (such that third, fourth, fifth, and sixth messaging applications are not utilized at all). In another example, the data that is aggregated into each of the aggregated messaging, call log, and contacts UIs can be associated with multiple user accounts for just a single messaging application (e.g., three different user accounts that a user uses for sending and receiving messages on a first messaging application, such as Instagram).

In some embodiments, the aggregated call log UI 180 also includes a UI element for initiating a new call 190 as described below in more detail in reference to FIG. 3.

In some embodiments, the aggregated call log UI 180 includes an indication UI element 149 for each recently received or missed calls or voicemails. For example, as shown in FIG. 1F, the first call UI element 187A includes indication UI element 149D notifying the user 120 that the call is new and/or missed. As further discussed below in reference to FIG. 3, the user 120 can access or receive one or more calls or voicemails, respond to one or more calls or voicemails, and/or initiate one or more calls directly from the aggregated call log UI 180 while the communications-hub mode is active.

In some embodiments, the respective call UI elements 187 and voicemail UI elements 189 are distinct from one another. For example, the first call UI element 187A and the second call UI element 187b are displayed with a first visual characteristic, and the voicemail UI element 189 is displayed with a second visual appearance that is distinct from the first visual characteristic. The one or more visual characteristics can include one or more font color, font emphasis, thumbnail, icon, marker, image, etc., such that video and audio calls can have a first font color, font emphasis, or other visual characteristic, while voicemails have a different font color, font emphasis, or other visual characteristic. This assists users 120 with having sustained interactions with the communications-hub mode of the wrist-wearable device 110 as they do not need to waste time searching for voicemails either in different applications or even within the aggregated call log user interface 180 itself as the voicemails are displayed using the second visual characteristic that makes them easy to spot quickly, even when displayed among other call records and associated UI elements. Examples of the visual differences between the UI elements are provided below in reference to FIGS. 4A-4D. In some embodiments, the respective message UI elements 167 are distinct from the call UI elements 187 and voicemail UI elements 189 as shown and described in FIGS. 2 and 5A-5C.

As mentioned above, the communications-hub mode can enable access to a sequence of aggregated UIs, including two or more of an aggregated messaging UI, aggregated call log UI, and aggregated contacts UI. The sequence in which each of the aggregated UIs is made available within the communications-hub mode can be configurable such that a user is able to determine an order in which the aggregated UIs are made available in the sequence. By including multiple different aggregated UIs in one communications-hub mode, users are guided through access to messaging data from either or both of multiple messaging applications and multiple user accounts associated with one or multiple of those messaging applications, thus avoiding the need to jump between different messaging applications and/or to have to log in and out of different user accounts to access messaging data from the various user accounts associated with a user of the wrist-wearable device.

FIGS. 1G-1J illustrate user interaction with aggregated UIs available in the communications-hub mode at a portable device 113, in accordance with some embodiments. The portable device 113 can include one or more displays 130 (e.g., a touch screen), speakers, microphones, imaging devices, and sensors (e.g., one or more sensors described below in reference to FIG. 11). Additional information on the portable device 113 is provided below in reference to FIGS. 10C, 10D, and 11. The portable device 113 can be communicatively coupled with the wrist-wearable device 110 and/or other intermediary devices described above. The portable device 113, similar to the wrist-wearable device 110 described above in reference to FIGS. 1A-1F, is configured to activate a communications-hub mode 100 that provides the user 120 access to two or more of an aggregated messaging UI 160, an aggregated call log UI 180, and an aggregated contacts UI 250 (FIGS. 2 and 3).

Figure 1H:
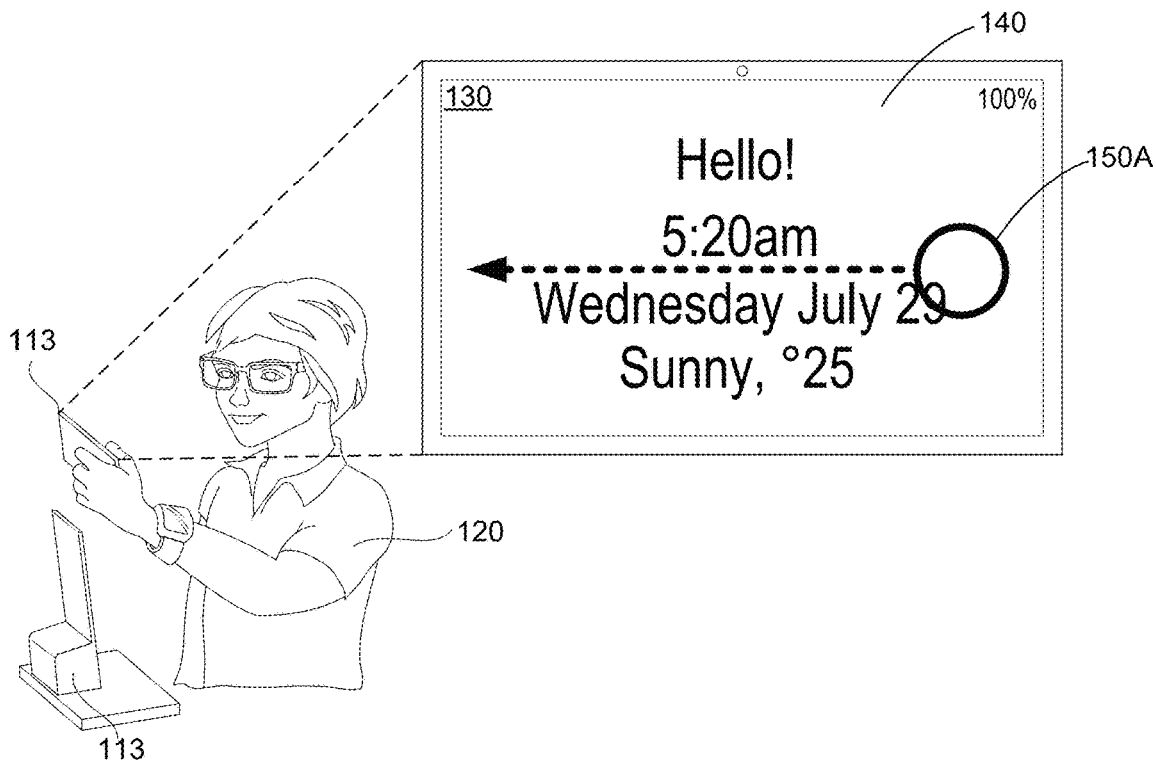
Figure 1I:
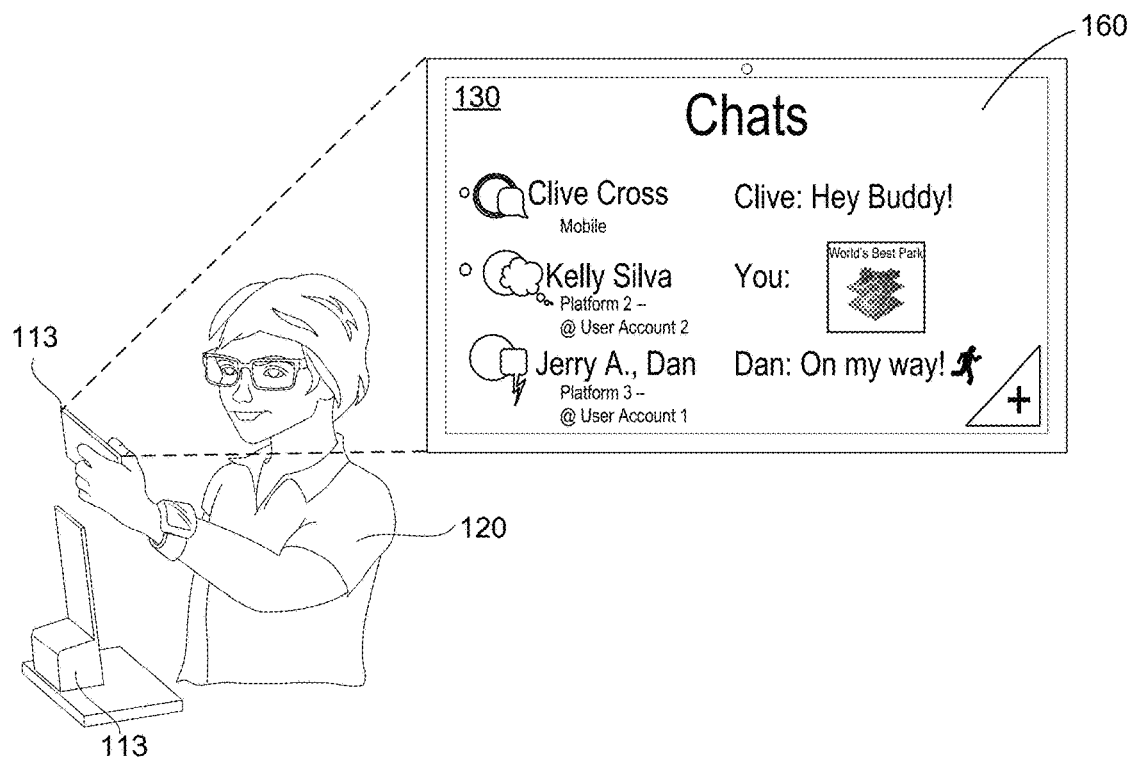

In some embodiments, the communications-hub mode 100 is activated at the portable device 113 in response to a detected user input at the portable device 113. For example, as shown in FIGS. 1G and 1H, the portable device 113 can present, via display 130, a home UI 151, and, responsive to a user input (e.g., a sliding gesture (represented by gesture 150A)), the portable device 113 can cause the communications-hub mode 100 to activate. When the communications-hub mode 100 is active, the portable device 113 is caused to present an aggregated messaging UI 160 as shown in FIG. 1I and/or any other UIs described above in reference to FIGS. 1A-1F. The home UI 151, similar to the watch-face UI 140, can include general information that would be useful to the user 120, such as a greeting, a date, a time, the temperature, and/or other information described above in reference to FIG. 1A.

Alternatively or in addition, in some embodiments the communications-hub mode 100 is caused to activate on the portable device 113 when the user 120's focus switches from an intermediary device with an active communications-hub mode 100 to the portable device. For example, while the communications-hub mode 100 is active on the wrist-wearable device 110 and the user 120's focus changes from the wrist-wearable device 110 to the portable device 113, the communications-hub mode 100 is caused to activate on the portable device 113 to allow the user 120 to seamlessly continue using the communications-hub mode 100 on the portable device 113. In some embodiments, operations between the wrist-wearable device 110 and the portable device 113 (and/or any other intermediary device) automatically switched based on the respective device that the user 120 is focused on. A determination that the user 120 is focused on a particular device can be based on user interaction with a particular device; user proximity to a respective device; manual selection of a particular device by the user; or a determination, based on sensor data from one or more sensors, that a particular device is within the user 120's field of view.

Figure 1J:
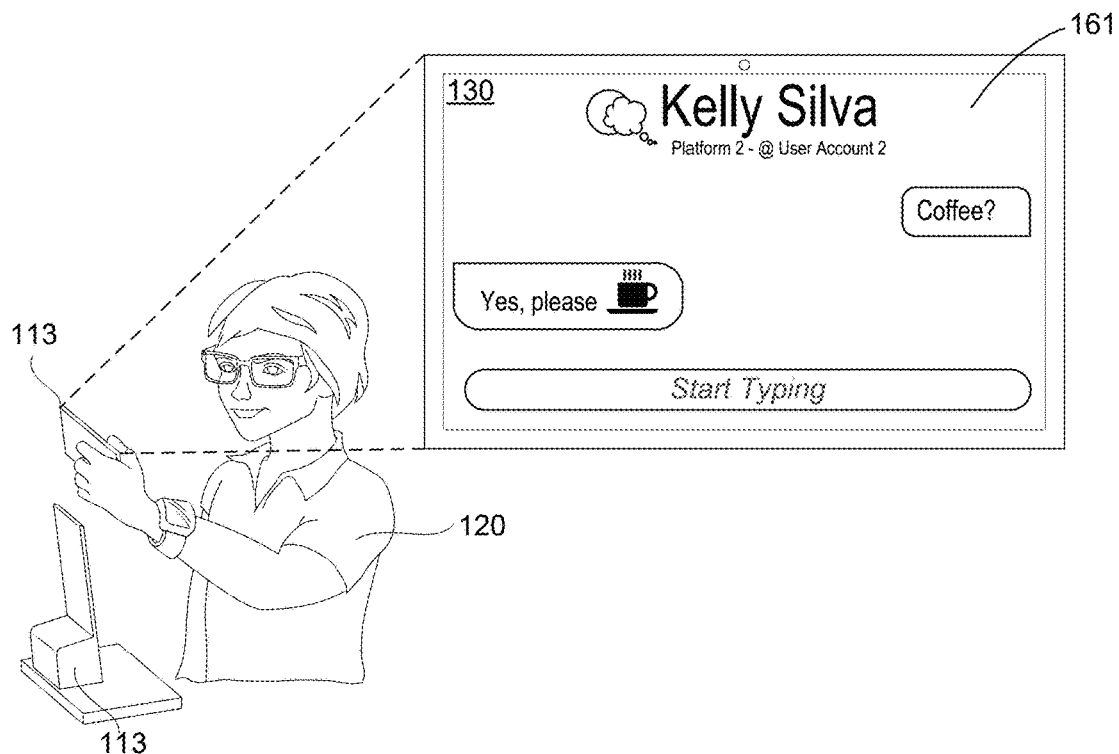

As shown in FIG. 1J, the aggregated messaging UI 160 can be used to access message UI 161. The message UI 161 can be used to receive and/or send one or more messages to other users. The above examples are nonlimiting. Additional details on the message UI 161 are provide below in reference to FIGS. 2-8E.

FIG. 2 illustrates a guided human-machine interaction process based on detected user input in an aggregated messaging UI while the communications-hub mode is active, in accordance with some embodiments. FIG. 2 shows an aggregated messaging UI 160, an aggregated contacts UI 250, and a message UI 270. The wrist-wearable device 110 provides, via its display 130, the aggregated messaging UI 160 in response to a detected single input (e.g., an input that moves, on a watch-face UI 140, from position 150A to position 150B across the display 130; FIGS. 1A-1F) corresponding to a request from the user 120 to access the aggregated messaging UI 160. In providing the aggregated messaging UI 160, the wrist-wearable device 110 ceases to display the watch-face UI 140 while activating a communications-hub mode and displays a first aggregated UI in a sequence of aggregated UIs of the communications-hub mode, which in this example is an aggregated messaging UI that includes one or more message UI elements associated with one or more messaging applications 165. As described above in reference to FIGS. 1A-1F, in some embodiments the wrist-wearable device 110 includes one or more messaging applications 165 and/or is associated with a computing device 115 that includes one or more messaging applications. In some embodiments, the wrist-wearable device 110 provides, via its display 130, the aggregated messaging UI 160 in response to a detected single input corresponding to a request from the user 120 to access the aggregated messaging UI 160 from an aggregated call log UI 180. For example, a user 120 can request to return from the aggregated call log UI 180 shown in FIG. 1F to the aggregated messaging UI 160 shown in FIGS. 1C-1E.

FIG. 2 provides more detail regarding the aggregated messaging UI of the communications-hub mode, including depicting more information concerning each of the message UI elements 167 and also showing that the aggregated messaging UI is scrollable to allow the user of the wrist-wearable device to scroll to view additional message UI elements 167 available within the aggregated messaging UI. In particular, FIG. 2 shows a detailed view of the aggregated messaging UI 160 and the different UI elements described in reference to FIGS. 1A-1F (e.g. the first through third message UI elements 167A-167C and the first through messaging application 165A-165C). In some embodiments, the data from the messages includes one or more of a contact's name (e.g., "Clive Cross"; i.e., a person receiving or sending a message), a portion of the message (e.g., a shown portion of the message 205 "Hey Buddy"), a graphical icon representing the messaging application 165 with which the messages was received or sent (e.g., a graphical icon showing a message with a cloud, lightning bolt, or conversation bubble), a textual description of a messaging application with which the message was received or sent (e.g., "Mobile" in element 205, a social media platform (or platform) application in element 276), and a textual and/or graphic indication as to a user account of the user of the wrist-wearable device that received or sent the message via a respective messaging application (e.g., "User Account 2" in element 276, "User Account 1" in element 277).

In some embodiments, sent and received messages are aggregated into a message UI element 167. For example, a message can include a first set of one or more messages received via a messaging application 165 (e.g., received message UI element 273), and a second set of one or more messages sent via the same or a different messaging application 165 (e.g., sent message UI element 275) that are aggregated into a single message UI element 167 (e.g., as shown by message UI element 233). As shown in FIG. 2, a message UI element corresponding to a conversation with "Kelly Silva" (e.g., message UI element 233) includes aggregated messages received and sent via a messaging application 165 associated with a fifth platform and associated with User Account 1 (as shown in message UI 270). In some embodiments, data could be aggregated from multiple user accounts from just one message application (e.g., the communications-hub mode can aggregate data from two or more user accounts associated with a first messaging application associated with a first social media platform).

In some embodiments, the data included in a respective message UI element includes a rich attachment that is displayed directly within the aggregated messaging UI 160. For example, in FIG. 2 the second message UI element 167B includes a rich attachment UI element 276. In some embodiments, the rich attachment includes one or more of a link (e.g., a URL, a shopping advertisement), a thumbnail, and an application launcher (e.g., a map application, a store application). In some embodiments, the rich attachment UI element 276 can be interacted with directly from the aggregated messaging UI 160. For example, the user 120 can select the rich attachment UI element 276 from the aggregated messaging UI 160, which causes the wrist-wearable device 110 to present data corresponding to the rich attachment UI element 276. Alternatively, in some embodiments the rich attachment UI element 276 is a UI element for a respective message within a message UI 270, which is individually interacted with via the message UI 270.

In some embodiments, user input selecting a rich attachment UI element 276 (e.g., user input 277) or input directly from the aggregated messaging UI 160 corresponds to a request from the user 120 to access a rich attachment UI element 276. In response to the request to access the rich attachment UI element 276, the wrist-wearable device 110 ceases to display the message UI 270 or the aggregated messaging UI 160, and displays, on its display 130, a UI corresponding to the rich attachment. Displaying the UI corresponding to the rich attachment includes displaying one or more of an application associated with the rich attachment (e.g., a social media application, a map application, a shopping application) and a webpage associated with the rich attachment (e.g., a web-based article, a web-based journal, a web-based shopping store). Alternatively, in some embodiments, in response to the request from the user 120 to access the rich attachment UI element 276, the wrist-wearable device 110 is granted access to a document, a server, and/or a database and the wrist-wearable device 110 displays to the user 120 UI including the document, the server, and/or the database. For example, a rich attachment UI element 276 can grant the user 120 access to a shared work platform that allows the user 120 to view and edit a document with other users, and selection of the rich attachment UI element 276 causes the wrist-wearable device 110 to present to the user 120 the document on the shared work platform.

In some embodiments, while displaying the aggregated messaging UI 160, the wrist-wearable device 110 detects an input from the user 120 wearing the wrist-wearable device 110, with such input corresponding to a request from the user 120 to access a message that is associated with a rich attachment (e.g., rich attachment 276). The wrist-wearable device 110, in response to detecting the input corresponding to the request from the user to access the message including the rich attachment, ceases to display the aggregated messaging UI 160 and displays, on the display of the wrist-wearable device 110, a UI for the messaging application (e.g., message UI 270 shown at the bottom of FIG. 2). Displaying the UI for the messaging application includes displaying (i) a respective UI element for each message of a first set of one or more messages received via the first messaging application and (ii) a rich-attachment UI element for a rich attachment associated with the message. For example, input 257 on a contact UI element for "Kelly Silva" (corresponding UI element 233) can cause the wrist-wearable device 110 to display the message UI 270, which includes a rich attachment UI element 276. The message UI 270 is discussed in detail below.

In some embodiments, the user 120 wearing the wrist-wearable device 110 has two or more different user accounts 609 for receiving messages via the first messaging application 165. In some embodiments, the aggregated messaging UI 160 also includes a message UI element 167 that includes at least part of a third message received via the first messaging application 165, the third message being sent to a first of the two different user accounts via the first messaging application and the first message being sent to a second of the two different user accounts via the first messaging application.

The aggregated messaging UI 160 can also be scrollable, such that a user initially views a first portion 160A of the aggregated messaging UI 160 and, in response to a scrolling input (e.g., an input that moves across the display 130 from a position at the bottom of the aggregated messaging UI 160 to a position at the top of the aggregated messaging UI 160), the aggregated messaging UI is scrolled to reveal at least part of the second portion 160B of the aggregated messaging UI and at least part of the first portion of the aggregated messaging UI 160 is ceased from being displayed on the display of the wrist-wearable device 110. In response to the scrolling input, the aggregated messaging UI 160 is scrolled to display the second portion 160B of the aggregated messaging UI 160 (e.g., line 213 can represent a screen size of a wrist-wearable device 110, in accordance with some embodiments). In some embodiments, a UI element for creating a new message 170A included in the first portion 160A of the aggregated messaging UI 160 is repositioned (as shown by repositioned UI element for creating a new message 170B) when the aggregated messaging UI 160 is adjusted (i.e., to display the second portion 160B of the aggregated messaging UI 160). The scrolling feature described above can be implemented in each UI described herein.

In some embodiments, the wrist-wearable device 110 displays, within the aggregated messaging UI 160, a UI element 170B for initiating the creation of a new message directly from the aggregated messaging UI 160. The wrist-wearable device 110, in response to detecting a selection of the UI element for creating a new message 170, ceases to display the aggregated messaging UI 160 and displays, on its display 130, an aggregated contacts UI 250. For example, the wrist-wearable device 110 can detect an input 225 to the UI element for creating a new message 170, which causes the aggregated contacts UI 250 to be displayed. Displaying the aggregated contacts UI 250 includes displaying a plurality of contacts UI elements 255 corresponding to a plurality of contacts associated with the one or more messaging applications 165. In some embodiments, the plurality of contacts is obtained from one or more user accounts 609 that are currently active (or enabled) on the wrist-wearable device 110. Alternatively, in some embodiments, a plurality of aggregated contacts UIs 250 are prepared and displayed, each aggregated contacts UI 250 including contacts for a particular messaging application 165. For example, a first aggregated contacts UI 250 can include one or more contacts associated with a first messaging application and a second aggregated contacts UI 250 can include one or more contacts associated with a second messaging application. Each aggregated contacts UIs 250 of the plurality of aggregated contacts UIs 250 can be presented, via the display 130, individually. In some embodiments, a user can switch between the plurality of aggregated contacts UIs 250 by providing a left-to-right (or right-to-left) swipe gesture across display 130.

In some embodiments, as discussed below in reference to FIGS. 6A-6C, in response to detecting a selection of the UI element for creating a new message 170, a processor of the wrist-wearable device 110 makes a determination as to whether more than one user account is active for the communications-hub mode. In accordance with a determination that one user account is active, the device 110 proceeds with initiating creation of the new message using the one user account that is currently active. In accordance with a determination that two different user accounts 609 are active (e.g., two user accounts for one messaging application or two user accounts for two different applications, or both), the wrist-wearable device 110 can then present selectable options to allow the user to select which of the active user accounts should be used in conjunction with initiating the creation of the new message. This is discussed in more detail below in reference to FIGS. 6A-6C.

After the determination above, the aggregated contacts UI 250 can be presented, and it can include a search UI element 260. The wrist-wearable device 110, in response to detecting selection of the search UI element 260, allows the user 120 to search for contacts associated with messaging applications on the wrist-wearable device 110 and/or contacts associated with one or more user accounts 609 that are currently active for the communications-hub mode on the wrist-wearable device 110. Additionally or alternatively, in some embodiments the request from the user 120 to access the search UI element 260 allows the user 120 to search one or more messages that were received and/or sent via the one or more messaging applications 165. In some embodiments, the aggregated contacts UI 250 includes a close UI element 230 (represented by an "X") that, when selected by the user 120, causes the wrist-wearable device 110 to cease displaying the aggregated contacts UI 250 and to switch back to displaying the aggregated messaging UI 160 if no contact was selected. Alternatively, if at least one contact is selected before the close UI element 230 is selected, the wrist-wearable device 110 will cease displaying the aggregated contacts UI 250 and display a message UI 270 corresponding to the selected contact (and user account associated with a respective messaging application). If a previous message thread exists, the wrist-wearable device 110 presents a message UI 270 corresponding to the existing thread. If a previous message thread does not exist, the wrist-wearable device 110 creates a new thread and a new message UI 270 for the selected contact.

Returning to the aggregated messaging UI 160 shown in FIG. 2, in some embodiments, while displaying the aggregated messaging UI 160, the wrist-wearable device 110 detects an input from the user 120 wearing the wrist-wearable device 110 to access a particular message. For example, the user 120 can provide an input corresponding to a request to access a message thread or conversation corresponding to the message UI element 233. In response to detecting the request from the user 120 to access the message, the wrist-wearable device 110 ceases displaying the aggregated messaging UI 160 and displays, on its display 130, a message UI 270. In some embodiments, the message UI 270 includes displaying a respective UI element for each message of a first set of one or more messages received via a messaging application 165 (e.g., received message UI element 273) and a respective UI element for each message of a second set of one or more messages sent via the messaging application (e.g., sent message UI element 275). In some embodiments, one or more messages of the first set of one or more messages received via the messaging application and/or one or more messages of the second set of one or more messages sent via the messaging application include rich attachments (e.g., rich attachment UI element 276).

In some embodiments, the user 120 can access a message UI 270 for a corresponding messaging application 165 (and user account 609 associated to the messaging application 165) via an input detected in a displayed aggregated contacts UI 250. For example, a detected input 257 selecting the contact UI element for "Kelly Silva" (corresponding contact UI element 233) causes the wrist-wearable device 110 to display the message UI 270 for the messaging application 165 through which the underlying message was received or sent. In some embodiments, the user 120 can select a header of the message UI 270, such as "Kelly Silva," which causes the wrist-wearable device 110 to display details of the thread (e.g., participants of the chat and each participant's associated account and messaging application 165 (represented by a graphical icon)).

In some embodiments, the respective UI elements for each message of the first set of one or more messages received via the messaging application is a first color and the respective UI elements for each message of the second set of one or more messages received via the messaging application is a second color. In some embodiments, the color of the respective UI elements is based on the user associated with the message of the first set or the second set of messages. In some embodiments, the colors for received messages and sent messages, respectively, are based on the messaging application 165. For example, a first messaging application 165 can have a first color for received messages (e.g., white) and a second color for sent messages (e.g., blue), and a second messaging application 165 can have the first color for received messages and a third color for sent messages (e.g., teal).

In some embodiments, the message UI 270 includes one or more UI elements that are configured to perform an action. The wrist-wearable device 110, while displaying the message UI 270, detects an input from the user 120 wearing the wrist-wearable device 110, the input corresponding to a request from the user 120 to perform an action. The wrist-wearable device 110, in response to detecting the request corresponding to the request from the user 120 to perform the action corresponding to a predetermined UI element, performs the action using the messaging application 165. The one or more UI elements that are configured to perform an action can include one or more of an audio capture UI element 278, an image capture UI element 279, a call-initiation UI element 280, one or more predetermined text inputs (represented by UI elements 281A and 281B), a keyboard display UI element 282, and a send location UI element 283.

As a nonlimiting example, in response to the wrist-wearable device 110 detecting a request from the user 120 to capture audio data (e.g., via the audio capture UI element 278), the wrist-wearable device 110 captures user audio data using microphone 1197 (FIG. 11) included in the wrist-wearable device 110. In some embodiments, the wrist-wearable device 110 transcribes the captured audio data. In some embodiments, the wrist-wearable device 110 sends, via the corresponding messaging application 165, one or more of the audio data, the audio data and the transcript, or only the transcript to one or more other users (e.g., to user Kelly Silva in the example depicted for message UI 270). In some embodiments, the user is prompted to select whether to send the audio data only, the audio data and the transcript, or only the transcript to one or more other users. Alternatively or additionally, in some embodiments the device 110 is configured to conduct a determination to assess quality of the captured audio data and to then determine whether to send the transcript based on that determination. In particular, in accordance with a determination that the captured audio data is of poor quality (e.g., inaudible, missing portions, or having too much background noise), the wrist-wearable device 110 can then send only the transcript to the one or more other users. On the other hand, in accordance with a determination that the captured audio data is not of poor quality, then the wrist-wearable device 110 can then send, via the corresponding messaging application 165, the audio data and the transcription together so receiving users know that the message was transcribed through audio data.

In response to the wrist-wearable device 110 detecting a request from the user 120 to capture image data (e.g., via the image capture UI element 279), the wrist-wearable device 110 captures user image data (e.g., video or images) using the wrist-wearable device 110's own imaging device 147. In some embodiments, the wrist-wearable device 110 also captures audio data using microphone 1197 included in the wrist-wearable device 110 in conjunction with the capturing of video data. In some embodiments, the wrist-wearable device 110 sends, via the corresponding messaging application 165, one or more of the image data, the image data and the audio data, and the image data and a transcript based on the audio data (with or without the audio data) to one or more other users.

In response to the wrist-wearable device 110 detecting a request from the user 120 to initiate a call (e.g., via the call-initiation UI element 280), the wrist-wearable device 110 sends, via the messaging application 165, a call-initiation request to one or more other users (that the user selected to initiate a call with). As discussed in detail below in reference to FIGS. 5A-6C, the user 120 can select one or more user accounts 609 associated with the messaging application 165 to initiate the call by selecting a respective contact number of the one or more other users to initiate a call with (if applicable) and/or selecting whether to initiate an audio or video call. In some embodiments, the user can switch between audio and/or video data while the call is ongoing.

In response to the wrist-wearable device 110 detecting a request from the user 120 to input a predetermined text message (represented by UI elements 281A and 281B), the wrist-wearable device 110 sends the predetermined text message associated with the predetermined text UI elements 281A and 281B. For example, the user 120 selecting the "Not bad" predetermined text UI element 281A causes the wrist-wearable device 110 to send, via the messaging application 165, "Not bad" to one or more other users. In some embodiments, the predetermined text is based on one or more messages in the message UI 270. In particular, machine-learning can be performed based on the content of messages in a message thread to determine an appropriate response for the user 120.

Alternatively, in some embodiments, in response to the wrist-wearable device 110 detecting a request from the user 120 to display a keyboard (e.g., keyboard display UI element 282), the wrist-wearable device 110 displays, on its display 130, a keyboard that can be used by the user 120 to prepare a response that is sent using a messaging application 165. In some embodiments, the request from the user 120 to display a keyboard causes the wrist-wearable device 110 to display a keyboard on another display associated with the wrist-wearable device 110 (e.g., a display on AR glasses 117 or computing device 115).

In response to the wrist-wearable device 110 detecting a request from the user 120 to send his or her location (e.g., via the send location UI element 283), the wrist-wearable device 110 sends, via the messaging application 165, his or her current location (determined using GPS 1116 or other similar devices) to one or more other users. This allows the user 120 to easily find and meet with his or her friends, colleagues, and/or other contacts.

While the message UI 270 shows a single recipient for the illustrated example of FIG. 2, the skilled artisan will appreciate that aspects of UIs shown in FIG. 2 can also be performed for message threads including multiple recipients (e.g., group messages).

In some embodiments, the aggregated messaging UI 160 provides an indication 249 to the user 120 that the aggregated call log UI 180 is available via another single input. The indication 249 is similar to indication 149 described above in FIGS. 1A-IF and is configured to guide the user 120 to additional data available to them.

FIG. 3 illustrates a guided human-machine interaction process based on detected user input in an aggregated call log UI while the communications-hub mode is active, in accordance with some embodiments. FIG. 3 shows an aggregated messaging UI 160, an aggregated call log UI 180, an aggregated contacts UI 250, a call option UI 350, a call-initiation UI 370, and ongoing call UIs 380A and 380B. In some embodiments, the wrist-wearable device 110 provides, via its display 130, the aggregated call log UI 180 in response to a detected input that moves between position 150C to position 150D (e.g., a left-to-right swipe gesture across display 130), with the detected input corresponding to a request from the user 120 to access the aggregated call log UI 180 from the aggregated messaging UI 160 as was described above in reference to FIGS. 1A-1E. In providing the aggregated call log UI 180, the wrist-wearable device 110 ceases to display the aggregated messaging UI 160 while continuing to remain in the communications-hub mode in which access to the aggregated UIs (contacts, messaging, and call log) is provided. The aggregated call log UI 180 displays to the user 120 one or more call UI elements 187 and voicemail UI elements 189 from one or more messaging applications 165 (and/or from user accounts enabled for use with the communications-hub mode, which user accounts are associated with one or more of the messaging applications) as described above in reference to FIGS. 1A-1F.

The aggregated call log UI 180 includes at least a first call UI element 187A that includes data from a first call received via a fourth messaging application 165D and a second call UI element 187B that includes data from a second call received via a fifth messaging application 165E included in the wrist-wearable device 110. In some embodiments, the aggregated call log UI 180 includes a voicemail UI element 189 that includes data from a voicemail received via a sixth messaging application 165F. In some embodiments, the call UI elements 187 and the voicemail UI elements 189 are presented to the user 120 in order (from top to bottom of the display 130) from the most recent calls or voicemails received and/or sent to the oldest calls or voicemails received and/or sent. In some embodiments, the data from the calls and voicemails includes UI elements for one or more of an icon associated with a messaging application 165 (which received the call or voicemail, or initiated the call), a textual description of the messaging application associated with the call log entry 309 (e.g., mobile 309A, social media platform 1 309B, user account 2), a caller's (or call recipient's) name (e.g., "Jake Erazo"), and an indication as to whether the call was an audio call, video call, or voicemail. The textual description of the messaging application associated with the call log entry 309 includes user account information similar to the user accounts 609 described in detail below in reference to FIGS. 6A-6C.

In some embodiments, each call UI element 187 is associated with a respective favorites UI element. The favorites UI element, when selected, causes an associated call UI element to be presented (or pinned) near the top of the aggregated call log UI 180 (or other aggregated UI described herein). For example, the first call UI element 187A is associated with a selected favorites UI element (e.g., solid heart UI element 377), which causes the first call UI element 187A to be presented at the top of the aggregated call log UI 180. An unselected favorites UI element is represented by a broken-line heart UI element 379.

In some embodiments, one or more calls (or voicemails) are aggregated into a single UI element 187 of the aggregated call log UI 180. For example, the aggregated call UI element 315 for "Ernie James" aggregates two calls from Ernie James as noted by the counter "(2)." The aggregated calls can be either video calls, audio calls or both. In some embodiments, calls (or voicemails) with data for the same contact are aggregated into an aggregated call UI element 315. For example, calls received from the same contact but from different messaging applications 165 can be combined into an aggregated call UI element 315. Alternatively, in some embodiments the calls need to be from the same contact and received by the same messaging application 165 to be combined into an aggregated call UI element 315. For example, calls received from the same contact via a first messaging application 165 are combined into an aggregated call UI element 315, but a call received from the same contact via a second messaging application is not combined with the calls received by the first messaging application 165. In some embodiments, calls from different user accounts associated with the same messaging application 165 to be combined into an aggregated call UI element 315. For example, calls received from a first and second user account that are each associated with a first messaging application 165 are combined into an aggregated call UI element, but a call received from the first user account and associated with a second messaging application is not combined with the calls received by the first messaging application 165. Alternatively, in some embodiments the calls need to be from the same contact and received by the same user account associated to be combined into an aggregated call UI element 315. For example, calls received from the same contact via a first user account that used in conjunction with a first and a second social media platform application 165 are combined into an aggregated call UI element, but a call received from the same contact via a second user account used in conjunction with the first or the second social media platform application is not combined with the calls received via the first user account. Although the examples provided above are for calls and/or voicemails received by the one or more messaging applications 165, message UI elements 167 can also be aggregated into an aggregated message UI element of the aggregated messaging UI 160 described herein. In some embodiments, the user defines how the different messages are aggregated.

In some embodiments, the aggregated call log UI 180 can also be scrollable, such that a user initially views a first portion 180A of the aggregated call log UI 180 and, in response to a scrolling input (e.g., an input that moves across the display 130 from a position at the bottom of the aggregated call log UI 180 to a position at the top of the aggregated call log UI 180), the aggregated call log UI 180 is scrolled to reveal at least part of second portion 180B of the aggregated call log UI 180 and at least part of the first portion 180A of the aggregated call log UI 180 is ceased from being displayed on the display of the wrist-wearable device 110. As described above in reference to FIG. 2, in some embodiments one or more UI elements are repositioned (e.g., as shown by repositioned UI element for UI element for initiating a new call 190B) when the aggregated call log UI 180 is adjusted.

In some embodiments, while displaying the aggregated call log UI 180, the wrist-wearable device 110 detects an input 325 from the user 120 wearing the wrist-wearable device 110, with such input 325 corresponding to a request from the user 120 to initiate a new call (e.g., user input 325 selecting the UI element for initiating a new call 190A). The wrist-wearable device 110, in response to the user's request to initiate the new call, guides the user to a call option UI 350 (discussed in detail below). In particular, in response to detecting the user's request to initiate the new call, the wrist-wearable device 110 ceases to display the aggregated call log UI 180 and displays, on its display 130, the call option UI 350. Displaying the call option UI 350 includes displaying one or more call option UI elements, such as a contacts access UI element 353 and a keypad access UI element 355. In some embodiments, in response to detecting a user input selecting the keypad access UI element 355, the wrist-wearable device 110 presents a keypad that allows the user 120 to enter a phone number or account identifier of one or more other users that the user 120 would like to call via a messaging application 165. In response to detecting a user input 357 selecting the contacts access UI element 353, the wrist-wearable device 110 ceases to display the call option UI 350 and displays, on its display 130, the aggregated contacts UI 250 (described above in reference to FIG. 2) as shown in the sequence of UIs depicted in FIG. 3.

Alternatively, in some embodiments a user can access the aggregated contacts UI 250 from the aggregated call log UI 180 in response to a detected gesture (e.g., a long press on the UI element for initiating a new call 190). More specifically, in some embodiments, while displaying the aggregated call log UI 180, the wrist-wearable device 110 detects a gesture from the user 120 on the UI element for initiating a new call 190 and, in response to detecting the gesture, the wrist-wearable device 110 ceases to display the aggregated call log UI 180 and displays, on its display 130, the aggregated contacts UI 250.

In some embodiments, the user 120 initiates a call at the wrist-wearable device 110 using one or more call UI elements 187 and one or more voicemail UI elements 189. In particular, while displaying the aggregated call log UI 180, the wrist-wearable device 110 detects a selection of a call UI elements 187 or a voicemail UI element 189, and, in response to detecting the selection, initiates a call via the corresponding messaging application 165 (or retrieves the corresponding voicemail, as appropriate depending on whether a voicemail UI element 189 was selected). In this way, the wrist-wearable device 110 provides a guided or sustained human-machine interaction that allows the user 120 to quickly initiate calls from within the aggregated call log UI 180 of the communications-hub mode, such that the user 120 does not need to separately open up a messaging application 165 to initiate the call but can instead initiate the call directly from within the communications-hub mode. As described above in reference to FIGS. 1A-1J, in some embodiments one or more messaging applications 165 for sending and/or receiving one or more messages are the same as the messaging applications for receiving and/or initiating calls and/or receiving voicemails. For example, a first messaging application for sending and receiving one or more messages can also be used to receive one or more calls and voicemails and initiate one or more calls.

In some embodiments, while displaying the aggregated call log UI 180, the wrist-wearable device 110 detects an input 327 from the user 120 wearing the wrist-wearable device 110, the input 327 corresponding to a request from the user 120 to call the contact associated with call UI element 315. In some embodiments, the user 120 can request to call a group of other users and/or join (i.e., merge) multiple calls via the wrist-wearable device 110. The wrist-wearable device 110, in response to detecting the input 327, ceases displaying the aggregated call log UI 180 and displays the call-initiation UI 370. In some embodiments, the wrist-wearable device 110 detects user input at an aggregated UI element (e.g., aggregated call UI element 315) for another user including at least two calls and, in response to detecting the user input, presents at the wrist-wearable device 110 selectable options for initiating a video call or initiating an audio call to the same other user. For example, input 327 selecting contact "Ernie James" results in the display of call-initiation UI 370 corresponding to "Ernie James" to choose between a video call or an audio call.

The call-initiation UI 370 can also be presented in response to input at the aggregated contacts UI 250, an example of which is also shown in FIG. 3 and described in detail above in reference to FIG. 2. In particular, in some embodiments the wrist-wearable device 110 displays the call-initiation UI 370 in response to detection of a user input 367 requesting to call a contact (e.g., Ernie James UI element 363) from within the aggregated contacts UI 250 while the aggregated contacts UI 250 is displayed. The call-initiation UI 370 is discussed in detail below.

Alternatively, in some embodiments the wrist-wearable device 110, in response to detecting a user input requesting to call a contact in the aggregated contacts UI 250 or the aggregated call log UI 180, transmits a call-initiation request to the corresponding contact without displaying the call-initiation UI 370. In other words, in some embodiments the wrist-wearable device 110 automatically initiates a call when a contact in the aggregated contacts UI 250 or the aggregated call log UI 180 is selected. In some embodiments, the call is initiated using the same messaging application 165 that is associated with the underlying call. For example, if the contact called the user 120 via a first messaging application, the call initiated by the user 120 would be initiated using the first messaging application. The initiated call can be an audio call or a video call. Additional detail on the call initiation process is provided below in reference to FIGS. 5A and 5B.

In some embodiments, the call-initiation UI 370 includes one or more UI elements, such as a video call-initiation UI element 373 and a voice/audio call-initiation UI element 375. In some embodiments, the wrist-wearable device 110, in response to detecting a user input selecting the video call-initiation UI element 373, initiates a video call with the corresponding contact (i.e., contact the user 120 selected to initiate a call with; e.g., "Ernie James"). In some embodiments, the wrist-wearable device 110, in response to detecting a user input selecting the voice/audio call-initiation UI element 375, initiates an audio call with the corresponding contact.

The wrist-wearable device 110, in response to detecting a user input selecting either the video call-initiation UI element 373 or the voice/audio call-initiation UI element 375, ceases displaying the call-initiation UI 370 and displays, on its display 130, the ongoing call UI 380. The ongoing call UI 380 displays data corresponding to the contact selected by the user 120 to call and one or more additional UI elements, such as a mute UI element 383 and an end call UI element 385. In some embodiments, the ongoing call UI 380 notifies the user 120 whether the call has been connected or whether the wrist-wearable device 110 is attempting to connect. For example, as shown in a first ongoing call UI 380A, while the wrist-wearable device 110 is attempting to connect with a selected contact, the wrist-wearable device 110 can display an indication that the contact is being called. In some embodiments, as shown in the second ongoing call UI 380B, the mute UI element 383 and the end call UI element 385 can be minimized or hidden to allow the user 120 full visibility of the display. In some embodiments, the wrist-wearable device 110 shows the mute UI element 383 and the end call UI element 385 in response to detected user input at the display 130. As discussed in further detail below, the audio and/or video call can be performed using an imaging device 147, a microphone 1197, a speaker 1195, and/or the display 130 included in the wrist-wearable device 110.

FIGS. 4A-4D illustrate variations of UI (e.g., call UI elements 187, FIG. 1F) that can be displayed in the aggregated call log UI, in accordance with some embodiments. FIG. 4A shows example variations of data included in call UI elements 187 corresponding to inbound missed calls (i.e., unanswered calls received by one or more messaging applications 165 (represented by the "X" mark) included in the wrist-wearable device 110 and/or portable device 113, FIGS. 1A-1J). In some embodiments, a first missed call UI element 401 represents a missed call at a messaging application 165 and can include the data corresponding to the first missed call UI element 401, such as contact information (e.g., "Jake Erazo" in element 401), a graphical icon representing the messaging application with which the call was received (e.g., graphical icon showing a phone in element 401), a textual description of the messaging application with which the call was received (e.g., "Mobile" in element 401), and a textual and/or graphic indication as to a user account of the user of the wrist-wearable device that received the call via a respective messaging application (e.g., "User Account 1" in element 405). In some embodiments, a second missed call UI element 403 represents a missed call at a messaging application 165 and the data corresponding to the second missed call UI element 403 includes contact information for an unknown caller (e.g., phone number or account information for an unknown caller) and location of the unknown caller (e.g., caller is from "San Francisco"). In some embodiments, a third missed call UI element 407 represents a missed call at a messaging application 165 and the data corresponding to the third missed call UI element 407 includes contact information (e.g., "Jake Erazo") and a messaging application and a user account associated with the contact of the messaging application (e.g., "Social media platform 1" and "User Account 2"). Each of the first, second and third missed call UI elements 401, 403, and 405 represent a missed audio call. Similarly, respective missed call UI elements can be used to represent missed video calls. For example, a fourth, fifth, and sixth missed call UI elements 407, 409, and 411 each represent a missed video call from one or more messaging applications 165 associated with the respective contact (and user account). The one or more messaging applications 165 can be the same or distinct messaging applications 165. In some embodiments, the missed call UI elements are visually distinct from inbound answered call UI elements, outgoing call UI elements, and voicemail UI elements, such that the user can easily distinguish between different call UI elements.

FIG. 4B shows additional examples of variations of call UI elements 187 corresponding to inbound answered calls (i.e., answered calls received by one or more messaging applications 165 included in the wrist-wearable device 110, FIGS. 1A-1J). The answered call UI elements (e.g., first through sixth answered call UI elements 413-423) represents an answered call (represented by a checkmark) at a messaging application 165 and can include data similar to the missed call UI elements 401-411. For example, fourth answered call UI element 419 includes contact information (e.g., "Jake Erazo" in element 419), a graphical icon representing the messaging application with which the call was received (e.g., graphical icon showing a phone in element 419), a textual description of the messaging application with which the call was received (e.g., "Social media platform 1" in element 419), and a textual and/or graphic indication as to a user account of the user of the wrist-wearable device that received the call via the messaging application (e.g., "User Account 2" in element 419). Each of the first, second and third answered call UI elements 413, 415, and 417 represent an answered audio call. Similarly, respective missed call UI elements can be used to represent missed video calls. For example, a fourth, fifth, and sixth answered call UI elements 419, 421, and 423 each represent an answered video call from one or more messaging applications 165 associated with the respective contact (and user account). The one or more messaging applications 165 can be the same or distinct messaging applications 165. In some embodiments, the missed call UI elements are visually distinct from inbound answered call UI elements, outgoing call UI elements, and voicemail UI elements, such that the user can easily distinguish between different call UI elements.

FIG. 4C shows example variations of call UI elements 187 corresponding to outbound calls (i.e., calls initiated (or performed) from a messaging application 165 included in the wrist-wearable device 110 or portable device 115; FIGS. 1A-1J). The outgoing call UI elements (e.g., first through fourth outgoing call UI elements 425-431) represent an outgoing call UI element (represented by an arrow pointing away from a graphical icon representing the messaging application) from a messaging application 165. The outgoing call UI elements can include data similar to the missed call UI elements 401-411. For example, a second outgoing call UI element 427 includes contact information (e.g., "Jake Erazo" in element 727), a graphical icon representing the messaging application with which the call was received (e.g., a graphical icon showing a phone in element 427), a textual description of the messaging application with which the call was performed (e.g., "Social media platform 3" in element 427), and a textual and/or graphic indication as to a user account of the user of the wrist-wearable device that initiated the call via the messaging application (e.g., "User Account 2" in element 427). Each of the first and second outgoing call UI elements 425 and 427 represent an outgoing audio call. Similarly, respective outgoing call UI elements can be used to represent outgoing video calls. For example, a third and fourth outgoing call UI element 429 and 431 each represent an outgoing video call from a messaging application (and associated user account). In some embodiments, the outgoing call UI elements are visually distinct from inbound missed call UI elements, inbound answered call UI elements, and voicemail UI elements, such that the user can easily distinguish between different call UI elements.

FIG. 4D shows example variations of voicemail UI elements 189 from a messaging application 165 in the wrist-wearable device 110 (FIGS. 1A-1J). In some embodiments, a first voicemail call UI element 433 represents an audio voicemail from a messaging application 165 and a second voicemail call UI element 435 represents a video voicemail from the messaging application 165. The data corresponding to the first voicemail call UI element 433 and the second voicemail call UI element 435 can include contact information that provided the voicemail to the messaging application 165 (and the associated user account). In some embodiments, the voicemail call UI elements are visually distinct from inbound missed call UI elements, inbound answered call UI elements, and the outgoing UI elements, such that the user can easily distinguish between different call UI elements.

FIGS. 5A and 5B illustrate guided human-machine interaction processes for returning video and audio calls received from a single contact using more than one contact form (e.g., more than one contact number for the single contact or more than one communication medium), in accordance with some embodiments. In particular, FIG. 5A illustrates an example process for returning an audio call and FIG. 5B illustrates an example process for returning a video call. The wrist-wearable device 110 includes a microphone 1197, a speaker 1195, a display 130, and an imaging device 147 (FIG. 11), which are used by the wrist-wearable device 110 to present, to the user, audio data and video data received from another electronic device communicatively coupled to the wrist-wearable device 110, capture audio data and/or video data from the user, and send the captured audio data and/or video data to the other electronic device.

FIG. 5A shows the display 130 of the wrist-wearable device 110 presenting one or more of an aggregated call log UI 180, an aggregated phone number UI 530, and an ongoing call UI 380. In some embodiments, while displaying the aggregated call log UI 180, the wrist-wearable device 110 detects an input 525 from the user wearing the wrist-wearable device 110, the input 525 corresponding to a request from the user 120 (FIGS. 1A-1J) to call one or more other users (e.g., selection of call UI element 587A (similar to call UI elements 187 described above)). In some embodiments, one or more calls (or voicemails) are aggregated into a single UI element 587 of the aggregated call log UI 180. For example, the aggregated call UI element 587A for "Jake Erazo" aggregates two calls from Ernie James as noted by the counter "(2)." The aggregated calls can be either video calls, audio calls, or both. In some embodiments, calls from different messaging applications and/or different accounts corresponding to the same contact are aggregated.

The wrist-wearable device 110, in response to detecting the request from the user 120 to call one or more other users, transmits a call-initiation request to the selected one or more other users via a messaging application 165 (e.g., using the same messaging application 165 corresponding to the other users and/or using a user account 609 (FIGS. 6A-6C) associated with the messaging application 165 (and/or the one or more other users)). For example, in some embodiments the call UI element 587 corresponds to a call from a first other user (or contact) using a first messaging application 165, and selection of the call UI element 587A causes the wrist-wearable device 110 to transmit a call-initiation request to the first other user (or contact) using the first messaging application 165. In this way, the wrist-wearable device 110 provides a guided and/or sustained human-machine interaction such that the user 120 does not need to open a particular messaging application 165 to initiate the call.

In some embodiments, the ongoing call UI 380 includes a message indicating that the wrist-wearable device 110 is attempting to establish a connection (e.g., calling). In some embodiments, the ongoing call UI 380 includes a message indicating that the wrist-wearable device 110 has established a connection (e.g., connected). Alternatively, in some embodiments the ongoing call UI 380 displays contact data (e.g., Jake Erazo) when the wrist-wearable device 110 has established a connection. In some embodiments, the ongoing call UI 380 includes one or more additional UI elements, such as a mute UI element 383 and an end call UI element 385. The mute UI element 383, when selected by the user 120, disables the microphone 1197 such that audio data from the user 120 is not captured. Selection of the mute UI element 383 a subsequent time by the user 120 enables the microphone 1197 such that audio data from the user 120 is captured. The end call UI element 385 when selected by the user 120 ends the call.

In some embodiments, the wrist-wearable device 110 automatically calls the selected contacts via the messaging application 165 and displays, via the display 130, the ongoing call UI 380. In some embodiments, the wrist-wearable device 110 automatically initiates the call in response to a request from the user to return a call (which cause the wrist-wearable device 110 to automatically return the most recently received call). Alternatively, in some embodiments a contact associated to the call UI element 587 is associated with two or more contact numbers or user accounts, and the wrist-wearable device 110, before transmitting a call-initiation request to the contact associated to the call UI element 587, displays the aggregated phone number UI 530. The aggregated phone number UI 530 includes one or more UI elements corresponding to one or more phone numbers of the respective contacts numbers. The wrist-wearable device 110, in response to detecting the request from the user to call a particular phone number of the respective contacts numbers (e.g., "1 (650) 555-5555"), transmits a call-initiation request to the particular phone numbers of the respective contacts numbers, and presents the ongoing call UI 380 as described above. In some embodiments, the aggregated phone number UI 530 is presented based on user preferences. More specifically, the aggregated phone number UI 530 is configurable such that the wrist-wearable device 110 user can decide whether to toggle on or off the aggregated phone number UI 530 for choosing which contact to use for returning calls or to automatically return calls using the contact that was most recently used.

FIG. 5B shows the display 130 of the wrist-wearable device 110 presenting one or more of an aggregated call log UI 180, a call-initiation UI 560 (similar to the call-initiation UI 370 (FIG. 3)), and an ongoing video call UI 580. In some embodiments, while displaying the aggregated call log UI 180, the wrist-wearable device 110 detects an input 555 from the user wearing the wrist-wearable device 110, the input 555 corresponding to a request from the user 120 to call one or more other users (e.g., selection of call UI element 587A (similar to call UI elements 187 described above)). The wrist-wearable device 110, in response to detecting the request from the user to call the one or more other users and before transmitting the call-initiation request to one or more other users via the messaging application 165, displays, on its display 130, the call-initiation UI 560.

In some embodiments, the wrist-wearable device 110 automatically calls the selected contacts via the messaging application 165 (e.g., as shown in the ongoing video call UI 580). As described above, in some embodiments the wrist-wearable device 110 automatically initiates the call in response to a request from the user to return a call (which causes the wrist-wearable device 110 to automatically return the most recently received call). Alternatively, in some embodiments the wrist-wearable device 110 displays the call-initiation UI 560, which allows a user to select what type of call should be initiated. In some embodiments, the call-initiation UI 560 includes one or more UI elements corresponding to at least a video call UI 565 and a voice call UI 563. In some embodiments, in response to detecting user input selecting the voice call UI element 563, the wrist-wearable device 110 transmits a voice call-initiation request to the one or more other users via the messaging application 165 (e.g., using the same messaging application 165 corresponding to the other users and/or using a user account 609 (FIGS. 6A-6C) associated with the messaging application 165 (and/or the one or more other users)), and displays the ongoing call UI 380. In some embodiments, in response to detecting user input 567 selecting the video call UI element 565, the wrist-wearable device 110 transmits a video call-initiation request to the one or more other users via the messaging application 165 and displays the ongoing video call UI 580. Similar to the aggregated phone number UI 530, the call-initiation UI 560 is presented based on user preferences. In other words, the call-initiation UI 560 is configurable such that the wrist-wearable device 110 user can decide whether to toggle on or off the call-initiation UI 560 for choosing the type of call that should be made.

In some embodiments, the ongoing video call UI 580 includes a message indicating that the wrist-wearable device 110 is attempting to establish a connection (e.g., video calling). In some embodiments, the ongoing video call UI 580 includes a message indicating that the wrist-wearable device 110 has established a video connection (e.g., connected). Alternatively, in some embodiments the ongoing video call UI 580 displays contact data (e.g., Russ C.) and video data when the wrist-wearable device 110 has established a connection. Additionally, in some embodiments, the ongoing video call UI 580 includes a representation of image data captured by the wrist-wearable device or other user device that allows for a picture-in-picture video call (e.g., as shown by user image data capture 589). In some embodiments, the ongoing video call UI 580 includes one or more additional UI elements, such as the mute UI element 383, an end call user UI 385, and an imaging device disable UI element 583. The imaging device disable UI element 583, when selected by the user, disables the imaging device 147 such that the video data from the user is not captured. In some embodiments, the wrist-wearable device 110 continues to capture audio data while the imaging device 147 is disabled. Selection of the imaging device disable UI element 583 a subsequent time by the user 120 enables the imaging device 147 such that video data from the user 120 is captured.

Figure 6A:
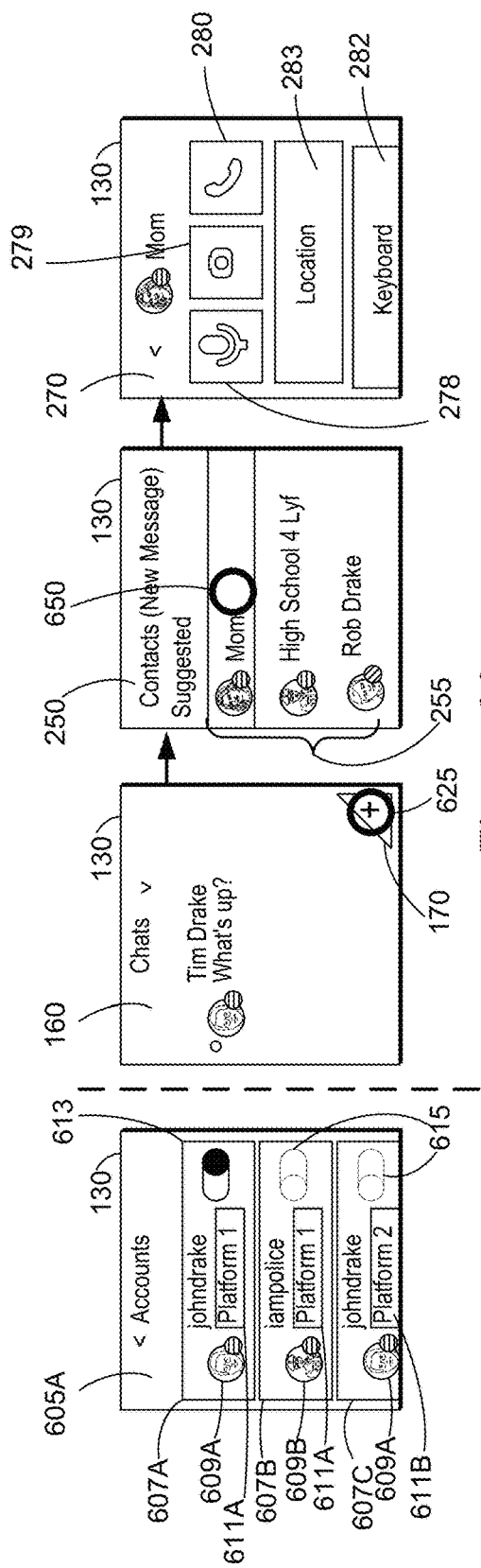
FIGS. 6A-6C illustrate a guided human-machine interaction process for enabling and disabling various user accounts associated with different messaging applications for use with the communications-hub mode, according to some embodiments.
Figure 6B:
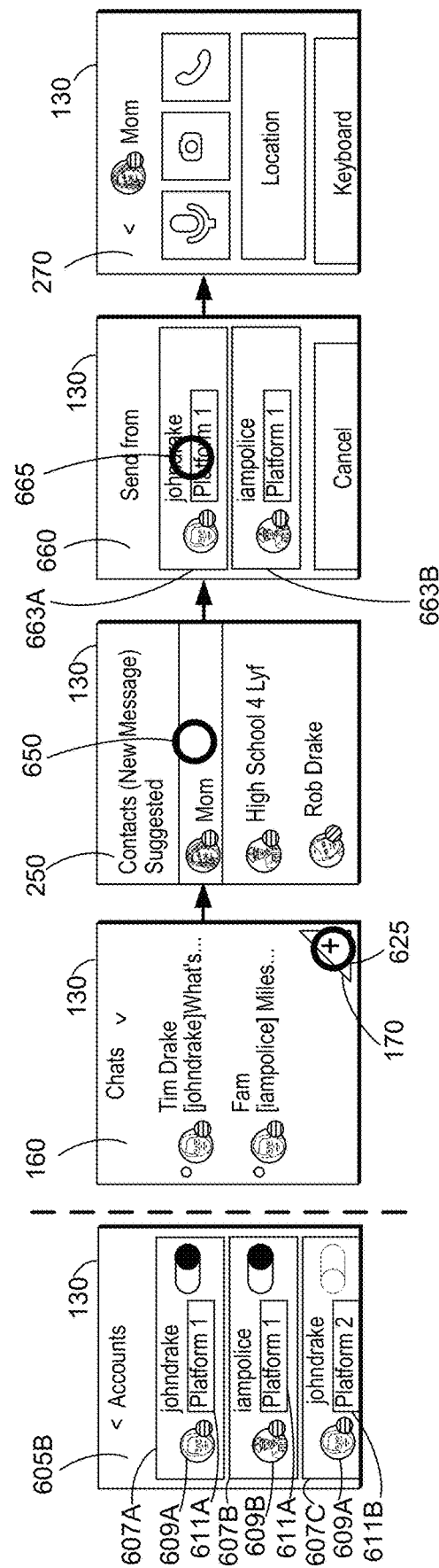
Figure 6C:
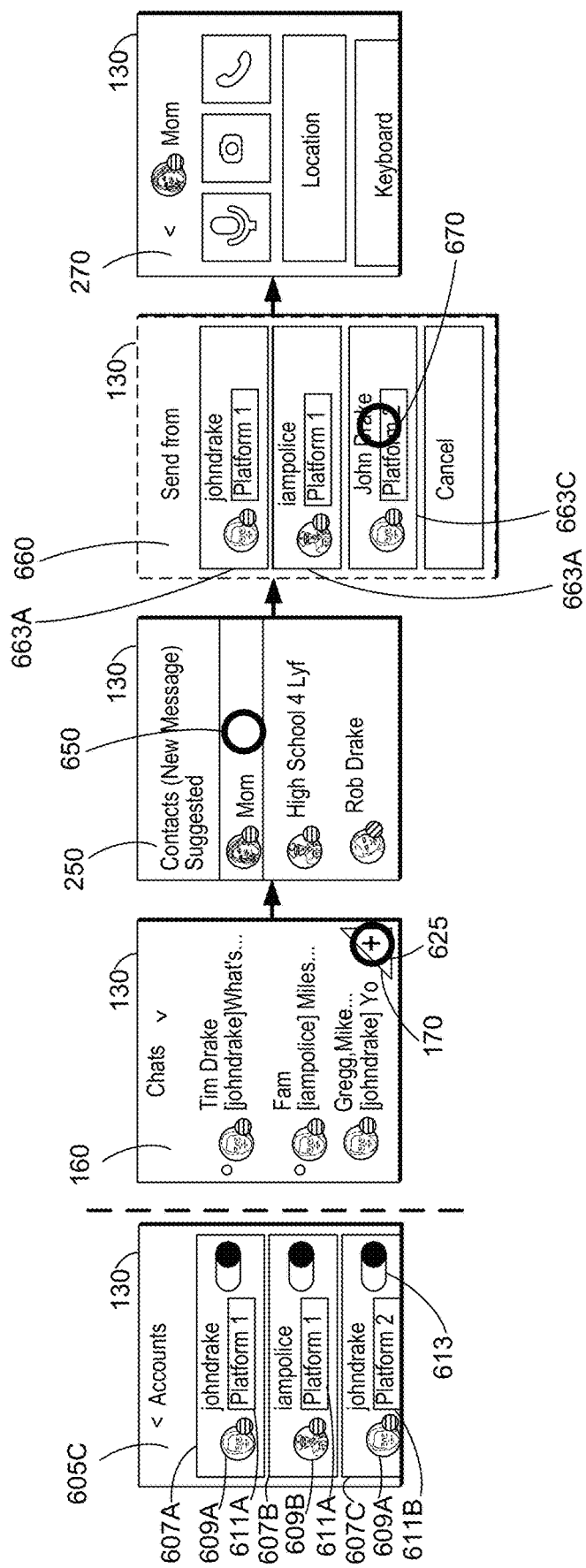

FIGS. 6A-6C illustrate a guided human-machine interaction process for enabling and disabling various user accounts associated with different messaging applications for use with the communications-hub mode, according to some embodiments. FIGS. 6A-6C show a user-account-configuration UI 605, an aggregated messaging UI 160, an aggregated contacts UI 250, an aggregated user account UI 660, and a message UI 270. Each of the UIs are displayed on a display 130 of the wrist-wearable device 110 (FIGS. 1A-1F) or a portable device 113 (FIGS. 1G-1J).

Turning to FIG. 6A, the user-account-configuration UI 605A includes one or more available user accounts 609 (e.g., available user accounts are ones that the user of the wrist-wearable device has provided credentials for (e.g., at an associated computing device or directly via the wrist-wearable device) such that the wrist-wearable device is able to retrieve the message data associated with the available user accounts once those user accounts are activated/enabled on the wrist-wearable device). In some embodiments, the one or more user accounts 609 are associated with one or more messaging applications 165 available on the wrist-wearable device 110.

In some embodiments, the one or more user accounts 609 are associated via a two-step process. The two-step process can include, when a user 120 sets up the wrist-wearable device 110 for the first time, requesting the user 120 to access an application associated with the wrist-wearable device 110 on another device (e.g., a phone, laptop), and requesting the user 120 to login to the application associated with the wrist-wearable device 110 using one or more user accounts 609 that they wish to associate with the wrist-wearable device 110. If the user 120 does not have a user account 609 already associated with the application associated with the wrist-wearable device 110, the user 120 is prompted to associate an existing user account 609 or create a new user account 609. In some embodiments, the user 120 associates a centralized user account 609 that is further associated with a number of additional user accounts 609, the centralized user account 609 providing the wrist-wearable device 110 with access to each user account 609 associated with the centralized user account 609. For example, a user 120 can have a centralized Facebook user account that is associated with a number of other applications and/or user accounts (e.g., an Instagram account, an Oculus account, a Messenger account). After the user 120 has associated at least one user account 609 to the application associated with the wrist-wearable device 110, each associated user account 609 will appear on the wrist-wearable device 110. In some embodiments, the user 120 associates the user account 609 by providing account login credentials (e.g., username and password), scanning a QR code, providing a one-time password, and/or other methods known in the art. In some embodiments, the user 120 can select one or more user accounts 609 (that have been associated with the wrist-wearable device 110 as described above) to associate with one or more messaging applications 165 or other applications included in the wrist-wearable device 110. In some embodiments, the user 120 can update or add additional user accounts 609 via the application associated with the wrist-wearable device 110. Alternatively, in some embodiments the login process includes displaying, via the display 130 of the wrist-wearable device 110, a prompt requesting from the user 120, for each user account 609 to be associated with the wrist-wearable device 110, to provide account login credentials, scan a QR code, input a one-time password, etc.

In some embodiments, each user account 609 is used to access one or more of a social media platform 611, computing device 115 (e.g., mobile device network), email accounts, VOIP applications, text messaging applications, and/or other communication-based applications. For example, a first user account UI element 607A corresponds to a first user account 609A, and the first user account 609A is associated with a first social media platform 611A; a second user account UI element 607B corresponds to a second user account 609B, and the second user account 609B is associated with the first social media platform 611A; and a third user account UI element 607C corresponds to the first user account 609A, and the first user account 609A is associated with a second social media platform 611B. In some embodiments, one user account 609 can be used to access at least two (e.g., is a single-sign-on account to allow access to more than one platform or application) social media platform accounts, webpage accounts, email accounts, instant messaging accounts, phone provider accounts, and/or other communication-based applications. For example, FIG. 6A shows that a user account "johndrake" is used to access both "Platform 1" and "Platform 2."

One or more user accounts 609 associated with the wrist-wearable device 110 can be active at the same time. In some embodiments, up to a predetermined number of accounts (e.g., five accounts, six accounts) can be active at the same time. For example, in some embodiments the wrist-wearable device 110 can have up to five accounts active at the same time. In some embodiments, the predetermined number of accounts that can be active at the same time depends on the amount of memory (storage 1102, RAM 1103, or memory 1150 (FIG. 11), or a combination of these memory sources) at the wrist-wearable device 110. In some embodiments, individual accounts 609 can be toggled between active and inactive (also referred to herein as enabled and disabled). In some embodiments, the one or more accounts 609 can be selectively activated or disabled for one or more messaging applications 165. For example, the user-account-configuration UI 605A has the first user account 609A corresponding to the first social media platform 611A active (identified by active toggle UI element 613), the second user account 609B corresponding to the first social media platform 611A disabled, and the first user account 609A corresponding to the second social media platform 611B disabled (identified by disabled toggle UI element 615). Additional information on activating and disabling the one or more user accounts 609 is described below in reference to FIGS. 8A-8E.

In FIG. 6A, only the first user account 609A is active, which would then be the only user account used in conjunction with the communications-hub mode described herein (e.g., messaging, calls, and contacts data for the first user account 609A is used as the source of data displayed within the aggregated UIs of the communications-hub mode). For example, while the aggregated messaging UI 160 is displayed in the example of FIG. 6A, data presented in that aggregated messaging UI 160 is retrieved only for the active first user account 609A and not for the user accounts that are disabled. Additionally, FIG. 6A shows that the wrist-wearable device 110 detects an input 625 from the user 120 wearing the wrist-wearable device 110, with the input 625 corresponding to a request to compose a new message (e.g., selection of the UI element for creating a new message 170). In response to the detection of the input 625, the wrist-wearable device 110 ceases to display the aggregated messaging UI 160 and displays an aggregated contacts UI 250. The data displayed in the aggregated contacts UI 250 is based on data associated with the currently active first user account 609A only, and contacts that might be associated with other user accounts (ones that are currently not active or are disabled) would not be displayed in the aggregated contacts UI 250.

While the aggregated contacts UI 250 is displayed, the wrist-wearable device 110 detects an input 650 from the user 120 wearing the wrist-wearable device 110, with the input 650 corresponding to a request to select a contact (e.g., "mom"). In response to detecting the input 650, the wrist-wearable device 110 ceases to display the aggregated contacts UI 250 and displays the message UI 270 for a messaging application 165, the messaging application 165 corresponding to the first user account 609A, which is associated with the first social media platform 611A. In this example, because only the first user account 609A is active, the wrist-wearable device 110 automatically displays the message UI 270 for a respective messaging application 165 associated with a first social media platform 611A to receive and/or send messages, receive and/or initiate calls, and/or receive voicemails via the first social media platform 611A ("Platform 1") associated with the first user account 609A.

As described above in reference to FIG. 2, the message UI 270 includes one or more UI elements that are configured to perform an action, such as an audio capture UI element 278, an image capture UI element 279, a call-initiation UI element 280, a keyboard display UI element 282, and a send location UI element 283. In some embodiments, the message UI 270 does not include one or more predetermined text inputs for new message threads. Alternatively, in some embodiments the message UI 270 includes one or more predetermined text inputs such as a greeting (e.g., hello, hi, how have you been?) or only displays those predetermined text inputs after the user scrolls further down to reveal those predetermined text inputs.

In FIG. 6B, the user-account-configuration UI 605B shows the first user account 609A and the second user account 609B as being active, both of which are associated with the first social media platform 611A (identified by active toggle UI element 613), and the first user account 609A, which is associated with the second social media platform 611B, as being disabled (identified by inactive toggle UI element 615). In response to the second user account 609B becoming active, the wrist-wearable device 110 updates the entire communications-hub mode such that messages (or calls) associated with the enabled user account 609 (and disabled user accounts 609) are included or removed from the aggregated messaging UI 160 (and/or other UIs described herein). For example, in FIG. 6B, in response to the second user account 609B becoming active, the communications-hub mode is updated to show messages associated with the second user account 609B (e.g., "Fam" thread associated with the "iampolice" user account is included in the aggregated messaging UI 160, which was not previously included in the aggregated messaging UI 160 when disabled as shown in FIG. 6A). Alternatively, the reverse also occurs as user accounts are disabled. For example, in response to disabling the iampolice account, the aggregated messaging UI, aggregated call log UI, and aggregated contacts UIs would then be updated to remove data for the newly disabled iampolice user account. Thus, the communications-hub mode efficiently allows for guiding access to only those user accounts that have been enabled and it is also dynamically updated as user accounts are enabled and disabled at the wrist-wearable device 110.

The wrist-wearable device 110, in response to detecting, via the displayed aggregated messaging UI 160, an input 625 from the user 120 wearing the wrist-wearable device 110 corresponding to a request to compose a new message (e.g., selection of the UI element for creating a new message 170) and subsequently detecting, via the displayed aggregated contacts UI 250, an input 650 from the user 120 wearing the wrist-wearable device 110 corresponding to a request to select a contact (e.g., "mom"), displays, on its display 130, the aggregated user account UI 660. The aggregated user account UI 660 includes one or more active user accounts 609. More specifically, one or more user account selection UI elements 663 for each active user account 609 is displayed in the aggregated user account UI 660. For example, in FIG. 6B a first user account selection UI element 663A for the first user account 609A and a second user account selection UI element 663B for the second user account 609B are included in the aggregated user account UI 660. Each user account 609 in the aggregated user account UI 660 is configured to transmit a message (or, in the case of a call, transmit a call-initiation request).

While displaying the aggregated user account UI, the wrist-wearable device 110 detects another input 665 from the user 120 wearing the wrist-wearable device 110, the other input 665 corresponding to a request from the user 120 to select one of the user accounts 609, at which point the wrist-wearable device 110 ceases to display the aggregated user account UI 660 and displays the message UI 270 corresponding to the selected user account 609. The user 120 can perform one or more actions in the message UI 270 as described above in reference to FIG. 2. Although the above example presents the aggregated user account UI 660 after selection of a contact in the aggregated contacts UI 250, in some embodiments the aggregated user account UI 660 is presented before the user selects a contact from the aggregated contacts UI 250.

Alternatively, in some embodiments the wrist-wearable device 110, in response to detecting, via the displayed aggregated messaging UI 160, selection (e.g., input 625) of the UI element for creating a new message 170, in accordance with a determination that the two different user accounts (e.g., first user account 609A and second user account 609B) for receiving messages via the first messaging application 165 are enabled on the wrist-wearable device 110, presents a first selectable option that, when selected, causes the wrist-wearable device 110 to initiate the creation of a message to be sent using the first of the two different user accounts 609A and a second selectable option that, when selected, causes the wrist-wearable device 110 to initiate the creation of a message to be sent using the second of the two different user accounts 609B. More specifically, in some embodiments the user 120 can select a user account 609 for a messaging application to compose a message before selecting a contact.

In FIG. 6C, the user-account-configuration UI 605C shows the first user account 609A as being active for the first social media platform 611A and active for the second social media platform 611B (identified by active toggle UI element 613), and the second user account 609B as being active for the first social media platform 611A. As described above, in response to enabling the "johndrake" user account (for a second social media platform 611B), the aggregated messaging UI, aggregated call log UI, and aggregated contacts UIs are updated to include data for the newly enabled "johndrake" user account.

The wrist-wearable device 110, in response to detecting, via the displayed aggregated messaging UI 160, an input 625 from the user 120 wearing the wrist-wearable device 110 corresponding to a request to compose a new message (e.g., selection of the UI element for creating a new message 170) and subsequently detecting, via the displayed aggregated contacts UI 250, an input 650 from the user 120 wearing the wrist-wearable device 110 corresponding to a request to select a contact (e.g., "mom"), displays, on its display 130, the aggregated user account UI 660. The aggregated user account UI 660 includes one or more active user accounts 609. For example, in FIG. 6C a first user account selection UI element 663A for the first user account 609A, a second user account selection UI element 663B for the second user account 609B, and a third user account selection UI element 663C for the first user account 609C are included in the aggregated user account UI 660. Each user account 609 in the aggregated user account UI 660 is configured to transmit a message (or, in the case of a call, transmit a call-initiation request). In some embodiments, the aggregated user account UI 660 is optional and may not be shown if a user only has one account.

While displaying the aggregated user account UI, the wrist-wearable device 110 detects another input 670 from the user 120 wearing the wrist-wearable device 110, the other input 670 corresponding to a request from the user 120 to select one of the user accounts 609, at which point the wrist-wearable device 110 ceases to display the aggregated user account UI 660 and displays the message UI 270 corresponding to the selected user account 609. In this example, the user 120 selected the second social media platform 611B associated with the first account 609 and, as such, the message UI 270 will correspond to the second social media platform 611B. The user 120 can perform one or more actions in the message UI 270 as described above in reference to FIG. 2.

Alternatively, in some embodiments the wrist-wearable device 110, in response to detecting the selection of the UI element for creating a new message 170 in accordance with a determination that at least one user account for receiving messages via the second messaging application is enabled on the wrist-wearable device 110, presents a third selectable option that, when selected, causes the wrist-wearable device to initiate the creation of a message to be sent using the at least one user account for the second messaging application. The first, second, and third selectable options are presented within one UI on the wrist-wearable device. More specifically, in some embodiments the user 120 can select the user account 609 and the messaging application associated with the user account 609 to compose and send the message. In some embodiments, the user 120 selects the user account 609 and/or the messaging application associated with the user account 609 before selecting a contact.

While FIGS. 6A-6C show the aggregated user account UI 660 when composing a new message, the skilled artisan will appreciate that aspects of the aggregated user account UI 660 can be performed whenever a message is sent (e.g., as described above in FIG. 2) and/or whenever one or more audio or video calls are initiated by the user 120. For example, in some embodiments the aggregated user account UI 660 is displayed before or after the call-initiation UI 360 (FIG. 3 and FIG. 5) is displayed to the user 120. In some embodiments, the wrist-wearable device 110, in repose to a selection of a contact in FIGS. 6A-6C, presents, via the display 130, an existing thread (for the selected messaging application and associated user account 609) if the wrist-wearable device 110 determines that a thread already exists.

If a thread does not exist, the wrist-wearable device 110 creates a new thread for the selected contact.

Figures 7A, 7B, 7C:
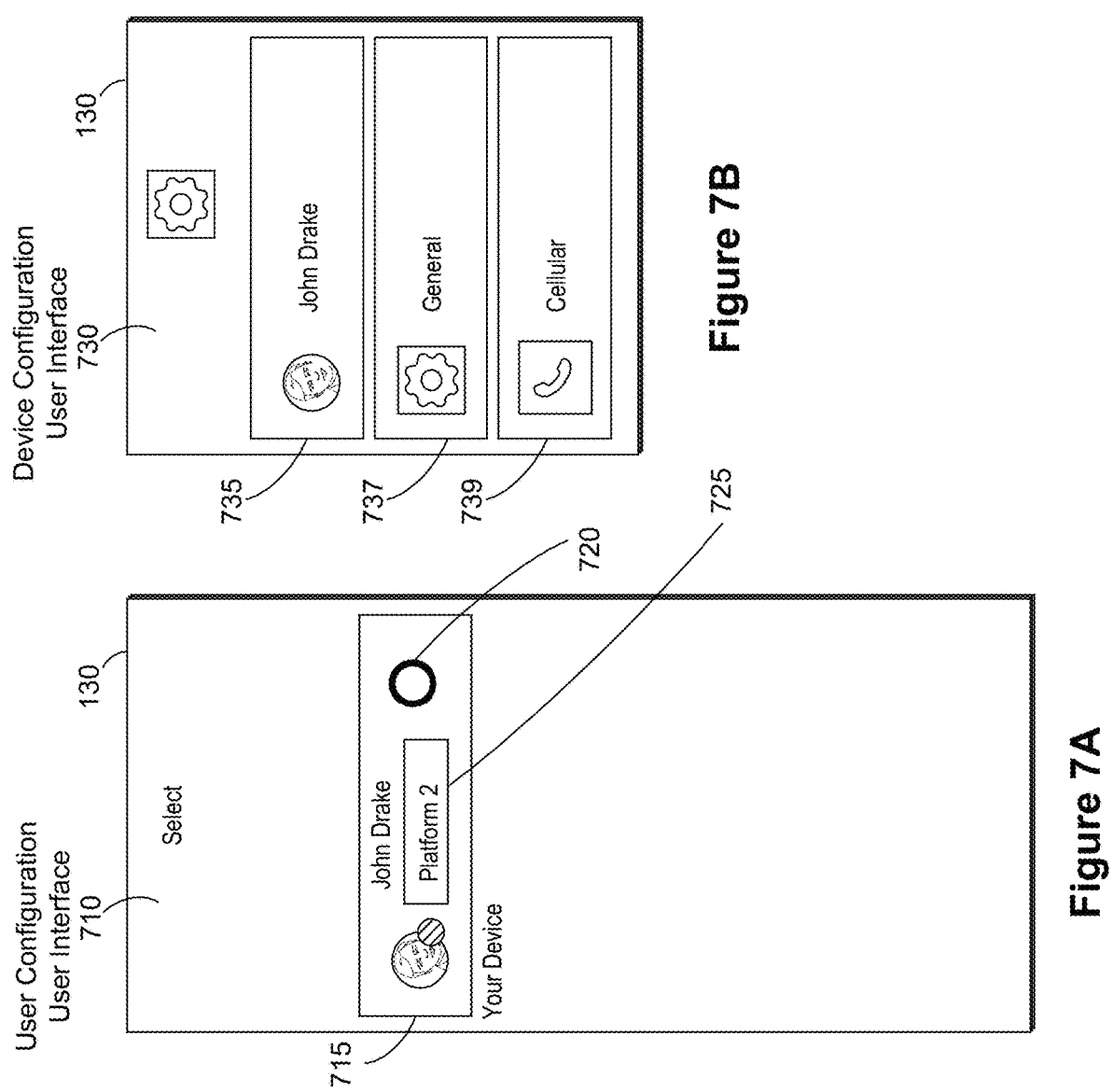
FIGS. 7A-7C illustrate configuration user interfaces for adjusting settings associated with the communications-hub mode of the wrist-wearable device, according to some embodiments.

FIGS. 7A-7C illustrate configuration UIs for adjusting settings associated with the communications-hub mode of the wrist-wearable device 110, according to some embodiments. FIG. 7A illustrates a user configuration UI 710 including one or more messaging applications and associated user accounts associated with a wrist-wearable device 110. In some embodiments, a user is able to select (e.g., input 720) a messaging application and/or associated user account (e.g., user element 715 including user account "John Drake" associated with social media platform 2) to update and/or set one or more settings and preferences.

The device configuration UI 730 includes one or more of a messaging application UI element 735, a general settings UI element 737, and a cellular UI element 739. In some embodiments, the device configuration UI 730 is presented in response to a selected messaging application and/or associated user account in the user configuration UI 710. In some embodiments, user input selecting the messaging application UI element 735 allows the user to switch between different messaging applications and/or associated user accounts to update. The general settings UI element 737, when selected, allows the user to configure one or more settings for the selected user account and the associated wrist-wearable device 110. The cellular UI element 739, when selected, allows the user to configure a cellular network associated with the selected user account UI element 735.

In some embodiments, the wrist-wearable device 110 includes a user-account-configuration UI 750 for enabling and disabling user accounts 609 on the wrist-wearable device 110. In particular, the user-account-configuration UI 750 includes different user accounts 609 associated with different messaging applications for different social media platforms. As discussed below in reference to FIGS. 8A-8E, the user-account-configuration UI 750 allows the user to enable or disable (via an input at a toggle control) different user accounts 609 and/or messaging applications. As described herein, by allowing a user to enable only a predetermined number of the user accounts 609, the wrist-wearable device 110 is able to preserve limited computing and memory resource.

FIGS. 8A-8E illustrate a guided human-machine interaction process for configuring user accounts to be used with the communications-hub mode, according to some embodiments. In some embodiments, the user-account-configuration UI 750 includes one or more user accounts 821 (analogous to user accounts 609) associated with the wrist-wearable device 110. As described above in FIGS. 6A-6C, in some embodiments each user account 609 is associated with one or more messaging applications 165. In some embodiments, each account is associated with one or more platforms 817 corresponding to one or more social media platform accounts, webpage accounts, email accounts, instant messaging accounts, phone provider accounts, and/or other communication-based applications. As an example, a first social media platform 817A can be associated with one or more first user accounts 821A that are active for a first messaging application.

In a first user-account-configuration UI 750A, only two user accounts (a first user account UI element 821A and a second user account UI element 821B) are active on the wrist-wearable device 110. As only two accounts are active on the wrist-wearable device 110, the user can activate and deactivate (or disable) only one account. In other words, at least one user account 609 must be active on the wrist-wearable device 110. In some embodiments, a main user account is associated with the wrist-wearable device 110. The main user account is identified by the wrist-wearable device icon 819 in the first user account UI element 821A. The second user account UI element 821B is shown as active via the active toggle UI element 825.

In FIG. 8B, a second user-account-configuration UI 750B includes seven user accounts (represented by a first user account UI element 821A through a seventh user account UI element 821G). In the second user-account-configuration UI 750B five of the seven user accounts are active, in particular, the main user account represented by the first user account UI element 821A, a second user account represented by the second user account UI element 821B, a third user account represented by the third user account UI element 821C, a fourth user account represented by the fourth user account UI element 821C, a fifth user account represented by the fifth user account UI element 821E. Each active account, except for the main user account, includes an active toggle UI element 825, and each inactive or disabled account (the sixth user account UI element 821F and the seventh user account UI element 821G) includes an inactive toggle UI element 827. The social media platforms 817 of each active account can be the same or distinct. For example, the first user account is associated with a first social media platform 817A, the second user account is associated with a second social media platform 817B, the third and fourth user account is associated with a third social media platform 817C, and the fifth user account is associated with a fourth social media platform 817D.

In some embodiments, while displaying the user-account-configuration UI 750, the wrist-wearable device 110 detects an input 845 from the user 120 wearing the wrist-wearable device 110, the input corresponding to a request from the user to activate a user account of the one or more user accounts 821. The wrist-wearable device 110, in response to detecting the request from the user 120 to activate the account of the one or more user accounts 821, enables the account of the one or more user accounts 821. Enabling the account includes associating the account of the one or more user accounts 821 with at least one of the messaging applications 165, obtaining data from the user account 821, and storing the data from the user account 821 on the wrist-wearable device 110. Obtaining data from the user account 821 and storing the data from the user account 821 on the wrist-wearable device 110 can include retrieving one or more contacts, one or more messages, message history, call history, user settings and preferences, etc., from the user account 821 and storing the data locally at the wrist-wearable device 110. In other words, the communications-hub mode is constantly updated as the user accounts are enabled such that each aggregated UI associated with the communications-hub mode displays data added when any user account is enabled or any other user account change is made. In FIG. 8C, user input 845 selects the sixth user account 821F, which corresponds to a request to activate the sixth user account 821F.

In some embodiments, a user is presented, via a display 130, a UI to preview for the aggregated UIs associated with the communications-hub mode. The previews for the aggregated UIs associated with the communications-hub mode include representations of the aggregated UIs with a user account that is toggled on (enabled) or off (disabled). For example, a preview-aggregated UI can include data that will be added or deleted from the aggregated UI of the communications-hub mode based on the toggled accounts.

In some embodiments, while displaying the user-account-configuration UI 750, the wrist-wearable device 110 detects another input from the user 120 wearing the wrist-wearable device 110, the other input corresponding to a request from the user to deactivate another account of the one or more user accounts 821. The wrist-wearable device 110, in response to detecting the request from the user to deactivate the other account of the one or more user accounts 821, disables the other account of the one or more user accounts 821, such that data associated with the now-disabled user account is no longer displayed with the UIs provided in connection with the communications-hub mode. Disabling the other account includes removing data for the other account from the UIs that are displayed in conjunction with the communications-hub mode of the wrist-wearable device 110. Removing data for the other account from the wrist-wearable device 110 can, in some embodiments, include removing (e.g., from a memory of the wrist-wearable device 110) one or more contacts, one or more messages, message history, call history, user settings and preferences, etc., that would have previously been displayed in conjunction with the communications-hub mode of the wrist-wearable device 110. This removal can occur locally and without removing data from the now-disabled user account entirely (e.g., if the user chose to log into the now-disabled user account using a different device, the data would still be displayed, it just would no longer be displayed in conjunction with the UIs of the communications-hub mode on the wrist-wearable device). In an alternative embodiment, at least some of the data for the now-disabled account (e.g., the five most recent messages) can continue to be stored on the wrist-wearable device 110 to help enable quicker display of some data should the now-disabled user account become reenabled later on.

As noted in FIGS. 6A-6C, up to a predetermined number of user accounts (e.g., five accounts, six accounts) can be active at the same time. For example, in some embodiments the wrist-wearable device 110 can have up to five accounts active at the same time. In some embodiments, the wrist-wearable device 110 can have a maximum of four active accounts. In some embodiments, when the predetermined number of accounts has been reached and the wrist-wearable device 110 detects input 845 from the user 120 wearing the wrist-wearable device 110 corresponding to a request from the user to activate a user account of the one or more user accounts, the wrist-wearable device 110, in response to detecting the request from the user 120, ceases displaying user-account-configuration UI 750 and displays, on its display 130, user account deactivation selection UI 870. The user account deactivation selection UI 870 includes user account UI element 821 for each active account except for the main user account. For example, as shown in FIG. 8D, the user account deactivation selection UI 870 includes the second user account UI element 821B, the third user account UI element 821C, the fourth user account UI element 821C, and the fifth user account UI element 821E.

In some embodiments, while displaying the user account deactivation selection UI 870, the wrist-wearable device 110 detects input 875 from the user 120 wearing the wrist-wearable device 110, the input 875 corresponding to a request from the user to deactivate an account of the one or more user accounts 821. The wrist-wearable device 110, in response to detecting the request from the user to deactivate the account of the one or more user accounts 821, disables the account of the one or more user accounts 821, which removes data for the account from the wrist-wearable device 110. In other words, the communications-hub mode is constantly updated as the user accounts are disabled such that each aggregated UI associated with the communications-hub mode displays data removed when any user account is disabled or any other user account change is made. In the example provided in FIG. 8D, the user selects to remove the third user account (represented by the third user account UI element 821C). Toggling off (i.e., disabling a user account) removes data for the user account; however, the user can remain logged into the disabled user accounts such that the user can easily enable and disable accounts without having to continuously enter login information.

As shown in FIG. 8E, as a result of the user's selections in FIGS. 8C and 8D, the active accounts are updated. In particular, the third user account UI element 821C is shown as inactive and the sixth user account UI element 821F is shown as active.

In some embodiments, the user-account-configuration UI 750 can be accessed from any of the UIs described herein. For example, the user-account-configuration UI 750 can be accessed via an aggregated messaging UI 160 and/or an aggregated call log UI 180, which grants the user greater control in communicating with other devices.

FIGS. 9A-9E show a detailed flow diagram of a method 900 for activating a communications-hub mode and interacting with aggregated UIs available therein, according to some embodiments. In particular, the method 900 includes presenting UIs for allowing a user 120 to access data on the wrist-wearable device 110. Further, the wrist-wearable device 110 is configured to present audio data and/or video data and/or capture and send audio and/or video data by a wrist-wearable device 110. Operations (e.g., steps) of the method 900 can be performed by one or more processors (e.g., central processing unit 1126 and/or MCU 1152 of FIG. 11) of a wrist-wearable device 110. In some embodiments, the wrist-wearable device 110 is coupled with one or more sensors (e.g., various sensors shown in FIG. 11, such as a heart rate sensor 1158, EMG sensor 1146, SpO2 sensor 1154, altimeter 1148, thermal sensor or thermal couple, ambient light sensor, ambient noise sensor), a display 130, a speaker 1195, an imaging device 147, and a microphone 1197 to perform the one or more operations of FIGS. 9A-9E. The speaker 1195 can be integrated with the wrist-wearable device 110 or can be associated with a device that is separate from the wrist-wearable device 110 but is communicatively coupled thereto, such as a pair of headphones, a Bluetooth speaker, or other like devices that include speakers 1195 for presenting audio data. At least some of the operations shown in FIGS. 9A-9E correspond to instructions stored in a computer memory or computer-readable storage medium (e.g., storage 1102, ram 1103, and/or memory 1150 FIG. 11). Operations 902-964 can also be performed in part using one or more processors and/or using instructions stored in memory or computer-readable medium of an electronic device (e.g., computing device 115 of FIGS. 1A-1J) communicatively coupled to the wrist-wearable device 110 (e.g., a server, a computer, and/or a smartphone can perform operations 902-964 alone or in conjunction with the one or more processors of the wrist-wearable device 110).

The method 900 includes displaying (902), on a display of a wrist-wearable device 100 that includes at least a first messaging application and a second messaging application distinct from the first messaging application, a watch-face UI 140. In some embodiments, the watch-face UI includes (904) an indication to the user that the aggregated messaging UI 160 is available via a single input, for example, as shown in FIG. 1A, indication UI element 149. While displaying the watch-face UI 140, the method 900 includes detecting (906)

a single input from a user wearing the wrist-wearable device 110, the single input corresponding to a request from the user 120 to activate a communications-hub mode. The communications-hub mode provides access to two or more of an aggregated messaging UI 160, an aggregated call log UI 180, and an aggregated contacts UI 250, each including data from both of the first messaging application and the second messaging application (e.g., one or more messaging applications 165).

In response to detecting the single input (908-a) corresponding to the request from the user to activate the communications-hub mode, the method 900 includes ceasing (908-b) to display the watch-face UI 160 and displaying (908-c), on the display 130 of the wrist-wearable device 110, the aggregated messaging UI 160. Displaying the aggregated messaging UI 160 includes displaying a first UI element that includes at least part of a first message received via the first messaging application and a second UI element that includes at least part of a second message received via the second messaging application. For example, as shown in FIGS. 1A-IC and FIG. 2, user input can be used to transition between a watch-face UI 140 and the aggregated messaging UI 160, which includes one or more message UI elements 167. In some embodiments, the aggregated messaging UI 160 includes (910) an indication to the user that the aggregated call log UI 180 is available via a single input.

In some embodiments, the user wearing the wrist-wearable device 110 has (912-a) two different user accounts for receiving messages via the first messaging application and the aggregated messaging UI also includes (912-b) a third UI element that includes at least part of a third message received via the first messaging application, the third message being sent to a first of the two different user accounts via the first messaging application and the first message being sent to a second of the two different user accounts via the first messaging application. For example, as shown in FIG. 2, one or more messages can be received via different messaging applications 165. Further, as described in FIGS. 6A-6C, the one or more messaging applications 165 can be associated with one or more user accounts 609.

In some embodiments, the method 900 includes displaying (914-a), within the aggregated messaging UI, a UI element for creating a new message, and the method 900 further includes, in response to detecting a selection of the UI element for creating a new message in accordance with a determination that the two different user accounts for receiving messages via the first messaging application are enabled on the wrist-wearable device, presenting (914-b) a first selectable option that, when selected, causes the wrist-wearable device to initiate the creation of a message to be sent using the first of the two different user accounts and a second selectable option that, when selected, causes the wrist-wearable device to initiate the creation of a message to be sent using the second of the two different user accounts. In some embodiments, the method 900 includes, in response to detecting the selection of the UI element for creating a new message in accordance with a determination that at least one user account for receiving messages via the second messaging application is enabled on the wrist-wearable device, presenting (916) a third selectable option that, when selected, cause the wrist-wearable device to initiate the creation of a message to be sent using the at least one user account for the second messaging application, wherein the first, second, and third selectable options are presented within one UI on the wrist-wearable device. Additional examples of creating a new message are provided above in FIGS. 2 and 6A-6C.

In some embodiments, the wrist-wearable device includes (918-a) a user-account-configuration UI for enabling and disabling user accounts on the wrist-wearable device, the user accounts including the two different user accounts for receiving messages via the first messaging application and the user account for receiving messages via the second messaging application, and the method 900 further includes displaying (918-b) the user-account configuration UI on the display of the wrist-wearable device. The method 900 includes, in response to an input at a toggle associated with one of the user accounts, causing (918-b) the wrist-wearable device to add or remove messages from the aggregated messaging UI depending on whether a respective user account has been enabled or disabled via the input at the toggle. In some embodiments, the user-account-configuration UI allows (920) for enabling only a predetermined number of the user accounts on the wrist-wearable device, thereby helping to preserve limited computing and memory resources on the wrist-wearable device 110. Examples of the user-account-configuration UI are provided above in FIGS. 6A-6C and 8A-8E.

In some embodiments, while displaying the aggregated messaging UI, the method 900 includes detecting (922-a) another single input from the user wearing the wrist-wearable device 110, the other single input corresponding to a request from the user to access an aggregated call log UI 180. The method 900 further includes (926-b), in response to detecting the other single input corresponding to the request from the user to access the aggregated call log UI, ceasing (926-c) to display the aggregated messaging UI 160 and displaying (926-d), on the display 130 of the wrist-wearable device 110, the aggregated call log UI 180. Displaying the aggregated call log UI includes displaying a fourth UI element that includes data associated with a first call received via the first messaging application, and a fifth UI element that includes data associated with a second call received via the second messaging application. For example, as shown between FIGS. 1D and 1F, a user can transition between the different UI using a single input. In some embodiments, the method 900 includes, while displaying the aggregated call log UI, detecting (924-a) a selection of the fourth UI element and, in response to detecting the selection, initiating (924-b) a call via the first messaging application. Examples for initiating a call are provided above in reference to FIGS. 3 and 5A-5B.

In some embodiments, displaying the aggregated call log UI 180 also includes (926) displaying a sixth UI element that includes data from a voicemail received via the first messaging application or the second messaging application. In some embodiments, the fourth and fifth UI elements are (928) displayed with a first visual characteristic, and the sixth UI element is displayed with a second visual appearance that is distinct from the first visual characteristic. In some embodiments, displaying the aggregated call log UI includes, (930) in accordance with a determination that two calls were received from a same other user, displaying one UI element with data from each of the two calls within the aggregated call log UI. In some embodiments, a first of the two calls is (932) an audio call from the same other user and a second of the two calls is a video call from the same other user. In some embodiments, the method 900 includes detecting (934-a) a new input at the one UI element with data from each of the two calls and, in response to detecting the new input, presenting (934-b) at the wrist-wearable device selectable options for initiating a video call or initiating an audio call to the same other user, the video call being initiated using a camera of the wrist-wearable device. Additional examples of the UI elements for voicemails and calls are provided above in FIGS. 3 and 5A-5B.

In some embodiments, the method 900 includes, while displaying the aggregated call log UI, detecting (936-*a*) a selection of the fourth UI element and, in response to detecting the selection, initiating (936-*b*) a call via the first calling application.

In some embodiments, the method 900 further includes, while displaying the aggregated call log UI, detecting (938-*a*) one other input from the user wearing the wrist-wearable device, the one other input corresponding to a request from the user to access an aggregated contact UI. The method 900 includes in response to detecting (938-*b*) the one other input ceasing (938-*c*) to display the aggregated call log UI, and displaying (938-*d*), on the display of the wrist-wearable device, the aggregated contacts UI. Displaying the aggregated contacts UI including displaying a sixth UI element that includes data from a respective contact of a plurality of contacts associated with the first application and a seventh UI element that includes data from a respective contact of a plurality of contacts associated with the second application. Examples of the aggregated contacts UI 250 are provided above in reference to FIGS. 2-3 and 6A-6C.

In some embodiments, the wrist-wearable device operates (940) using an operating system, and the first and second applications provide data regarding electronic messages, contacts, and calls to the operating system for use in generating the aggregated messaging, call log, and contact UIs by the operating system.

Figure 10A:
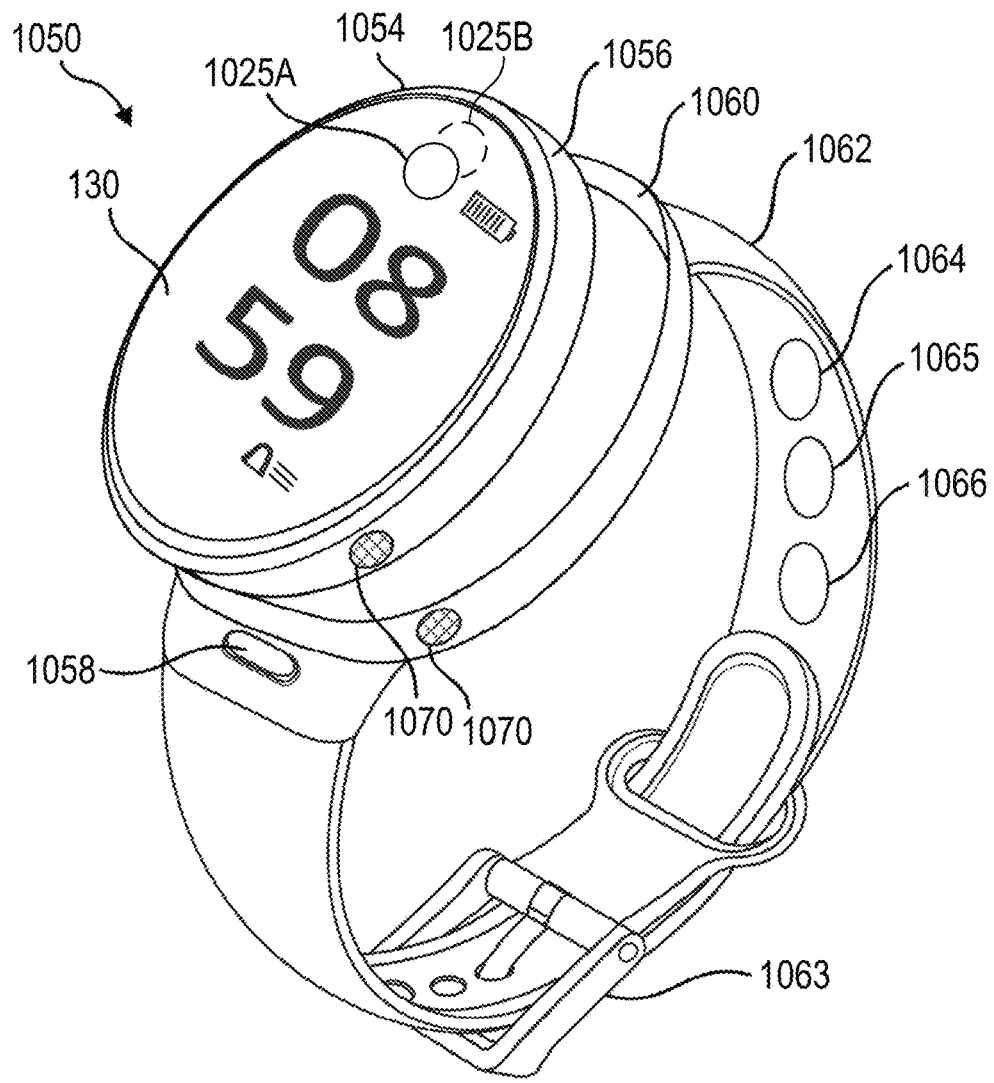
FIGS. 10A and 10B illustrate an example wrist-wearable device, in accordance with some embodiments.
Figure 10B:
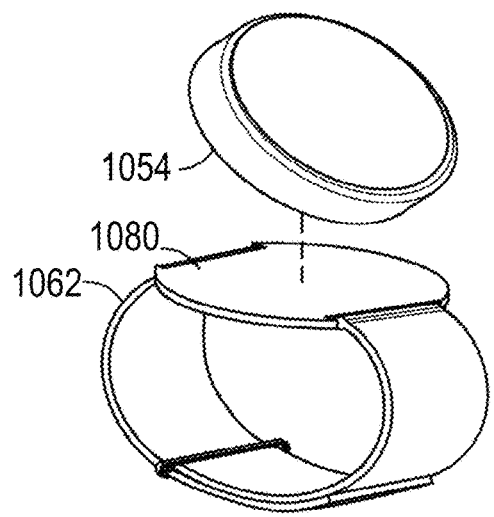

FIGS. 10A and 10B illustrate an example wrist-wearable device 1050, in accordance with some embodiments. The wrist-wearable device 1050 is an instance of the wrist-wearable device 110 described above in reference to FIGS. 1A-9E, such that wearable device 110 should be understood to have the features of wearable device 1050 and vice versa. FIG. 10A illustrates a perspective view of the wrist-wearable device 1050 that includes a watch body 1054 decoupled from a watch band 1062. Watch body 1054 and watch band 1062 can have a substantially rectangular or circular shape and can be configured to allow a user to wear the wrist-wearable device 1050 on a body part (e.g., a wrist). The wrist-wearable device 1050 can include a retaining mechanism 1063 (e.g., a buckle, a hook and loop fastener) for securing watch band 1062 to the user's wrist. The wrist-wearable device 1050 can also include a coupling mechanism 1060 (e.g., a cradle) for detachably coupling capsule or watch body 1054 (via a coupling surface 1056 of the watch body 1054) to watch band 1062.

The wrist-wearable device 1050 can perform various functions associated with ongoing video calls as described above with reference to FIGS. 1A-9E. As will be described in more detail below with reference to FIG. 11, functions executed by the wrist-wearable device 1050 can include, without limitation, display of visual content to the user (e.g., visual content displayed on display screen 130), sensing user input (e.g., sensing a touch on button 1058, sensing biometric data on sensor 1064, sensing neuromuscular signals on neuromuscular sensor 1065), messaging (e.g., text, speech, video), image capture, wireless communications (e.g., cellular, near-field, Wi-Fi, personal area network), location determination, financial transactions, providing haptic feedback, alarms, notifications, indications, biometric authentication, health monitoring, sleep monitoring, etc. These functions can be executed independently in watch body 1054, independently in watch band 1062, and/or in communication between watch body 1054 and watch band 1062. In some embodiments, functions can be executed on the wrist-wearable device 1050 in conjunction with an artificial-reality environment which includes, but is not limited to, virtual-reality (VR) environments (including non-immersive, semi-immersive, and fully immersive VR environments), augmented-reality environments (including marker-based augmented-reality environments, markerless augmented-reality environments, location-based augmented-reality environments, and projection-based augmented-reality environments), hybrid reality, and other types of mixed-reality environments. As the skilled artisan will appreciate upon reading the descriptions provided herein, the novel wearable devices described herein can be used with any of these types of artificial-reality environments.

The watch band 1062 can be configured to be worn by a user such that an inner surface of the watch band 1062 is in contact with the user's skin. When worn by a user, the sensor 1064 is in contact with the user's skin. The sensor 1064 can be a biosensor that senses a user's heart rate, saturated oxygen level, temperature, sweat level, or muscle intentions, or a combination thereof. The watch band 1062 can include multiple sensors 1064 that can be distributed on an inside and/or an outside surface of the watch band 1062. Additionally, or alternatively, the watch body 1054 can include the same or different sensors than the watch band 1062 (or the watch band 1062 can include no sensors at all in some embodiments). For example, multiple sensors can be distributed on an inside and/or an outside surface of watch body 1054. As described below with reference to FIGS. 10A and 10B, the watch body 1054 can include, without limitation, front-facing imaging device 1025A and/or rear-facing imaging device 1025B (each an instance of imaging device 147 of FIGS. 1A-1J), a biometric sensor, an IMU, a heart rate sensor, a saturated oxygen sensor, a neuromuscular sensor(s) (e.g., EMG sensors 1146 of FIG. 11), an altimeter sensor, a temperature sensor, a bioimpedance sensor, a pedometer sensor, an optical sensor, a touch sensor, a sweat sensor, etc. The sensor 1064 can also include a sensor that provides data about a user's environment including a user's motion (e.g., an IMU), altitude, location, orientation, gait, or a combination thereof. The sensor 1064 can also include a light sensor (e.g., an infrared light sensor, a visible light sensor) that is configured to track a position and/or motion of watch body 1054 and/or watch band 1062. Watch band 1062 can transmit the data acquired by the sensor 1064 to watch body 1054 using a wired communication method (e.g., a UART, a USB transceiver) and/or a wireless communication method (e.g., near-field communication, Bluetooth™). Watch band 1062 can be configured to operate (e.g., to collect data using sensor 1064) independent of whether watch body 1054 is coupled to or decoupled from watch band 1062.

The watch band 1062 and/or watch body 1054 can include a haptic device 1066 (e.g., a vibratory haptic actuator) that is configured to provide haptic feedback (e.g., a cutaneous and/or kinesthetic sensation) to the user's skin. The sensor 1064 and/or haptic device 1066 can be configured to operate in conjunction with multiple applications including, without limitation, health monitoring, social media, game playing, and artificial reality (e.g., the applications associated with artificial reality).

In some examples, the watch band 1062 can include a neuromuscular sensor 1065 (e.g., an electromyography (EMG) sensor, a mechanomyogram (MMG) sensor, a sonomyography (SMG) sensor). Neuromuscular sensor 1065 can sense a user's intention to perform certain motor actions. The sensed muscle intention can be used to control certain UIs displayed on the display 130 of the device 110 and/or can be transmitted to device responsible for rendering an artificial-reality environment (e.g., a head-mounted display) to perform an action in an associated artificial-reality environment, such as to control the motion of a virtual device displayed to the user.

Signals from neuromuscular sensor 1065 can be used to provide a user with an enhanced interaction with a physical object and/or a virtual object in an artificial-reality application generated by an artificial-reality system (e.g., UI objects presented on the display 130, or another computing device (e.g., a head-mounted display)). Signals from neuromuscular sensor 1065 can be obtained (e.g., sensed and recorded) by one or more neuromuscular sensors 1065 of watch band 1062. Although FIG. 10A shows one neuromuscular sensor 1065, watch band 1062 can include a plurality of neuromuscular sensors 1065 arranged circumferentially on an inside surface of watch band 1062 such that the plurality of neuromuscular sensors 1065 contact the skin of the user. Watch band 1062 can include a plurality of neuromuscular sensors 1065 arranged circumferentially on an inside surface of watch band 1062. Neuromuscular sensor 1065 can sense and record neuromuscular signals from the user as the user performs muscular activations (e.g., movements, gestures). The muscular activations performed by the user can include static gestures, such as placing the user's hand palm down on a table; dynamic gestures, such as grasping a physical or virtual object; and covert gestures that are imperceptible to another person, such as slightly tensing a joint by co-contracting opposing muscles or using sub-muscular activations. The muscular activations performed by the user can include symbolic gestures (e.g., gestures mapped to other gestures, interactions, or commands, for example, based on a gesture vocabulary that specifies the mapping of gestures to commands).

In some embodiments, input for performing one or more commands at the wrist-wearable device 1050 are detected based on the neuromuscular signals sensed by the wrist-wearable device 1050. The wrist-wearable device 1050 determines, based on the detected neuromuscular signals, a motor action that the user intends to perform or performs with his or her hand or arm. The motor action can be associated with one or more commands and the one or more processors are further configured to provide the one or more commands associated with the motor action to the wrist-wearable device 1050 to perform the one or more commands. In some embodiments, the motor action is associated with one or more gestures that, when detected by the one or more processors, are further configured to provide the one or more commands associated with the one or more gestures to the wrist-wearable device 1050 to perform the one or more commands.

Different gestures and motor actions can be determined by the wrist-wearable device 1050. For example, in reference to FIG. 2, the user 120 can move his or her wrist, hand, arm, etc., up and down, curl his or her digits, mimic pressing a digit on the screen, create a pinch with his or her hand, etc. When the user 120 performs or intends to perform a motor action or gesture, the wrist-wearable device 110 detects the neuromuscular signals generated by the user action and determines, using the one or more processors, the motor action or gesture. The wrist-wearable device 110 then performs an action based on the one or more commands. Alternatively, in some embodiments, the wrist-wearable device 1050 provides one or more commands associated with the motor action or gesture to the computing device 115 (FIGS. 1A-1J) to perform the action. For example, a user can request to use the computing device 115's cellular network to initiate a call, and the wrist-wearable device 110 can provide a command to the computing device to imitate the call based on the detected motor actions or gestures.

Although the above examples describe gestures such as the movement of digits and pinches, the skilled artisan in this field will appreciate upon reading this disclosure that any number of neuromuscular signals can be detected, such as movement of the arm, the elbow, the wrist, individual digits (e.g., the little finger or the thumb), portions of the digits, etc. Further, any number of gestures can be associated with a motor action. For example, instead of a pinch, a confirmation can be a fist, making an open circle with the digits, a double tap, etc.

The wrist-wearable device 1050 can include a coupling mechanism (also referred to as a cradle) for detachably coupling watch body 1054 to watch band 1062. A user can detach watch body 1054 from watch band 1062 in order to reduce the encumbrance of the wrist-wearable device 1050 to the user. The wrist-wearable device 1050 can include a coupling surface 1056 on the watch body 1054 and/or coupling mechanism(s) 1060 (e.g., a cradle, a tracker band, a support base, a clasp). A user can perform any type of motion to couple watch body 1054 to watch band 1062 and to decouple watch body 1054 from watch band 1062. For example, a user can twist, slide, turn, push, pull, or rotate watch body 1054 relative to watch band 1062, or a combination thereof, to attach watch body 1054 to watch band 1062 and to detach watch body 1054 from watch band 1062.

As shown in the example of FIG. 10A, watch band coupling mechanism 1060 can include a type of frame or shell that allows watch body 1054 coupling surface 1056 to be retained within watch band coupling mechanism 1060. Watch body 1054 can be detachably coupled to watch band 1062 through a friction fit, magnetic coupling, a rotation-based connector, a shear-pin coupler, a retention spring, one or more magnets, a clip, a pin shaft, a hook and loop fastener, or a combination thereof. In some examples, watch body 1054 can be decoupled from watch band 1062 by actuation of release mechanism 1070. The release mechanism 1070 can include, without limitation, a button, a knob, a plunger, a handle, a lever, a fastener, a clasp, a dial, or a latch, or a combination thereof.

The wrist-wearable device 1050 can include a single release mechanism 1070 or multiple release mechanisms 1070 (e.g., two release mechanisms 1070 positioned on opposing sides of the wrist-wearable device 1050 such as spring-loaded buttons). As shown in FIG. 10A, the release mechanism 220 can be positioned on watch body 1054 and/or watch band coupling mechanism 1060. Although FIG. 10A shows release mechanism 1070 positioned at a corner of watch body 1054 and at a corner of watch band coupling mechanism 1060, the release mechanism 1070 can be positioned anywhere on watch body 1054 and/or watch band coupling mechanism 1060 that is convenient for a user of wrist-wearable device 1050 to actuate. A user of the wrist-wearable device 1050 can actuate the release mechanism 1070 by pushing, turning, lifting, depressing, shifting, or performing other actions on the release mechanism 1070. Actuation of the release mechanism 1070 can release (e.g., decouple) the watch body 1054 from the watch band coupling mechanism 1060 and the watch band 1062 allowing the user to use the watch body 1054 independently from watch band 1062. For example, decoupling the watch body 1054 from the watch band 1062 can allow the user to capture images using rear-facing imaging device 1025B.

FIG. 10B is a perspective view of another example of the wrist-wearable device 1050. The wrist-wearable device 1050 of FIG. 10B can include a watch body interface 1080

(another example of a cradle for the capsule portion of the wrist-wearable device 110). The watch body 1054 can be detachably coupled to the watch body interface 1080. Watch body 1054 can be detachably coupled to watch body interface 1080 through a friction fit, magnetic coupling, a rotation-based connector, a shear-pin coupler, a retention spring, one or more magnets, a clip, a pin shaft, or a hook and loop fastener, or a combination thereof.

In some examples, watch body 1054 can be decoupled from watch body interface 1080 by actuation of a release mechanism. The release mechanism can include, without limitation, a button, a knob, a plunger, a handle, a lever, a fastener, a clasp, a dial, or a latch, or a combination thereof. In some examples, the wristband system functions can be executed independently in watch body 1054, independently in watch body interface 1080, and/or in communication between watch body 1054 and watch body interface 1080. Watch body interface 1080 can be configured to operate independently (e.g., execute functions independently) from watch body 1054. Additionally, or alternatively, watch body 1054 can be configured to operate independently (e.g., execute functions independently) from watch body interface 1080. As will be described in more detail below with reference to the block diagram of FIG. 11, watch body interface 1080 and/or watch body 1054 can each include the independent resources required to independently execute functions. For example, watch body interface 1080 and/or watch body 1054 can each include a power source (e.g., a battery), a memory, data storage, a processor (e.g., a central processing unit (CPU)), communications, a light source, and/or input/output devices.

In this example, watch body interface 1080 can include all of the electronic components of watch band 1062. In additional examples, one or more electronic components can be housed in watch body interface 1080 and one or more other electronic components can be housed in portions of watch band 1062 away from watch body interface 1080.

Figure 10D:
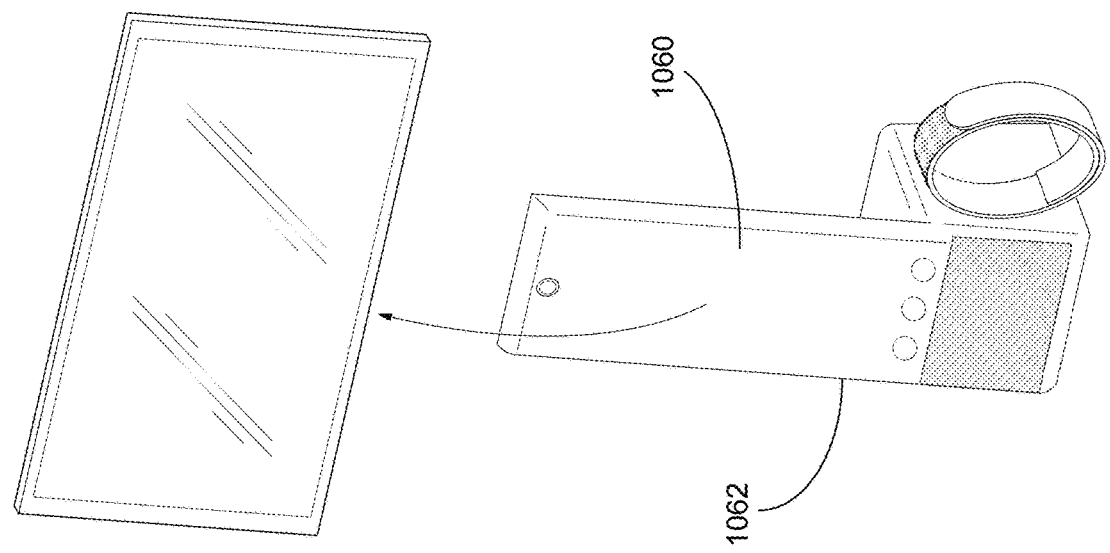
FIGS. 10C and 10D illustrates a portable device, in accordance with some embodiments.
Figure 10C:
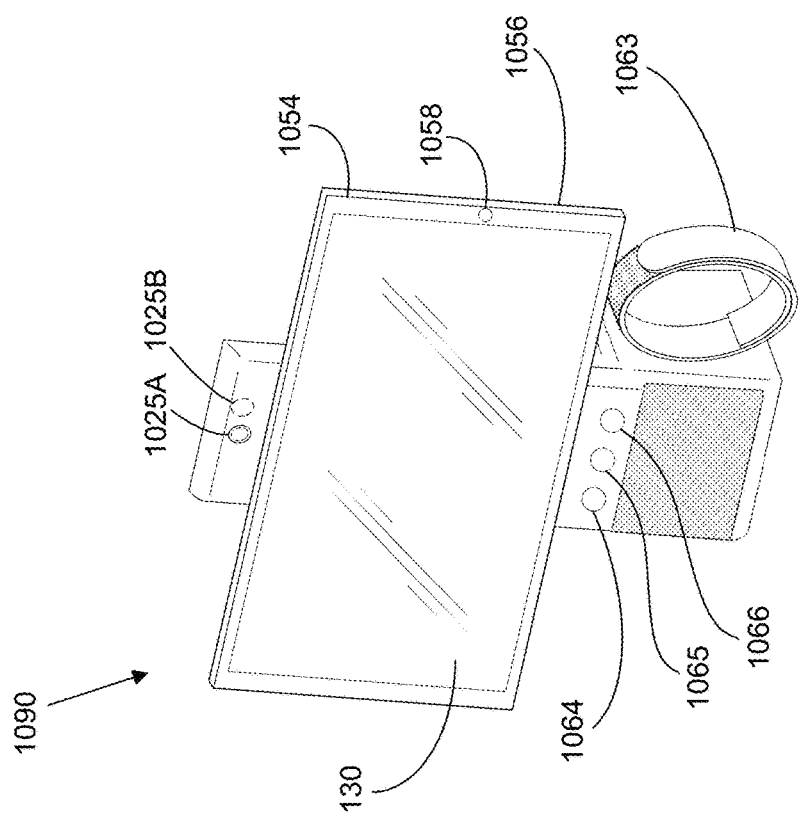

FIGS. 10C and 10D illustrate a portable device 1090, in accordance with some embodiments. The portable device 1090 is an instance of the portable device 113 described above in reference to FIGS. 1G-1J, such that portable device 113 should be understood to have the features of portable device 1090 and vice versa. The portable device 1090 includes similar components as the wrist-wearable device 1050. For example, the portable device 1090 includes a body 1054 (e.g., removable or portable display) that can be decoupled from a base 1062 (which is similar in function to the watch band 1062). The portable device 1090 can include a retaining mechanism 1063 for securing the base 1062 to the portable device 1090. Further, the portable device 1090 can also include a coupling mechanism 1060 (e.g., a magnetic surface or a cradle) for detachably coupling the body 1054 (via a coupling surface 1056 of the body 1054) to base 1062.

The portable device 1090 can perform various functions associated with the communications hub mode described above with reference to FIGS. 1A-8E and operations of the methods described in reference to FIGS. 9A-9E. The portable device 1090 can include, without limitation, display of visual content to the user (e.g., visual content displayed on display screen 115), sensing user input (e.g., sensing a touch on button 1058, sensing biometric data on sensor 1064, sensing neuromuscular signals on neuromuscular sensor 1065), messaging (e.g., text, speech, video), image capture, wireless communications (e.g., cellular, near field, Wi-Fi, personal area network), location determination, financial transactions, providing haptic feedback, alarms, notifications, biometric authentication, health monitoring, sleep monitoring, etc. The body 1054 can include, without limitation, front-facing imaging device 1025A and/or rear-facing imaging device 1025B (each an instance of imaging device 147; FIGS. 1A-1J). The base 1062 and/or body 1054 can include a haptic device 1066 (e.g., a vibratory haptic actuator) that is configured to provide haptic feedback (e.g., a cutaneous and/or kinesthetic sensation) to the user. These functions can be executed independently in body 1054, independently in base 1062, and/or in communication between body 1054 and base 1062. In some embodiments, functions can be executed on the wrist-wearable device 1050 in conjunction with an artificial-reality environment. As the skilled artisan will appreciate upon reading the descriptions provided herein, the novel wearable devices described herein can be used with any type of artificial-reality environment.

As shown in the example of FIG. 10D, coupling mechanism 1060 can include a type of frame or shell that allows body 1054 coupling surface 1056 to be retained within body coupling mechanism 1060. Body 1054 can be detachably coupled to base 1062 through a friction fit, magnetic coupling, a rotation-based connector, a shear-pin coupler, a retention spring, one or more magnets, a clip, a pin shaft, a hook and loop fastener, or a combination thereof. In some examples, body 1054 can be decoupled from base 1062 by actuation of release mechanism 1070. The release mechanism 1070 can include, without limitation, a button, a knob, a plunger, a handle, a lever, a fastener, a clasp, a dial, a latch, or a combination thereof.

The device 1050 can include a single release mechanism 1070 or multiple release mechanisms 1070 (e.g., two release mechanisms 1070 positioned on opposing sides of the wrist-wearable device 1050, such as spring-loaded buttons). As shown in FIG. 10C, the release mechanism 220 can be positioned on body 1054 and/or body coupling mechanism 1060. Although FIG. 10C shows release mechanism 1070 positioned at a corner of body 1062, the release mechanism 1070 can be positioned anywhere that is convenient for a user of the portable device 1090 to actuate.

FIG. 10D is a view of the portable device 1090 with a decoupled watch body 1054. The portable device 1090 of FIG. 10C can include a body interface 1080. The body 1054 can be detachably coupled to the body interface 1080. Body 1054 can be detachably coupled to body interface 1080 through a friction fit, magnetic coupling, a rotation-based connector, a shear-pin coupler, a retention spring, one or more magnets, a clip, a pin shaft, a hook and loop fastener, or a combination thereof. In some examples, body 1054 can be decoupled from body interface 1080 by actuation of a release mechanism 1070.

In some examples, the system functions can be executed independently in body 1054, independently in body interface 1080, and/or in communication between body 1054 and body interface 1080. Body interface 1080 can be configured to operate independently (e.g., execute functions independently) from body 1054. Additionally, or alternatively, body 1054 can be configured to operate independently (e.g., execute functions independently) from body interface 1080. As will be described in more detail below with reference to the block diagram of FIG. 11, body interface 1080 and/or body 1054 can each include the independent resources required to independently execute functions. For example, body interface 1080 and/or body 1054 can each include a power source (e.g., a battery), a memory, data storage, a processor (e.g., a CPU), communications, a light source, and/or input/output devices.

Figure 11:
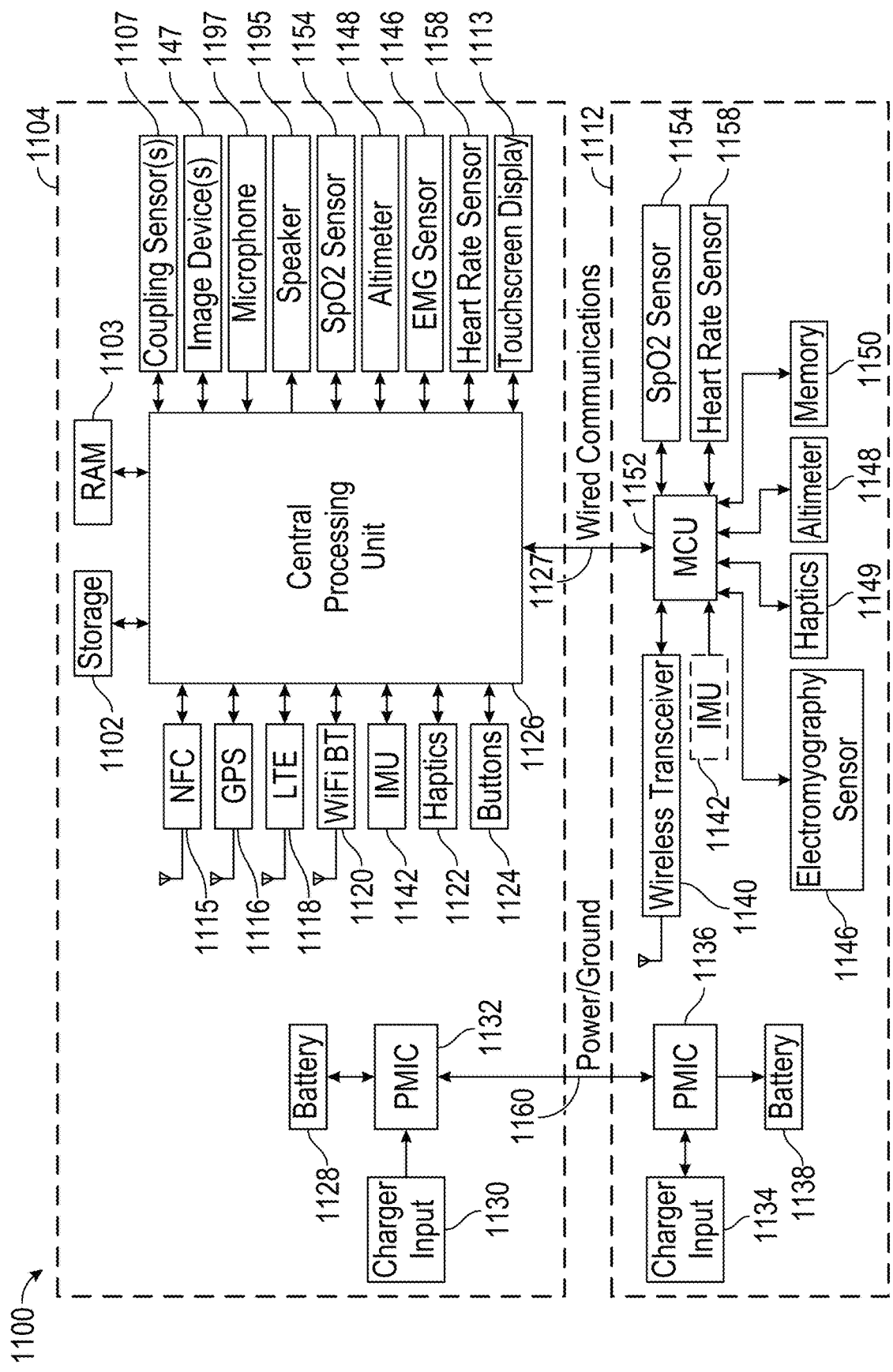
FIG. 11 is a block diagram of a wrist-wearable device system, in accordance with some embodiments.

FIG. 11 is a block diagram of a wrist-wearable device system 1100, according to at least one embodiment of the present disclosure. The wrist-wearable device 110 described in detail above is an example wrist-wearable device system 1100, so wrist-wearable device 110 will be understood to include the components shown and described for system 1100 below. In some embodiments, the portable device 113 described above in reference to FIGS. 1G-1J, 10C, and 10D includes one or more components shown and described for system 1100 below. The wrist-wearable device system 1100 can have a split architecture (e.g., a split mechanical architecture, a split electrical architecture) between a body 1104 (e.g., a capsule or (watch) body 1054) and a watch band 1112 (e.g., a band portion or watch band (or base) 1062), which was described above in reference to FIGS. 10A-10D. Each of watch body 1104 and watch band 1112 can have a power source, a processor, a memory, sensors, a charging device, and a communications device that enables each of watch body 1104 and watch band 1112 to execute computing, controlling, communication, and sensing functions independently in watch body 1104, independently in watch band 1112, and/or in communication between watch body 1104 and watch band 1112.

For example, watch body 1104 can include battery 1128, CPU 1126, storage 1102, heart rate sensor 1158, EMG sensor 1146, $SpO_2$ sensor 1154, altimeter 1148, IMU 1142, random access memory 1103, charging input 1130 and communication devices NFC 1115, LTE 1118, and Wi-Fi/Bluetooth™ 1120. Similarly, watch band 1112 can include battery 1138, microcontroller unit 1152, memory 1150, heart-rate sensor 1158, EMG sensor 1146, SpO2 sensor 1154, altimeter 1148, IMU 1142, charging input 1134 and wireless transceiver 1140. In some examples, a level of functionality of at least one of watch band 1112 or watch body 1104 can be modified when watch body 1104 is detached from watch band 1112. The level of functionality that can be modified can include the functionality of at least one sensor (e.g., heart-rate sensor 1158, EMG sensor 1146). Each of watch body 1104 and watch band 1112 can execute instructions stored in storage 1102 and memory 1150 respectively that enables at least one sensor (e.g., heart-rate sensor 1158, EMG sensor 1146) in watch band 1112 to acquire data when watch band 1112 is detached from watch body 1104 and when watch band 1112 is attached to watch body 1104.

Watch body 1104 and watch band 1112 can further execute instructions stored in storage 1102 and memory 1150 respectively that enables watch band 1112 to transmit the acquired data to watch body 1104 (or other computing device such as a head mounted display or other computing device 115; FIGS. 1A-1J) using wired communications 1127 and/or wireless transceiver 1140. For example, watch body 1104 can display visual content to a user on touchscreen display 1113 (e.g., an instance of display 130) and play audio content on speaker 125. Watch body 1104 can receive user inputs such as audio input from microphone 1197 and touch input from buttons 1124. Watch body 1104 can also receive inputs associated with a user's location and/or surroundings. For example, watch body 1104 can receive location information from GPS 1116 and/or altimeter 1148 of watch band 1112.

Watch body 1104 can receive image data from at least one imaging device 147 (e.g., a camera). Imaging device 147 can include front-facing imaging device 1025A (FIG. 10A) and/or rear-facing imaging device 1025B (FIG. 10B). Front-facing imaging device 1025A and/or rear-facing imaging device 1025B can capture wide-angle images of the area surrounding front-facing imaging device 1025A and/or rear-facing imaging device 1025B such as hemispherical images (e.g., at least hemispherical, substantially spherical), 180-degree images, 360-degree area images, panoramic images, ultra-wide area images, or a combination thereof. In some examples, front-facing imaging device 1025A and/or rear-facing imaging device 1025B can be configured to capture images having a range between 45 degrees and 360 degrees. Certain input information received by watch body 1104 (e.g., user inputs) can be communicated to watch band 1112. Similarly, certain input information (e.g., acquired sensor data, neuromuscular sensor data) received by watch band 1112 can be communicated to watch body 1104.

Watch body 1104 and watch band 1112 can receive a charge using a variety of techniques. In some embodiments, watch body 1104 and watch band 1112 can use a wired charging assembly (e.g., power cords) to receive the charge. Alternatively, or in addition, watch body 1104 and/or watch band 1112 can be configured for wireless charging. For example, a portable charging device can be designed to mate with a portion of watch body 1104 and/or watch band 1112 and wirelessly deliver usable power to a battery of watch body 1104 and/or watch band 1112.

Watch body 1104 and watch band 1112 can have independent power and charging sources to enable each to operate independently. Watch body 1104 and watch band 1112 can also share power (e.g., one can charge the other) via power management IC 1132 in watch body 1104 and power management IC 1136 in watch band 1112. Power management IC 1132 and power management IC 1136 can share power over power and ground conductors and/or over wireless charging antennas.

Wrist-wearable device system 1100 can operate in conjunction with a health-monitoring application that acquires biometric and activity information associated with the user. The health-monitoring application can be designed to provide information to a user that is related to the user's health. For example, wrist-wearable device system 1100 can monitor a user's physical activity by acquiring data from IMU 1142 while simultaneously monitoring the user's heart rate via heart-rate sensor 1158 and saturated blood oxygen levels via $SpO_2$ sensor 1154. CPU 1126 can process the acquired data and display health-related information to the user on touchscreen display 1113.

Wrist-wearable device system 1100 can detect when watch body 1104 and watch band 1112 are connected to one another (e.g., mechanically connected and/or electrically or magnetically connected) or detached from one another. For example, pin(s), power/ground connections 1160, wireless transceiver 1140, and/or wired communications 1127 can detect whether watch body 1104 and watch band 1112 are mechanically and/or electrically or magnetically connected to one another (e.g., detecting a disconnect between the one or more electrical contacts of power/ground connections 1160 and/or wired communications 1127). In some examples, when watch body 1104 and watch band 1112 are mechanically and/or electrically disconnected from one another (e.g., watch body 1112 has been detached from watch band 1112 as described with reference to FIGS. 10A and 10B), watch body 1104 and/or watch band 1112 can operate with modified level of functionality (e.g., reduced functionality) as compared to when watch body 1104 and watch band 1112 are mechanically and/or electrically connected to one another. The modified level of functionality (e.g., switching from full functionality to reduced functionality and from reduced functionality to full functionality) can occur automatically (e.g., without user intervention) when wrist-wearable device system 1100 determines that watch body 1104 and watch band 1112 are mechanically and/or electrically disconnected from one another and connected to each other, respectively.

Modifying the level of functionality (e.g., reducing the functionality in watch body 1104 and/or watch band 1112) can reduce power consumption in battery 1128 and/or battery 1138. For example, any of the sensors (e.g., heart-rate sensor 1158, EMG sensor 1146, SpO$_2$ sensor 1154, altimeter 1148), processors (e.g., CPU 1126, microcontroller unit 1152), communications elements (e.g., NFC 1115, GPS 1116, LTE 1118, Wi-Fi/Bluetooth™ 1120), or actuators (e.g., haptics 1122, 1149) can reduce functionality and/or power consumption (e.g., enter a sleep mode) when watch body 1104 and watch band 1112 are mechanically and/or electrically disconnected from one another. Watch body 1104 and watch band 1112 can return to full functionality when watch body 1104 and watch band 1112 are mechanically and/or electrically connected to one another. The level of functionality of each of the sensors, processors, actuators, and memory can be independently controlled.

As described above, wrist-wearable device system 1100 can detect when watch body 1104 and watch band 1112 are coupled to one another (e.g., mechanically connected and/or electrically connected) or decoupled from one another. In some examples, watch body 1104 can modify a level of functionality (e.g., activate and/or deactivate certain functions) based on whether watch body 1104 is coupled to watch band 1112. For example, CPU 1126 can execute instructions that detect when watch body 1104 and watch band 1112 are coupled to one another and activate front-facing imaging device 1025A. CPU 1126 can activate front-facing imaging device 1025A based on receiving user input (e.g., a user touch input from touchscreen display 1113, a user voice command from microphone 1197, a user gesture recognition input from EMG sensor 1146).

When CPU 1126 detects that watch body 1104 and watch band 1112 are decoupled from one another, CPU 1126 can modify a level of functionality (e.g., activate and/or deactivate additional functions). For example, CPU 1126 can detect when watch body 1104 and watch band 1112 are decoupled from one another and activate rear-facing imaging device 1025B. CPU 1126 can activate rear-facing imaging device 1025B automatically (e.g., without user input) and/or based on receiving user input (e.g., a touch input, a voice input, an intention detection). Automatically activating rear-facing imaging device 1025B can allow a user to take wide-angle images without having to provide user input to activate rear-facing imaging device 1025B.

In some examples, rear-facing image can be activated based on an image-capture criterion (e.g., an image quality, an image resolution). For example, rear-facing imaging device 1025B can receive an image (e.g., a test image). CPU 1126 and/or rear-facing imaging device 1025B can analyze the received test image data and determine whether the test image data satisfies the image capture criterion (e.g., the image quality exceeds a threshold, the image resolution exceeds a threshold). Rear-facing imaging device 1025B can be activated when the test image data satisfies the image-capture criterion. Additionally, or alternatively, rear-facing imaging device 1025B can be deactivated when the test image data fails to satisfy the image-capture criterion.

In some examples, CPU 1126 can detect when watch body 1104 is coupled to watch band 1112 and deactivate rear-facing imaging device 1025B. CPU 1126 can deactivate rear-facing imaging device 1025B automatically (e.g., without user input) and/or based on receiving user input (e.g., a touch input, a voice input, an intention detection). Deactivating rear-facing imaging device 1025B can automatically (e.g., without user input) reduce the power consumption of watch body 1104 and increase the battery charge time in watch body 1104. In some examples, wrist-wearable device system 1100 can include a coupling sensor 1107 that senses whether watch body 1104 is coupled to or decoupled from watch band 1112. Coupling sensor 1107 can be included in any of watch body 1104, watch band 1112, or watch band coupling mechanism 1060 of FIGS. 10A and 10B. Coupling sensor 1107 (e.g., a proximity sensor) can include, without limitation, an inductive proximity sensor, a limit switch, an optical proximity sensor, a capacitive proximity sensor, a magnetic proximity sensor, an ultrasonic proximity sensor, or a combination thereof. CPU 1126 can detect when watch body 1104 is coupled to watch band 1112 or decoupled from watch band 1112 by reading the status of coupling sensor 1107.

Further embodiments also include various subsets of the above embodiments, including embodiments described with reference to FIGS. 1A-11 combined or otherwise re-arranged.

Example Aspects

A few example aspects will now be briefly described.

(A1) In accordance with some embodiments, a method of aggregating and guiding access to data from multiple different electronic messaging applications via a quickly accessible communications-hub mode is provided. The method includes displaying, on a display of the wrist-wearable device that includes at least a first messaging application and a second messaging application distinct from the first messaging application, a watch-face UI. The watch-face UI can be a UI that is displayed by default at the wrist-wearable device. An example watch-face UI is shown in FIG. 1A, in which the example watch-face UI includes at least a current time, a current day of the week, a current date, and current weather information. The method further includes while displaying the watch-face UI, detecting a single input from a user wearing the wrist-wearable device, the single input corresponding to a request from the user to activate a communications-hub mode. The communications-hub mode provides the user access to two or more of an aggregated messaging UI, an aggregated call log UI, and an aggregated contacts UI, each including data from both of the first messaging application and the second messaging application (in some embodiments, these aggregated UIs are only accessible while the communications-hub mode is active). The method further includes, in response to detecting the single input corresponding to the request from the user to activate the communications-hub mode ceasing to display the watch-face UI, displaying, on the display of the wrist-wearable device, the aggregated messaging UI. Displaying the aggregated messaging UI includes displaying a first UI element that includes at least part of a first message received via the first messaging application and a second UI element that includes at least part of a second message received via the second messaging application.

(A2) In some embodiments of (A1), the user wearing the wrist-wearable device has two different user accounts for receiving messages via the first messaging application, and the aggregated messaging UI also includes a third UI element that includes at least part of a third message received via the first messaging application. The third message is sent to a first of the two different user accounts via the first messaging application, and the first message is sent to a second of the two different user accounts via the first messaging application. In other words, the wrist-wearable device is configured to continuously add new messages as they are received across different applications on the wrist-wearable device to the aggregated messaging UI, such that the aggregated messaging UI can serve to guide the user to access each new message via the aggregated messaging UI without having to open any of the individual applications of the different applications (and without having to require a user to log in and out of the various applications to access messaging data for different user accounts that might each be associated with one messaging application).

(A3) In some embodiments of (A2), the method further includes displaying, within the aggregated messaging UI, a UI element for creating a new message. In response to detecting a selection of the UI element for creating a new message, the method includes in accordance with a determination that the two different user accounts for receiving messages via the first messaging application are enabled on the wrist-wearable device (e.g., are enabled via a configuration UI associated with the communications-hub mode, as discussed in more detail with reference to FIGS. 6A-8E below), presenting (i) a first selectable option that, when selected, causes the wrist-wearable device to initiate creation of a message to be sent using the first of the two different user accounts and (ii) a second selectable option that, when selected, causes the wrist-wearable device to initiate creation of a message to be sent using the second of the two different user accounts. In other words, the aggregated messaging UI can allow the user to view conversational flows (e.g., messages sent and received via the first messaging application) occurring for multiple different user accounts associated with one messaging application (here, the two different user accounts that are both associated with the first messaging application) all in the aggregated messaging UI and without requiring the user to log in and out of any particular application to switch between various user accounts to view messaging data for different user accounts.

(A4) In some embodiments of (A3), the method further includes, in response to detecting the selection of the UI element for creating a new message, in accordance with a determination that at least one user account for receiving messages via the second messaging application is enabled on the wrist-wearable device, presenting a third selectable option that, when selected, causes the wrist-wearable device to initiate creation of a message to be sent using the at least one user account for the second messaging application. The first, second, and third selectable options can be presented within one UI on the wrist-wearable device.

(A5) In some embodiments of (A4), the wrist-wearable device includes a user-account-configuration UI for enabling and disabling user accounts on the wrist-wearable device, the user accounts including the two different user accounts for receiving messages via the first messaging application and the user account for receiving messages via the second messaging application. The method further includes displaying the user-account configuration UI on the display of the wrist-wearable device. The method includes, in response to an input at a toggle associated with one of the user accounts, causing the wrist-wearable device to add or remove messages from the aggregated messaging UI depending on whether a respective user account has been enabled or disabled via the input at the toggle.

(A6) In some embodiments of (A5), the user-account-configuration UI allows for enabling only a predetermined number of user accounts on the wrist-wearable device (e.g., the predetermined number can be 3, 4, 5, or 6 in some embodiments), thereby helping to preserve limited computing and memory resources on the wrist-wearable device while still allowing users to view messaging data associated with a number of different user accounts.

(A7) In some embodiments of any of (A1)-(A6), the method further includes, while displaying the aggregated messaging UI, detecting another single input from the user wearing the wrist-wearable device, the other single input corresponding to a request from the user to access an aggregated call log UI. The method includes, in response to detecting the other single input corresponding to the request from the user to access the aggregated call log UI, ceasing to display the aggregated messaging UI (while the communications-hub mode remains active), and displaying, on the display of the wrist-wearable device, the aggregated call log UI. Displaying the aggregated call log UI includes displaying (i) a fourth UI element that includes data associated with a first call received via the first messaging application, and (ii) a fifth UI element that includes data associated with a second call received via the second messaging application. This further enables a sustained human-computer interaction that allows a user to quickly go from an aggregated view of message data to an aggregated view of call logs from various applications installed (or otherwise available) on the wrist-wearable device. The first and second messaging applications can be social-media applications with messaging and calling features associated therewith.

(A8) In some embodiments of (A7), the method further includes, while displaying the aggregated call log UI, detecting a selection of the fourth UI element. The method includes, in response to detecting the selection, initiating a call via the first messaging application. In other words, in some embodiments, calls can be initiated directly from the aggregated call log UI and without opening any particular calling applications (either on the wrist-wearable device or on a device connected to the wrist-wearable device, such as a smartphone).

(A9) In some embodiments of (A7), displaying the aggregated call log UI also includes displaying a sixth UI element that includes data from a voicemail received via the first messaging application or the second messaging application.

(A10) In some embodiments of (A9), the fourth and fifth UI elements are displayed with a first visual characteristic, and sixth UI element is displayed with a second visual appearance that is distinct from the first visual characteristic. For example, the voicemail icon or indicator is distinct from indicators or icons for received and/or outgoing calls such that the user can easily identify voicemails from among indicators for different calls (or other messages).

(A11) In some embodiments of (A10), displaying the aggregated call log UI includes, in accordance with a determination that two calls were received from a same other user, displaying one UI element with data from each of the two calls within the aggregated call log UI.

(A12) In some embodiments of (A11), a first of the two calls is an audio call from the same other user and a second of the two calls is a video call from the same other user.

(A13) In some embodiments of (A12), the method further includes detecting a new input at the one UI element with data from each of the two calls. The method includes, in response to detecting the new input, displaying, at the wrist-wearable device, selectable options for initiating a video call or initiating an audio call to the same other user. The video call would be initiated using a camera of the wrist-wearable device (and can be initiated without opening any particular video calling applications (either on the wrist-wearable device or on a device connected to the wrist-wearable device such as a smartphone)).

(A14) In some embodiments of any of (A7)-(A13), the method further includes, while displaying the aggregated call log UI, detecting one other input from the user wearing the wrist-wearable device, the one other input corresponding to a request from the user to access an aggregated contacts UI. The method includes, in response to detecting the one other input, ceasing to display the aggregated call log UI, and displaying, on the display of the wrist-wearable device, the aggregated contacts UI (all while the communications-hub mode remains active at the wrist-wearable device, such that the communications-hub mode enables access to each of the three different aggregated UIs). Displaying the aggregated contacts UI includes displaying (i) a sixth UI element that includes data from a respective contact of a plurality of contacts associated with the first messaging application and (ii) a seventh UI element that includes data from a respective contact of a plurality of contacts associated with the second messaging application.

(A15) In some embodiments of any of (A1)-(A14), the watch-face UI includes an indication to the user that the aggregated messaging UI is available via a single input.

(A16) In some embodiments of any of (A1)-(A15), the aggregated messaging UI includes an indication to the user that the aggregated call log UI is available via a single input.

(A17) In some embodiments of any of (A1)-(A16), the wrist-wearable device operates using an operating system, and the first and second messaging applications provide data regarding electronic messages, contacts, and calls to the operating system for use in generating the aggregated messaging, call log, and contacts UIs by the operating system. In other words, in some embodiments, the aggregated messaging, call log, and contacts UIs are distinct from the first and second messaging applications, and the data regarding messages, calls, and contacts from the applications is provided for display in the aggregated UIs by way of the operating system.

(B1) In accordance with some embodiments, a wrist-wearable device for activating a communications-hub mode that includes two or more of an aggregated messaging UI, aggregated call log UI, and aggregated contacts UI is provided. The wrist-wearable device is configured to perform or cause performance of the method of any of (A1)-(A17).

(C1) In accordance with some embodiments, a capsule housing the display recited in (A1) is provided. The capsule is configured to couple with a band to form a wrist-wearable device, and the capsule includes one or more processors configured to perform or cause performance of the method of any of (A1)-(A17).

(D1) In accordance with some embodiments, a non-transitory, computer-readable storage medium is provided. The non-transitory, computer-readable storage medium includes instructions that, when executed by a wrist-wearable device, cause the wrist-wearable device to perform or cause performance of the method of any of (A1)-(A17).

The various UIs and interactions described above in reference to FIGS. 1A-11 are non-limiting. The various UIs and interactions described above in reference to FIGS. 1A-11 can be implemented on devices with other form factors, including wrist-wearable devices with other form factors including any of the form factors for a wrist-wearable device shown in U.S. Design patents application Ser. Nos. 29/740,675 and 29/770,243, each of which is incorporated by reference herein in its respective entirety and on which any of the UIs and techniques described herein can be presented.

Any data collection performed by the devices described herein and/or any devices configured to perform or cause the performance of the different embodiments described above in reference to FIGS. 1A-11, hereinafter the "devices," is done with user consent and in a manner that is consistent with all applicable privacy laws. Users are given options to allow the devices to collect data, as well as the option to limit or deny collection of data by the devices. A user is able to opt in or opt out of any data collection at any time. Further, users are given the option to request the removal of any collected data.

It will be understood that, although the terms "first," "second," etc., may be used herein to describe various elements, these elements should not be limited by these terms. These terms are only used to distinguish one element from another.

The terminology used herein is for the sole purpose of describing particular embodiments and is not intended to be limiting of the claims. As used in the description of the embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" can be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" can be construed to mean "upon determining" or "in response to determining" or "in accordance with a determination" or "upon detecting" or "in response to detecting" that the stated condition precedent is true, depending on the context.

The foregoing description, for purpose of explanation, has been described with reference to specific embodiments. However, the illustrative discussions above are not intended to be exhaustive or to limit the claims to the precise forms disclosed. Many modifications and variations are possible in view of the above teachings. The embodiments were chosen and described in order to best explain principles of operation and practical applications, to thereby enable others skilled in the art.

What is claimed is:

1. A non-transitory computer-readable storage medium, comprising instruction which, when executed by one or more processors, cause the one or more processors to:
 display, at an electronic device, an aggregated messaging user interface (UI) that includes data from a plurality of user accounts associated with one or more messaging applications;
 detect a selection of a UI element within the aggregated messaging UI, the UI element for creating a new message via at least one respective user account of the plurality of user accounts; and
 in response to detecting the selection, and in accordance with a determination that messaging capabilities for two or more respective user accounts of the plurality of user accounts are enabled at the electronic device, present:
a first selectable option that, when selected causes the electronic device to initiate creation of a message to be sent using a first respective user account of the plurality of user accounts, and
a second selectable option that, when selected, causes the electronic device to initiate creation of a message to be sent using a second respective user account of the plurality of enabled user accounts.

2. The non-transitory computer-readable storage medium of claim 1, wherein the first respective user account of the plurality of enabled user accounts and the second respective user account of the plurality of enabled user accounts are associated with a same messaging application of the one or more messaging applications.

3. The non-transitory computer-readable storage medium of claim 1, wherein:
the first respective user account is associated with a first messaging application of the one or more messaging applications, and
the second respective user account is associated with a second messaging application of the one or more messaging applications.

4. The non-transitory computer-readable storage medium of claim 1, wherein the first and second respective user accounts are associated with a first messaging application of the one or more messaging applications, and the one or more processors are further configured to:
in response to detecting the selection of the UI element for creating the new message:
in accordance with a determination that a third respective user accounts of the plurality of user accounts for receiving messages via the second messaging application is enabled on the electronic device, present a third selectable option that, when selected, causes the electronic device to initiate creation of a message to be sent using the third respective user account, wherein the first, second, and third selectable options are presented within one UI on the electronic device.

5. The non-transitory computer-readable medium of claim 1, wherein the one or more processors are further configured to:
after selection of a respective selectable option of the first or second selectable options, present a predetermined text message to send, at the display, based on one or more messages of a respective messaging application of the one or more messaging applications, the respective messaging application associated with the respective selectable option that is currently displayed within the aggregated messaging UI.

6. The non-transitory computer-readable medium of claim 1, wherein the one or more processors are further configured to:
while displaying the aggregated messaging UI, detect another user input corresponding to a request from to access an aggregated call log UI; and
in response to detecting the other user input corresponding to the request to access the aggregated call log UI:
cease to display the aggregated messaging UI, and
display, on the display of the electronic device, the aggregated call log UI, wherein displaying the aggregated call log UI includes displaying (i) a first call-log UI element that includes data associated with a call from the first respective user account, and (ii) a second call-log UI element that includes data associated with a call from a second respective user account.

7. The non-transitory computer-readable storage medium of claim 1, wherein the electronic device is a wrist-wearable device.

8. The non-transitory computer-readable storage medium of claim 7, wherein the one or more processors are further configured to:
in response to detecting a user input directed to the first or the second selectable option within the aggregated messaging UI, cause presentation of a keyboard display UI element at another display of a different electronic device, distinct from the wrist-wearable device.

9. The non-transitory computer-readable storage medium of claim 1, wherein:
the electronic device includes a user-account-configuration UI for enabling and disabling user accounts on the electronic device, and
the user-account-configuration UI allows for enabling only a predetermined number of the user accounts on the electronic device, thereby helping to preserve limited computing and memory resources on the electronic device.

10. The non-transitory computer-readable storage medium of claim 1, wherein:
the aggregated messaging UI includes a first UI element including one or more messages received by a first messaging application of the one or more messaging applications, and
the aggregated messaging UI includes a second UI element including one or more other messages received by a second messaging application, distinct from the first messaging application, of the one or more messaging applications.

11. A method, comprising:
displaying, at an electronic device, an aggregated messaging user interface (UI) that includes data from a plurality of user accounts associated with one or more messaging applications;
detecting a selection of a UI element within the aggregated messaging UI, the UI element for creating a new message via at least one respective user account of the plurality of user accounts; and
in response to detecting the selection, and in accordance with a determination that messaging capabilities for a plurality of different of the plurality of user accounts are enabled at the electronic device, presenting:
a first selectable option that, when selected causes the electronic device to initiate creation of a message to be sent using a first respective user account of the plurality of user accounts, and
a second selectable option that, when selected, causes the electronic device to initiate creation of a message to be sent using a second respective user account of the plurality of enabled user accounts.

12. The method of claim 11, wherein the each of the plurality of user accounts is associated with a same messaging application of the one or more messaging applications.

13. The method of claim 11, wherein:
the first respective user account is associated with a first messaging application of the one or more messaging applications, and
the second respective user account is associated with a second messaging application of the one or more messaging applications.

14. The method of claim 11 wherein the first and second respective user accounts are associated with a first messaging application of the one or more messaging applications, further comprising:

in response to detecting the selection of the UI element for creating the new message:
- in accordance with a determination that a third respective user accounts of the plurality of user accounts for receiving messages via the second messaging application is enabled on the electronic device, presenting a third selectable option that, when selected, causes the electronic device to initiate creation of a message to be sent using the third respective user account, wherein the first, second, and third selectable options are presented within one UI on the electronic device.

15. The method of claim 11, further comprising:

after selection of a respective selectable option of the first or second selectable options, presenting a predetermined text message to send, at the display, based on one or more messages of a respective messaging application of the one or more messaging applications, the respective messaging application associated with the respective selectable option that is currently displayed within the aggregated messaging UI.

16. A system, comprising:

a display;

one or more processors; and memory, comprising instructions for causing the one or more processors to:
- display, at an electronic device, an aggregated messaging user interface (UI) that includes data from a plurality of user accounts associated with one or more messaging applications;
- detect a selection of a UI element within the aggregated messaging UI, the UI element for creating a new message via at least one respective user account of the plurality of user accounts;
- in response to detecting the selection, and in accordance with a determination that messaging capabilities for a plurality of different of the plurality of user accounts are enabled at the electronic device, present:
  - a first selectable option that, when selected causes the electronic device to initiate creation of a message to be sent using a first respective user account of the plurality of user accounts, and
  - a second selectable option that, when selected, causes the electronic device to initiate creation of a message to be sent using a second respective user account of the plurality of enabled user accounts.

17. The system of claim 16, wherein the each of the plurality of user accounts is associated with a same messaging application of the one or more messaging applications.

18. The system of claim 16, wherein:
- the first respective user account is associated with a first messaging application of the one or more messaging applications, and
- the second respective user account is associated with a second messaging application of the one or more messaging applications.

19. The system of claim 16, wherein the first and second respective user accounts are associated with a first messaging application of the one or more messaging applications, and wherein the one or more processors are further configured to:

in response to detecting the selection of the UI element for creating the new message:
- in accordance with a determination that a third respective user accounts of the plurality of user accounts for receiving messages via the second messaging application is enabled on the electronic device, present a third selectable option that, when selected, causes the electronic device to initiate creation of a message to be sent using the third respective user account, wherein the first, second, and third selectable options are presented within one UI on the electronic device.

20. The system of claim 16, wherein the one or more processors are further configured to:

after selection of a respective selectable option of the first or second selectable options, present a predetermined text message to send, at the display, based on one or more messages of a respective messaging application of the one or more messaging applications, the respective messaging application associated with the respective selectable option that is currently displayed within the aggregated messaging UI.

* * * * *